US010828558B2

(12) United States Patent
Hansson

(10) Patent No.: US 10,828,558 B2
(45) Date of Patent: Nov. 10, 2020

(54) VIDEO GAME WITH SPREADING TILE BACKGROUNDS FOR MATCHED TILES

(71) Applicant: KING.COM LIMITED, St. Julians (MT)

(72) Inventor: Magnus Hansson, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 16/279,364

(22) Filed: Feb. 19, 2019

(65) Prior Publication Data

US 2019/0176024 A1 Jun. 13, 2019

Related U.S. Application Data

(63) Continuation-in-part of application No. 15/597,412, filed on May 17, 2017, now Pat. No. 10,265,612, (Continued)

(30) Foreign Application Priority Data

Feb. 19, 2013 (GB) .................................. 1302910.3
Jun. 21, 2013 (GB) .................................. 1311119.0
Oct. 17, 2013 (GB) .................................. 1318416.3

(51) Int. Cl.
*A63F 13/25* (2014.01)
*A63F 9/06* (2006.01)
(Continued)

(52) U.S. Cl.
CPC ........... *A63F 9/0612* (2013.01); *A63F 13/00* (2013.01); *A63F 13/20* (2014.09); (Continued)

(58) Field of Classification Search
CPC .......... A63F 13/45; A63F 13/50; A63F 13/52; A63F 13/55; A63F 13/57; A63F 13/63
See application file for complete search history.

(56) References Cited

U.S. PATENT DOCUMENTS 5,423,556 A 6/1995 Latypov et al.
5,442,378 A 8/1995 Yasuhara et al.
(Continued)

FOREIGN PATENT DOCUMENTS

DE 10304725 A1 9/2004
EP 1564698 A2 8/2005
(Continued)

OTHER PUBLICATIONS

Azkend 2: The World Beneath gameplay, retrieved from the Internet: https://www.youtube.com/watch?v=JG75WbH5-yA ,Jun. 20, 2012.

(Continued)

*Primary Examiner* — Lawrence S Galka
(74) *Attorney, Agent, or Firm* — Saul Ewing Arnstein & Lehr LLP

(57) ABSTRACT

A computer device comprising a user interface, a processor, and a graphics rendering component. The user interface is configured to display user actuatable game elements, each user actuatable game element displayed on a respective tile, and to detect user input when a user engages with at least one of said user actuatable game elements in a move. The processor is configured to determine, on detecting the match game condition, whether at least one tile of the respective tiles associated with the at least three actuatable game elements of the match condition has a tile characteristic indicating an attained background appearance and, if so, to modify the tile characteristic of each tile of the respective tiles associated with the at least three actuatable game elements of the match condition not indicating an attained background appearance to indicate an attained background appearance.

20 Claims, 42 Drawing Sheets

Related U.S. Application Data which is a continuation of application No. 14/609,971, filed on Jan. 30, 2015, now Pat. No. 9,687,729, which is a continuation of application No. 14/316,274, filed on Jun. 26, 2014, now Pat. No. 9,079,097, which is a continuation-in-part of application No. 14/183,997, filed on Feb. 19, 2014, now Pat. No. 9,592,441, which is a continuation-in-part of application No. 14/029,538, filed on Sep. 17, 2013, now Pat. No. 9,579,569, and a continuation-in-part of application No. 14/029,261, filed on Sep. 17, 2013, now Pat. No. 9,526,982, application No. 16/279,364, which is a continuation-in-part of application No. 16/148,481, filed on Oct. 1, 2018, now abandoned, which is a continuation of application No. 15/709,972, filed on Sep. 20, 2017, now Pat. No. 10,086,296, which is a continuation of application No. 14/611,733, filed on Feb. 2, 2015, now Pat. No. 9,776,093.

(51) Int. Cl.

| | |
|---|---|
| ***A63F 13/55*** | (2014.01) |
| ***A63F 13/20*** | (2014.01) |
| ***A63F 13/48*** | (2014.01) |
| ***A63F 13/23*** | (2014.01) |
| ***G07F 17/32*** | (2006.01) |
| ***A63F 13/00*** | (2014.01) |
| ***A63F 13/92*** | (2014.01) |
| ***A63F 13/2145*** | (2014.01) |
| ***A63F 13/52*** | (2014.01) |
| ***G06F 9/44*** | (2018.01) |
| ***A63F 13/45*** | (2014.01) |
| ***A63F 13/57*** | (2014.01) |
| ***A63F 13/50*** | (2014.01) |
| ***A63F 13/56*** | (2014.01) |
| ***A63F 13/80*** | (2014.01) |

(52) U.S. Cl.

CPC .......... *A63F 13/2145* (2014.09); *A63F 13/23* (2014.09); *A63F 13/45* (2014.09); *A63F 13/48* (2014.09); *A63F 13/50* (2014.09); *A63F 13/52* (2014.09); *A63F 13/55* (2014.09); *A63F 13/56* (2014.09); *A63F 13/57* (2014.09); *A63F 13/80* (2014.09); *A63F 13/92* (2014.09); *G06F 9/44* (2013.01); *G07F 17/32* (2013.01); *G07F 17/3274* (2013.01); *A63F 2300/1075* (2013.01)

(56) References Cited

U.S. PATENT DOCUMENTS

| | | | |
|---|---|---|---|
| 5,488,496 | A | 1/1996 | Pine |
| 5,890,962 | A | 4/1999 | Takemoto |
| 6,068,552 | A | 5/2000 | Walker et al. |
| 6,117,013 | A | 9/2000 | Eiba |
| 7,073,792 | B2 | 7/2006 | Esposito et al. |
| 7,749,060 | B1 | 7/2010 | Olmes et al. |
| 7,775,866 | B2 | 8/2010 | Mizuguchi et al. |
| 8,002,633 | B2 | 8/2011 | Shimizu et al. |
| 8,075,404 | B2 | 12/2011 | Stamper et al. |
| 8,088,010 | B1 | 1/2012 | Hill et al. |
| 8,237,743 | B2 | 8/2012 | Csurka et al. |
| 8,277,320 | B1 | 10/2012 | Hart et al. |
| 8,369,873 | B2 | 2/2013 | Krasner et al. |
| 8,388,446 | B1 | 3/2013 | Craine et al. |
| 8,526,490 | B2 | 9/2013 | Buckley et al. |
| 8,672,744 | B1 | 3/2014 | Steere et al. |
| 8,711,923 | B2 | 4/2014 | Buckley et al. |
| 8,727,893 | B2 | 5/2014 | Otremba et al. |
| 8,784,181 | B2 | 7/2014 | Frank et al. |
| 8,964,830 | B2 | 2/2015 | Perlman et al. |
| 9,033,803 | B1 | 5/2015 | Etter et al. |
| 9,098,847 | B2 | 8/2015 | Basallo et al. |
| 9,446,313 | B2 | 9/2016 | Norden |
| 2002/0068632 | A1 | 6/2002 | Dunlap et al. |
| 2002/0082068 | A1 | 6/2002 | Singhal et al. |
| 2002/0094854 | A1 | 7/2002 | Morita et al. |
| 2002/0094870 | A1 | 7/2002 | Murray et al. |
| 2003/0049592 | A1 | 3/2003 | Park et al. |
| 2003/0050118 | A1 | 3/2003 | Suzuki et al. |
| 2003/0074416 | A1 | 4/2003 | Bates et al. |
| 2003/0119581 | A1 | 6/2003 | Cannon et al. |
| 2004/0053688 | A1 | 3/2004 | Hosaka et al. |
| 2004/0137987 | A1 | 7/2004 | Nguyen et al. |
| 2004/0224772 | A1 | 11/2004 | Canessa et al. |
| 2005/0256985 | A1 | 11/2005 | Shea et al. |
| 2006/0068876 | A1 | 3/2006 | Kane et al. |
| 2006/0160620 | A1 | 7/2006 | Matthews et al. |
| 2006/0223635 | A1 | 10/2006 | Rosenberg et al. |
| 2006/0277474 | A1 | 12/2006 | Robarts et al. |
| 2006/0281541 | A1 | 12/2006 | Nguyen et al. |
| 2006/0287098 | A1 | 12/2006 | Morrow et al. |
| 2007/0077993 | A1 | 4/2007 | Midgley et al. |
| 2007/0259709 | A1 | 11/2007 | Kelly et al. |
| 2008/0005353 | A1 | 1/2008 | Panabaker et al. |
| 2009/0170608 | A1 | 7/2009 | Herrmann et al. |
| 2009/0203415 | A1 | 8/2009 | Falciglia et al. |
| 2009/0209311 | A1 | 8/2009 | Bennett et al. |
| 2010/0144426 | A1 | 6/2010 | Winner et al. |
| 2010/0151934 | A1 | 6/2010 | Kniberg et al. |
| 2010/0218135 | A1 | 8/2010 | Brugler et al. |
| 2010/0227675 | A1 | 9/2010 | Luxton et al. |
| 2010/0271367 | A1 | 10/2010 | Vaden et al. |
| 2010/0317437 | A1 | 12/2010 | Berry et al. |
| 2011/0014977 | A1 | 1/2011 | Yamazaki et al. |
| 2011/0053681 | A1 | 3/2011 | Goldman et al. |
| 2011/0111835 | A1 | 5/2011 | Cohen et al. |
| 2011/0136561 | A1 | 6/2011 | Acres et al. |
| 2011/0136572 | A1 | 6/2011 | Karn et al. |
| 2011/0230246 | A1 | 9/2011 | Brook et al. |
| 2011/0269532 | A1 | 11/2011 | Shuster et al. |
| 2012/0030094 | A1 | 2/2012 | Khalil et al. |
| 2012/0040752 | A1 | 2/2012 | Koo et al. |
| 2012/0064969 | A1 | 3/2012 | Uchibori et al. |
| 2012/0077580 | A1 | 3/2012 | Mahajan et al. |
| 2012/0079126 | A1 | 3/2012 | Evans et al. |
| 2012/0122552 | A1 | 5/2012 | Youm et al. |
| 2012/0191606 | A1 | 7/2012 | Milne et al. |
| 2012/0198417 | A1 | 8/2012 | Haviv et al. |
| 2012/0311036 | A1 | 12/2012 | Huhn et al. |
| 2013/0035164 | A1 | 2/2013 | Osvald et al. |
| 2013/0109469 | A1 | 5/2013 | Hill et al. |
| 2013/0172061 | A1 | 7/2013 | Iosilevsky et al. |
| 2013/0267285 | A1 | 10/2013 | Kelley et al. |
| 2013/0316832 | A1 | 11/2013 | Olofsson et al. |
| 2013/0323697 | A1 | 12/2013 | Shadduck et al. |
| 2013/0331162 | A1 | 12/2013 | Krivicich et al. |
| 2014/0024450 | A1 | 1/2014 | Ramachandran et al. |
| 2014/0080600 | A1 | 3/2014 | Knutsson et al. |
| 2014/0235306 | A1 | 8/2014 | Walls et al. |
| 2014/0235338 | A1 | 8/2014 | Hansson et al. |
| 2014/0252987 | A1 | 9/2014 | Hinrichs et al. |
| 2014/0342791 | A1 | 11/2014 | Valeriano et al. |
| 2014/0357367 | A1 | 12/2014 | Lee |
| 2014/0370950 | A1 | 12/2014 | Hansson et al. |
| 2015/0050997 | A1 | 2/2015 | Suzman et al. |
| 2015/0174489 | A1 | 6/2015 | Evald et al. |
| 2016/0220897 | A1* | 8/2016 | Hansson ................ A63F 13/45 |

FOREIGN PATENT DOCUMENTS

| | | | |
|---|---|---|---|
| EP | 1870143 | A1 | 12/2007 |
| EP | 2211299 | A2 | 7/2010 |
| JP | 2005-228086 | | 8/2005 |
| JP | 2012-61060 | A | 3/2012 |
| WO | 01/46790 | A2 | 6/2001 |
| WO | 2006039366 | A2 | 4/2006 |
| WO | 2006/052212 | A1 | 5/2006 |
| WO | 2007/078533 | A2 | 7/2007 |
| WO | 2008/109685 | A2 | 9/2008 |

(56) References Cited

FOREIGN PATENT DOCUMENTS

| | | |
|---|---|---|
| WO | 2010/002897 | 1/2010 |
| WO | 2010/045716 A1 | 4/2010 |
| WO | 2010/083346 A1 | 7/2010 |
| WO | 2010/096784 A1 | 8/2010 |
| WO | 2011/011466 | 1/2011 |
| WO | 2011/041467 A2 | 4/2011 |
| WO | 2012/013198 A1 | 2/2012 |
| WO | 2003/174933 | 11/2013 |

OTHER PUBLICATIONS

Bejeweled 3 Video Review, retrieved from the Internet: URL: https://www.youtube.com/watch?v=Nnb4z-BpQA8; dated Dec. 7, 2010.
Bejeweled Blitz 878,550 Points "elite Technique" Legit No Boosts Facebook, YouTube Video, 2 page screen shot; retrieved from the Internet: URL: https://www.youtube.com/watch?v=eusZMBjSD5E.
Classic Game Room—Bejeweled 3 review for Nintendo DS, screen shot 1 page, video length 4:22; retrieved from the Internet; URL: https://www.youtube.com/watch?v=pxVGdIJTVxQ ,Dec. 16, 2011.
International Search Report, dated May 13, 2015, and Written Opinion, issued in corresponding International Application No. PCT/EP2015/052000.
Match-3 in Construct 2: part one, Retrieved from the Internet; URL: http://weconstruct.blogspot.com/2011/12/match-3-in-construct-2-part-one.html; posed on Dec. 16, 2011.
Sutek's Tomb on YouTube, Screen shot 2 pages, video length 6:59, retrieved from the Internet: URL: https://www.youtube.com/watch?v=D0Z1FN7OSwE ,Aug. 12, 2007.
Adbang, et al.,[How to block Anipang heart] HOw to block Anipang heart at i-phone, Internet blog, Internet: URL: http://blog.naver.com/cyco5202/110147101106 ,Sep. 11, 2012.
Anonymous, et al.,Amazon Survival YouTube video, Uploaded to YouTube on Mar. 13, 2009, video length 6:06, https://www.youtube.com/watch?v=8S2gM5POUUk ,Mar. 13, 2009 ,1.
Anonymous, et al.,Bejeweled 2 Wikipedia Article, ,Sep. 30, 2015 ,1-3.
Anonymous, et al.,Bejeweled article, Wikipedia ,Sep. 30, 2015.
Anonymous, et al.,Best iOS/Androoid cross-platform mobiledevelopment SDKs, retrieved from the Internet: URL: http://webification.com/best-iosandroid-cross-platform-mobile-development-sdks [retrieved on Jul. 2, 2013] XP055069062 ,Sep. 26, 2011 ,p. 1.
Anonymous, et al.,Bubble Witch Saga—GameSpot, Retrieved from the Internet: URL:http://www.gamespot.co/bubble-witch-saga/ [retrieved on Mar. 21, 2014] XP055109245 ,pp. 1-2.
Anonymous, et al.,Buck Rodgers Turn Based Strategy Game Design and Planning Document, https://cs.nyu.edu/courses/spring07/V22.0474.001/groups/tbsgame/tbsgame_des.pdf ,Feb. 21, 2007.
Anonymous, et al.,Candy Crush Saga Facebook Game levels 1-10 video on YouTube, YouTube screen shorts figures 1-7, https://www.youtube.com/watch?v=8TleNDnJiN8 ,Apr. 15, 2012.
Anonymous, et al.,Candy Crush Saga for Facebook, YouTube video demonstrating levels 1-10, video length 15:23, https://www.youtube.com/watch?v=cfqHVkWX5yE ,Apr. 12, 2012 ,1 page.
Anonymous, et al.,Candy Crush Saga on Facebook Review on YouTube video, Screen shots of YouTube video, figures 1-13, https://www.youtube.com/watch?v=AbH8Givg6XM ,Sep. 7, 2012.
Anonymous, et al.,Cross-platform, retrieved from the Internet: URL:http://en.widipedia.org/w/index.php?title=Cross-platform&oldid=487867404 [retrieved on Jul. 1, 2013] XP055068984 ,Apr. 17, 2012 ,pp. 1-16.
Anonymous, et al.,Daily Bonus Level Oct. 17, 2012: Bubble Witch Saga Fan Site, retrieved from the Internet:URL: http://bubble-witch-saga.se/daily-bonus-level-17-oct-2012/ [retrieved on Mar. 21, 2014] XP055109244 ,Oct. 17, 2012 ,pp. 1-2.
Anonymous, et al.,Dig Dug article, Wikipedia ,Sep. 30, 2015.
Anonymous, et al.,Facebook Platform—Wikipedia, the free encyclopedia, Retrieved from the Internet: URL:http://en.wikipedia.org/w/index/php?title=Facebook_Platofrm&oldid=533105338 [retrieved on Mar. 21, 2014] XP055109249 , pp. 1-2.
Anonymous, et al., Facebook Spiel Candy Crush Saga: Cheats, Tipps, News and Videos BILDspielt, URL: http://www.bildspielt.de/social-games/3-gewinnt/candy-crush-saga-180643/ [retrieved on Oct. 25, 2013] XP055085339 ,Apr. 12, 2012 ,pp. 1-10.
Anonymous, et al., Game Architecture: Model-View-Controller, retrieved from the Internet: URL:http://www.koonsolo.com/news/model-view-controller-for-games/ [retrieved on Oct. 8, 2013] XP055083073 ,Jul. 13, 2009 ,pp. 1-2.
Anonymous, et al., Guide to Bubble Witch Saga—Facebook Hints & Tips—How to level guide, retrieved from the Internet: URL:http://reindeerz.hubpages.com/hub/Bubblewitch [retrieved on Dec. 9, 2012] XP055092347 ,Apr. 10, 2012 , pp. 1-2.
Anonymous, et al., iPhone Game 'Trism' break $250,000. Review.—[Updated] razorianflyofficial, retrieved from the Internet: URL: https://razorianflyofficial.wordpress.com/2008/09/25/iphone-game-trism-breaks-25000-review/, [retrieved on Apr. 15, 2015] XP055183153 ,Sep. 26, 2008.
Anonymous, et al., King.com expands to Google+ with Bubble Witch Saga, Retrieved from the Internet: URL:http://www.insidesocialgames.com/2012/01/24/king-com-expands-to-google-with-bubble-witch-saga/ [retrieved on Mar. 21, 2014] XP055109246 ,Jan. 24, 2012 ,pp. 1-2.
Anonymous, et al.,King.com Skill Games for iPhone and Facebook: http://www.ubergizmo.com/2009/07/king-com-skill-games-for-iphone-and-facebook/, retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-faceboo ,Jul. 13, 2009 ,pp. 1-2.
Anonymous, et al.,Minecraft, retrieved from the Internet: URL:http://en.widipedia.org/w/index?title=Minecraft&oldid=409326251 [retrieved on Jul. 1, 2013] XP055068987 ,May 2, 2014.
Anonymous, et al.,Model-view-controller, retrieved from the Internet: URL:http://en.widipedia.org/w/index/php?title=Model%E2%80%93view%E2%80%93controller&oldid=511810952 'retrieved on Oct. 8, 2013] XP055083072 , Sep. 11, 2012 ,pp. 1-2.
Anonymous, et al.,OpenOffice, Creating Charts and Graphs, ,Dec. 2004 ,1-17.
Anonymous, et al.,Pygame, retrieved from the Internet: URL:http://web.archive/org/web/20120413123244/http://www.pygame.org/wik/tut_design [retrieved on Oct. 8, 2013 XP055083074 ,Apr. 13, 2012 ,pp. 1-5.
Anonymous, et al.,Salesforce Tutorial—Model View Controller (MVC), [online] Retrieves from the Internet: <https://web.archive.org/web/20130814042919/http://www.salesforcetutorial.com/model-view-controller-mvc/> [retrieved Jul. 1, 2016],Apr. 10, 2013.
Anonymous, et al.,Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point, retrieved from the Internet: URL:http://web.archive.org/web/20120621061714/http://www.gamesgames.com/games/social-games/social-games.html [retrieved on Oct. 15, 2013] XP055084089 ,Jun. 21, 2012 ,pp. 4-6.
Anonymous, et al.,Why King.com's Candy Crush is crushing it on Facebook, retrieved from the Internet: URL: http://blog.games.com/2012/05/01/why-king-coms-candy-crush-is-crushing-it-on-facebook/ [retrieved on Oct. 25, 2013] XP055085338 ,May 1, 2012 ,pp. 1-4.
Collins, et al.,Will Collins Game Spotlight: Candy Crush Saga, retrieved from the Internet: URL:https//developers.facebook.com/blog/post/2012/06/15/game-spotlight--candy-crush-saga/ [retrieved on Oct. 25, 2013] XP055085345 , Jun. 15, 2012 ,pp. 1-2.
Crazymikesapps, et al.,Azkend 2 HD—The World Beneath iPhone App Review—CarzyMikespps, https://www.youtube.com/watch?v=yWFBH3S6tG8, Created Mar. 15, 2012.
Demeter,Steve et al.,Trism: Upcoming iPhone Game by Demiforce, retrieved from the Internet: URL: https://www.youtube.com/watch?v=hy0ptZisr70, [retrieved on Apr. 16, 2015] XP054975820 ,Feb. 26, 2008.

(56) References Cited

OTHER PUBLICATIONS

Dotson, et al., Bubble Witch Saga Pops Bubbles o iOS and Facebook >148Apps> iPhone, iPad, and iPod touch App Reviews and News, retrieved from the Internet: URL:http://www.148apps.com/news/bubble-witch-saga-pops-bubbles-ios-faceboold [retrieved on Dec. 9, 2013] XP055092342 ,Jul. 27, 2012 ,pp. 1-2.
Duffy,Jill et al.,Home Product Guies Software Internet 7 Great Google+ Games You Might Also Like, retrieved from the Internet: URL:http://www.pcmag.com/article2/0,2817,2391136,002sp [retrieved on Oct. 15, 2013] XP055084091 , Aug. 16, 2011 ,p. 1.
Goad, Libe et al.,"Why King.com's Candy Crush is crushing it on Facebook", Games.com [online], Internet: URL: http://blog.games.com/2012/05/01/why-king-comes-candy-crush-is-crushing-it-onfacebook/ ,May 1, 2012.
Josef,Mark et al.,Bloxley Tutorial #1—Sokoban, http://bloxley.net/2010/10/tutorial-1-sokoban , Oct. 13, 2010.
Kangbelief, et al.,"Kakao talk, how to reject the undesired invitation message of Anipang and receive the heart quietly", Internet blog, Internet: URL:http://kangbelief.tistory.com/312 ,Sep. 16, 2012.
Lee,Xah et al.,Bejeweled Blitz Strategy as Math, 4 pages ,Sep. 22, 2011.
Murphy,Conor et al.,Bejeweled 2 Strategy Guide, www.bigfishgames.com ,Aug. 15, 2010.
Namco, et al.,Dig Dug Video Game (copy unavailable), ,1982.
Popcap, et al.,Bejeweled Video Game (copy unavailable), ,2001.
Rua,Sergio et al.,Candy Crush Saga Gameplay First Look (Episode 1-10 levels), Video on YouTube, screen shots 4 pages, video length 15:40; retrieved from the Internet: https://www.youtube.com/watch?v=8TleNDnJiN8 [retrieved on Oct. 28, 2016], Apr. 15, 2012.
Schoenau-Fog,Henrik et al.,The Player Engagement Process—An Exploration of Continuation Desire in Digital Games, http://www.digra.org/wp--content/uploads/digital-library/11307.06025.pdf ,2011.
Squires,Jim et al.,Bubble Witch Saga is going mobile—Gamezebo, retrieved from the Internet: URL:http://www.gamezebo.com/news/2012/06/27/bubble-witch-saga-going-mobile [retrieved on Dec. 9, 2013] XP055092339 ,Jun. 27, 2012 ,pp. 1-2.
Jewel Mania—Basic Max Level 900, Forums.storms8.com; 5 pages; Retrieved from the Internet: «https://forums.storm8.com/showthread.php?41251-Jewel_mania_Basic-Max-Level-900/p. 2», Dec. 1, 2012.
YouTube video of: Jewel Mania—iPhone & iPad Gameplay Video, screen shot, 3 pages; retrieved from the Internet: «https://www.youtube.com/watch?v=oJnj0RQRNil», Dec. 12, 2012.
Cardwell-Winters, Kellie , "Jewel Mania Walkthrough", GameZibo, 23 pages; Retrieved from the Internet: «https://www.gamezebo.com/2012/11/19/jewel-mania-walkthrough-cheats-strategy-guide/», Nov. 19, 2012.

* cited by examiner

VIDEO GAME WITH SPREADING TILE BACKGROUNDS FOR MATCHED TILES

CROSS-REFERENCE TO RELATE APPLICATIONS

This application is a continuation-in-part of U.S. application Ser. No. 15/597,412, filed on May 17, 2017, which is a continuation of U.S. application Ser. No. 14/609,971, filed on Jan. 30, 2015, which is a continuation of U.S. application Ser. No. 14/316,274, filed Jun. 26, 2014, which is a continuation-in-part of U.S. application Ser. No. 14/183,997, filed on Feb. 19, 2014, which is a continuation-in-part of U.S. application Ser. No. 14/029,538, filed Sep. 17, 2013; and U.S. application Ser. No. 14/183,997 is a continuation-in-part of U.S. application Ser. No. 14/029,261, filed Sep. 17, 2013; and U.S. application Ser. No. 14/183,997 is based on, and claims priority to UK Application No. 1401717.2, filed Jan. 31, 2014; UK Application No. 1318416.3, filed Oct. 17, 2013; UK Application No. 1311119.0, filed Jun. 21, 2013; and UK Application No. 1302910.3, filed Feb. 19, 2013; and this application is a continuation-in-part of U.S. application Ser. No. 16/148,481, filed on Oct. 1, 2018, which is a continuation of U.S. application Ser. No. 15/709,972, filed on Sep. 20, 2017, which is a continuation of U.S. application Ser. No. 14/611,733, filed on Feb. 2, 2015, the entire contents of each of which being fully incorporated herein by reference.

FIELD OF INVENTION

The present invention relates to controlling a user interface responsive to user engagement with displayed elements on the interface of a computer device.

BACKGROUND OF THE INVENTION

When creating computer devices on which computer-implemented games are executed, there are many technical challenges when considering how the game is to be effectively implemented on the device and how the user interface is to be controlled One technical challenge can involve allowing a game to be fun and compelling even when there is limited display resource available, such as when a game is being played on a smartphone, tablet or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches the locations of two adjacent game elements on the game board so that one or both of them create a chain of at least three adjacent game elements of the same type. Those matched game elements will then disappear. The game board is then repopulated with game objects.

One such known match three-type game is known by the trade name Candy Crush Soda Saga™. In that game, the game board is repopulated with game elements which are perceived as falling downwards onto the game board from the top edge of the screen from which the game is played.

Another known type of game is "linker game", where a sequence of game elements are linked to form a known sequence, such as a word, which can be matched to a dictionary. When a known sequence is linked, game elements in the link are removed from the gameboard.

A 'clicker game' is a type of casual puzzle game where the player is required to find patterns on a seemingly chaotic board. The player then has to match two or more of the same type of game element on the game board and those matched elements will then be removed from the board. The player matches adjacent game elements of the same type by selecting one or more of the game elements in the group of matching elements. The matched elements are then removed from the gameboard.

Computer devices which are configured to provide such games need to be constructed to deliver game modes in an engaging and user-friendly way.

SUMMARY OF THE INVENTION

Aspects of the present invention provide an improved computer device having a user interface which is controlled to provide a computer-implemented game of a matching type (switcher, clicker or linker). The device is configured to provide a solution to the technical problem of improved user engagement by providing a new user engagement mode, which is implemented by a processor configured by a game code with a data structure held in memory in the computer device.

According to a first aspect of the present invention, there is provided computer device comprising: a user interface configured to display user actuatable game elements, each user actuatable game element displayed on a respective tile, and to detect user input when a user engages with at least one of said user actuatable game elements in a move; wherein each tile is associated with a tile characteristic which determines a background appearance of the tile; a processor configured to receive a detected user input and on detecting a match game condition of at least three user actuatable game elements to control the user interface to remove the at least three game elements from their respective locations on the display and to generate replacement user game elements for a subsequent move; and a graphics rendering component operable to render the tiles and the user actuatable game elements on the user interface, each game element having a graphical representation on its respective tile, and each tile having a background appearance determined by its tile characteristic; wherein the processor is configured to determine, on detecting the match game condition, whether at least one tile of the respective tiles associated with the at least three actuatable game elements of the match condition has a tile characteristic indicating an attained background appearance and, if so, to modify the tile characteristic of each tile of the respective tiles associated with the at least three actuatable game elements of the match condition not indicating an attained background appearance to indicate an attained background appearance, and wherein the processor is further configured to identify for each tile of the respective tiles associated with the at least three actuatable game elements of the match condition a respective target tile and to determine for each respective target tile identified whether according to a predefined criteria to associate the respective target tile with the modified tile characteristic indicating an attained background appearance.

At least some tiles may have a predetermined physics which governs a direction of the respective target tile relative to each of the at least some tiles. The physics may form part of the tile data of each of the at least some tiles. It is noted here that this predetermined physics is different from a physics which may operate to control a refill mechanism for generating replacement elements. Such a physics may be referred to as a refill physics.

At least two of the at least some tiles may have different predetermined physics.

The processor may be configured to identify a respective target tile for each additional tile on the user interface which has an attained background appearance, and may determine for each respective target tile identified whether, according to the predefined criteria, to associate the respective target tile with the modified tile characteristic indicating an attained background appearance.

The graphics rendering component may be operable to render a visual animation of the association of the modified tile characteristic with each respective target tile by rendering each respective target tile with the attained background appearance.

The processor may be configured to determine for each current tile associated with the modified characteristic a next respective target tile according to the predetermined physics associated with the current tile with which the tile characteristic is to be associated depending on the predefined criteria.

The graphics rendering component may be configured to render for at least some tiles an indication of the direction of each respective target tile that is to be associated with the modified tile characteristic.

The user interface may be configured to display the user actuatable game elements in a game board comprising an array of tiles in rows and columns, and the processor may be configured to identify each respective target tile as a next tile in the row or column, the next tile being adjacent the tile associated with the modified tile characteristic, and may be further configured to identify a next respective target tile for each tile and to associate the tile characteristic with each next target tile until a blocking condition is detected.

The processor may be configured, on detecting a blocking condition, to identify potential target tiles adjacent the row or column, and to associate the tile characteristic with a selected one of the potential target tiles, where the selected one of the potential target tiles may be determined according to one of the following rules: the potential tile located in a predefined direction is selected; and the potential target tile is randomly selected.

The processor may be configured, on detection of a blocking condition, not to identify further potential target tiles.

The blocking condition may be one of: a target tile which does not satisfy the predefined criteria; a tile with blocking characteristics; and an edge of the game board.

The tile characteristic associated with each further tile in the match condition may indicate a standard background appearance prior to modification of the tile characteristic, wherein the standard background appearance differs from the attained background appearance, and wherein the tile characteristic associated with each tile in the match condition may be controlled to indicate the standard background appearance after the tile characteristic has been associated with the respective target tile.

The predetermined physics of at least one tile may operate according to one of the following rules: (i) it causes the target tile to be located in a direction upwards of that tile; (ii) it causes the target tile to be located downwards from that tile; (iii) it causes the target tile to be located to one or other side of that tile.

The predetermined physics of at least one tile may be recorded in computer code stored at the computer device, the computer code configured to execute a game level, the predetermined physics fixed for the game level.

The predetermined physics of at least one tile may be controllable by the user engaging with the at least one user actuatable game element, The user interface may be configured to display special user actuatable game elements which are actuatable in a match game condition and which cause multiple further tiles, in addition to each tile in the match condition, to have a modified tile characteristic.

The predefined criteria may comprise: (i) a flag set for a current tile; and (ii) an indicator dependent on user engagement with the at least one user actuatable game element.

According to a second aspect of the present invention, there is provided a method of controlling a display of a computer device, the method comprising: displaying on a user interface a user actuatable game elements, each user actuatable game element displayed on a respective tile, and detecting user input when a user engages with at least one of said user actuatable game elements in a move; wherein each tile is associated with a tile characteristic which determines a background appearance of the tile; receiving a detected user input and, on detecting a match game condition of at least three user actuatable game elements, controlling the user interface to remove the at least three game elements from their respective locations on the display and generating replacement user game elements for a subsequent move; and rendering the tiles and the user actuatable game elements on the user interface, each game element having a graphical representation on its respective tile, and each tile having a background appearance determined by its tile characteristic, wherein it is determined, on detecting the match game condition, whether at least one tile of the respective tiles associated with the at least three actuatable game elements of the match condition has a tile characteristic indicating an attained background appearance and, if so, modifying the tile characteristic of each tile of the respective tiles associated with the at least three actuatable game elements of the match condition not indicating an attained background appearance to indicate an attained background appearance, and wherein it is identified for each tile of the respective tiles associated with the at least three actuatable game elements of the match condition a respective target tile and determined for each respective target tile identified whether according to a predefined criteria to associate the respective target tile with the modified tile characteristic indicating an attained background appearance.

According to a third aspect of the present invention, there is provided a computer program comprising computer readable instructions stored on a non-transitory computer readable media, the computer readable instructions, when executed by a processor of a computer device, causing a method of controlling a graphical user interface of the computer device to be implemented, the method comprising: displaying on a user interface a user actuatable game elements, each user actuatable game element displayed on a respective tile, and detecting user input when a user engages with at least one of said user actuatable game elements in a move; wherein each tile is associated with a tile characteristic which determines a background appearance of the tile; receiving a detected user input and, on detecting a match game condition of at least three user actuatable game elements, controlling the user interface to remove the at least three game elements from their respective locations on the display and generating replacement user game elements for a subsequent move; and rendering the tiles and the user actuatable game elements on the user interface, each game element having a graphical representation on its respective tile, and each tile having a background appearance determined by its tile characteristic; wherein it is determined, on detecting the match game condition, whether at least one tile of the respective tiles associated with the at least three actuatable game elements of the match condition has a tile characteristic indicating an attained background appearance and, if so, modifying the tile characteristic of each tile of the respective tiles associated with the at least three actuatable game elements of the match condition not indicating an attained background appearance to indicate an attained background appearance, and wherein it is identified for each tile of the respective tiles associated with the at least three actuatable game elements of the match condition a respective target tile and determined for each respective target tile identified whether according to a predefined criteria to associate the respective target tile with the modified tile characteristic indicating an attained background appearance.

In the above aspects, the attained background appearance of all of the game elements of the match condition 'migrates', including the game element which originally had the attained background appearance. However, it is possible to create a device in which the attained background appearance migrates only from the tiles with the 'newly' attained background appearance. Thus, according to a fourth aspect of the present invention, there is provided a computer device comprising: a user interface configured to display user actuatable game elements, each user actuatable game element displayed on a respective tile, and to detect user input when a user engages with at least one said user actuatable game elements in a move; each tile is associated with a tile characteristic which determines a background appearance of the tile; a processor configured to receive a detected user input and on detecting a match game condition of at least three user actuatable game elements to control the user interface to remove the at least three game elements from their respective locations on the display and to generate replacement user game elements for a subsequent move; and a graphics rendering component operable to render the tiles and the user actuatable game elements on the user interface, each game element having a graphical representation on its respective tile, and each tile having a background appearance determined by its tile characteristic, wherein the processor is configured to determine, on detecting the match game condition, if the tile characteristic associated with at least one tile in the match game condition indicates an attained background appearance for the at least one tile and, if so, to modify the tile characteristic associated with each further tile in the match condition to generate a modified tile characteristic for each further tile, wherein the modified characteristic indicates an attained background appearance for its associated tile, and wherein the processor is further configured to identify for each further tile a target tile with which the modified tile characteristic is to be associated and if the target tile is available to move the modified tile characteristic to the available target tile.

BRIEF DESCRIPTION OF THE DRAWINGS

For a better understanding of the present invention and to show how the same may be carried into effect, reference will now be made by way of the accompanying drawings, in which.

DETAILED DESCRIPTION OF THE INVENTION

Figure 1:
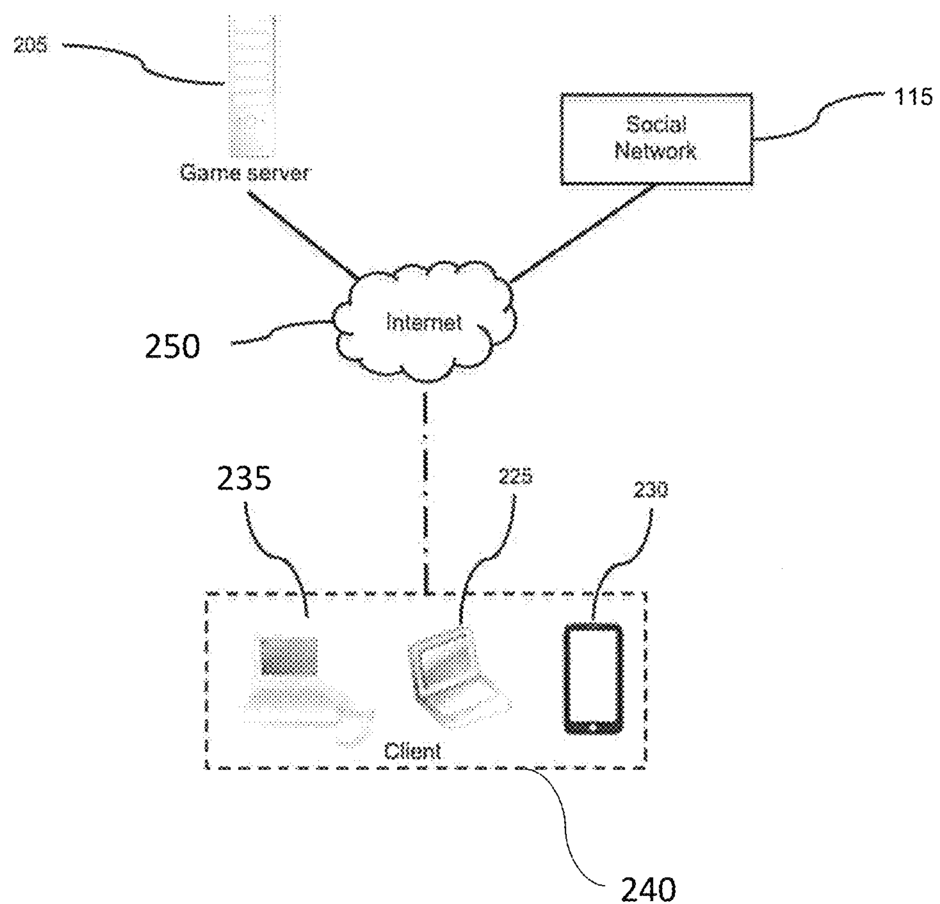
FIG. 1 is a schematic block diagram illustrating an environment for playing a game.

The embodiments of the present invention described herein provide an improved computer device configured by computer code to implement a new game mode, with improved user engagement. The game code is stored in a memory and executed by at least one processor to configure the device. According to the new game mode, an initial game board is delivered comprising tiles, each tile having either a standard background appearance or an "attained" background appearance. Although a game board is initially delivered with at least one tile with an "attained" background appearance, this term is used because the objective of the game is to change the background appearance from a standard background appearance to the "attained" background appearance by making game moves. For example, the standard background appearance could be a first colour, and the attained background appearance could be a second colour. Certain types of game moves would change the background appearance of a tile from a first colour to a second colour. In some embodiments, there may be more than one possible 'attained' background appearance. For example, if the game mode is being played by multiple players, each player may be associated with his own background appearance. The object of the game mode may be for a player to change all, or only a predefined number, of the tiles' background appearances to 'attained'.

In one game described later, this attained background appearance is referred to as "Jam". In our earlier U.S. application Ser. No. 14/611,733, the 'jam' is attained at the tiles in the location of matched game elements that have been removed from the gameboard and replaced. According to the present disclosure, the 'jam' is generated on a match condition, but then attempts to move away from the match location according to jam physics associated with the current tile, as described more fully in the following.

Whether jam can move from its current tile to a next tile is determined by predefined criteria. For example, these criteria may include determining if the next tile is subject to a blocking condition, such as if it already contains jam or it contains a 'blocker'. Tiles may be associated with flags which dictate whether jam can move into them from certain tiles, and determining if a tile contains a flag may be included in the predefined criteria. Another predefined criteria may be based on user engagement with an element on the gameboard to dictate jam movement.

The user may progress through a series of levels in a saga format. The user selects one of a number of playable levels presented to him on an interface. The levels may be represented on a 'virtual map', such that the progress of the player is represented as a journey along a path on the virtual map. When the user selection is detected, the level the user has selected is displayed to the user as a gameboard comprising user selectable game elements. Each level may have different goals associated with it which the user has to achieve in order to complete the level. The predefined criteria associated with the migration of jam on the gameboard may be embodied in a set of rules for each level, or may be common to multiple levels.

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing from the scope of the present invention.

The techniques described herein can be deployed in many different gameplay architectures. For example, a computer device can be configured by a computer game executed on the device. The game may be implemented as a computer program (e.g. game code) that is stored locally in the memory of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another possible infrastructure is a hybrid one, in which back-end servers handle some elements of the gameplay, and for instance a Java game applet is provided to client devices and it is the locally running Java applet that configures the client device to generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

In implementations where some or all elements of game code are executed on a remote server, users may be able to share their gaming experiences with other users. They may, for example, be able to share the scores they have achieved in a level with other players, which may be used to generate a leader board. Users may be able to choose which other users to share their scores with, for example their friends on a social media platform such as Facebook. This gives a social aspect to the game.

FIG. 1 portrays an exemplary overall environment in which the present invention can be utilized. A virtual game is stored on for instance a game server 205. The virtual game is to be played on a client device 240, such as a computer 235, 225 or a smartphone or other handheld device 230. The client device 240 can also be a kiosk, arcade gaming station, smart TV or other device with computing capabilities, input devices and a screen that can present the game to a user. The client device communicates with the game server 205 and a social network server 115, for instance through the Internet 250 or other network. It should be understood that the social network server 115 and the game server 205 do not have to be located in different places, they could be on the same server or on a plurality of servers located in different locations. People skilled in the art will understand that other devices than the exemplary ones listed can also be used without departing from the spirit and scope of the invention.

The game can be implemented allowing a user to interact with it in different ways depending on the capabilities of the client device 240 which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Figure 2:
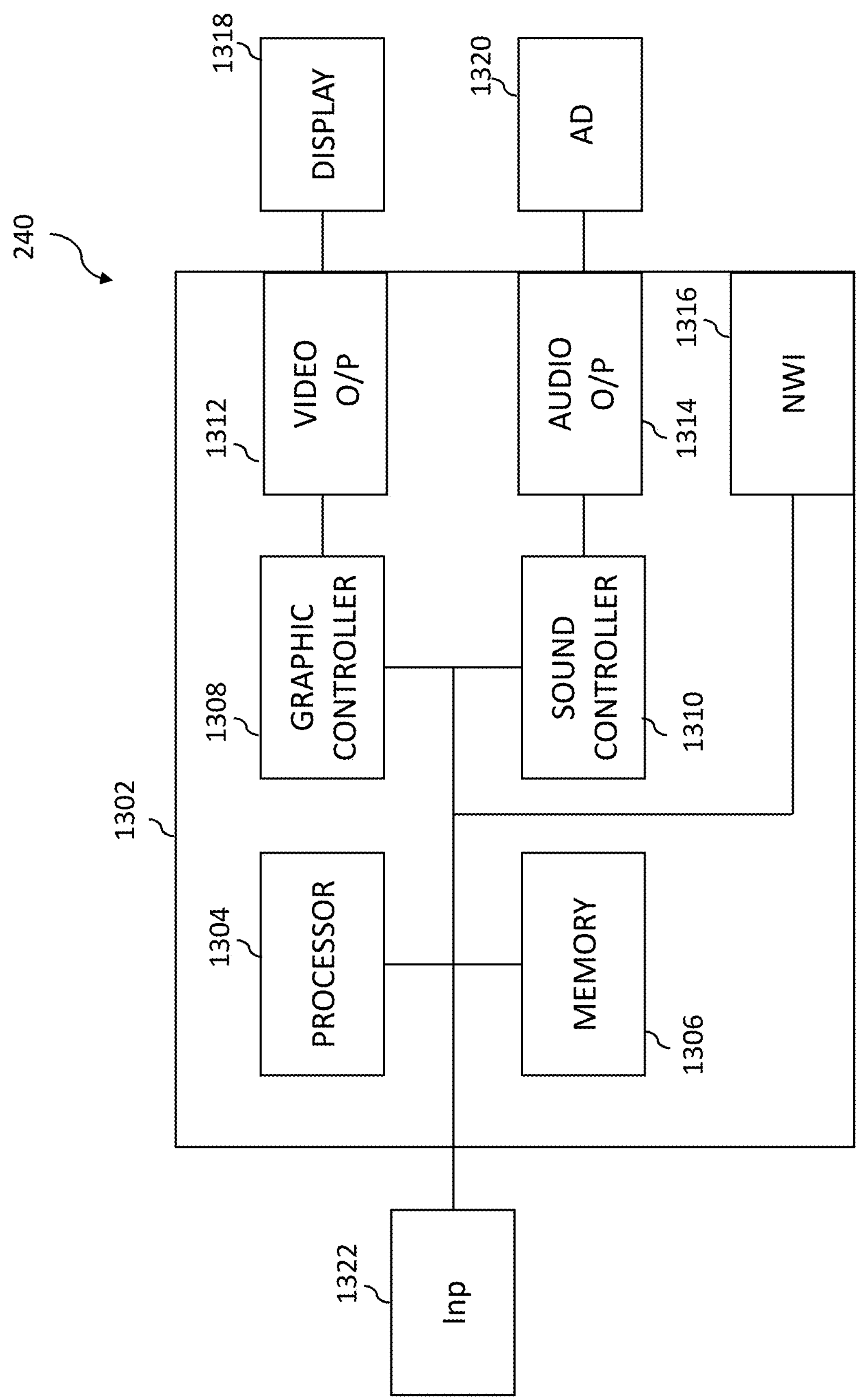
FIG. 2 is a schematic block diagram of a user device.

A schematic view of the user or computing device 240 according to an embodiment is shown in FIG. 2. The user device has a controller 1302. The controller 1302 may have one or more processors 1304 and one or more memories 1306. The controller 1302 is also shown as having a graphics controller 1308 and a sound controller 1310. It should be appreciated that one or other or both of the graphics controller 1308 and sound controller 1310 may be provided by the one or more processors 1304. Other functional blocks may also be implemented by suitable circuitry or computer code executed by the one or more processor 1304.

The graphics controller 1308 is configured to provide a video output 1312. The sound controller 1310 is configured to provide an audio output 1314. The controller 1302 has a network interface 1316 allowing the device to be able to communicate with a network such as the Internet 250 or other communication infrastructure.

The video output 1312 may be provided to a display 1318. The audio output 1314 may be provided to an audio device 1320 such as a speaker and/or earphones(s).

The device 240 may have an input device 1322. The input device 1322 can take any suitable format such as one or more of a keyboard, mouse, touch screen, joystick or game controller. It should be appreciated that the display 1318 may in some embodiments also provide the input device 1322, for example, by way of an integrated touch screen.

The blocks of the controller 1302 are configured to communicate with each other via an interconnect such as a bus or any other suitable interconnect and/or by point to point communication.

It should be appreciated that, in some embodiments, the controller 1302 may be implemented by one or more circuits, at least in part.

It should be appreciated that embodiments may be deployed in different system architectures. For example, the computer game may be implemented as a computer game that is stored in the memory 1306 of the user device 240. However, when online, the server 205 may handle some elements of the game in some embodiments. By way of example only, a Java game applet may be provided to the user device 240 and the locally running Java applet will generate, for example, the graphics, sounds, and user interaction for the game play on the user device 240. Java applet can have sufficient information to allow offline gameplay when the user device is no longer in communication with the game server 205, e.g. if connectivity is lost.

In some embodiments, the game may be implemented as a computer program that is stored in a memory system, for example the server 205, and which runs on the processor of the game server. Data streams or updates are supplied to the user device 240 to allow the user device 240 to render and display graphics and sounds in a browser of the user device 240.

The following describes an implementation using a switcher' mechanic where groups of 3 or more matching objects (referred to in this document as blocks or game elements) are created when a user switches two adjacent blocks and are automatically removed.

Figure 3:
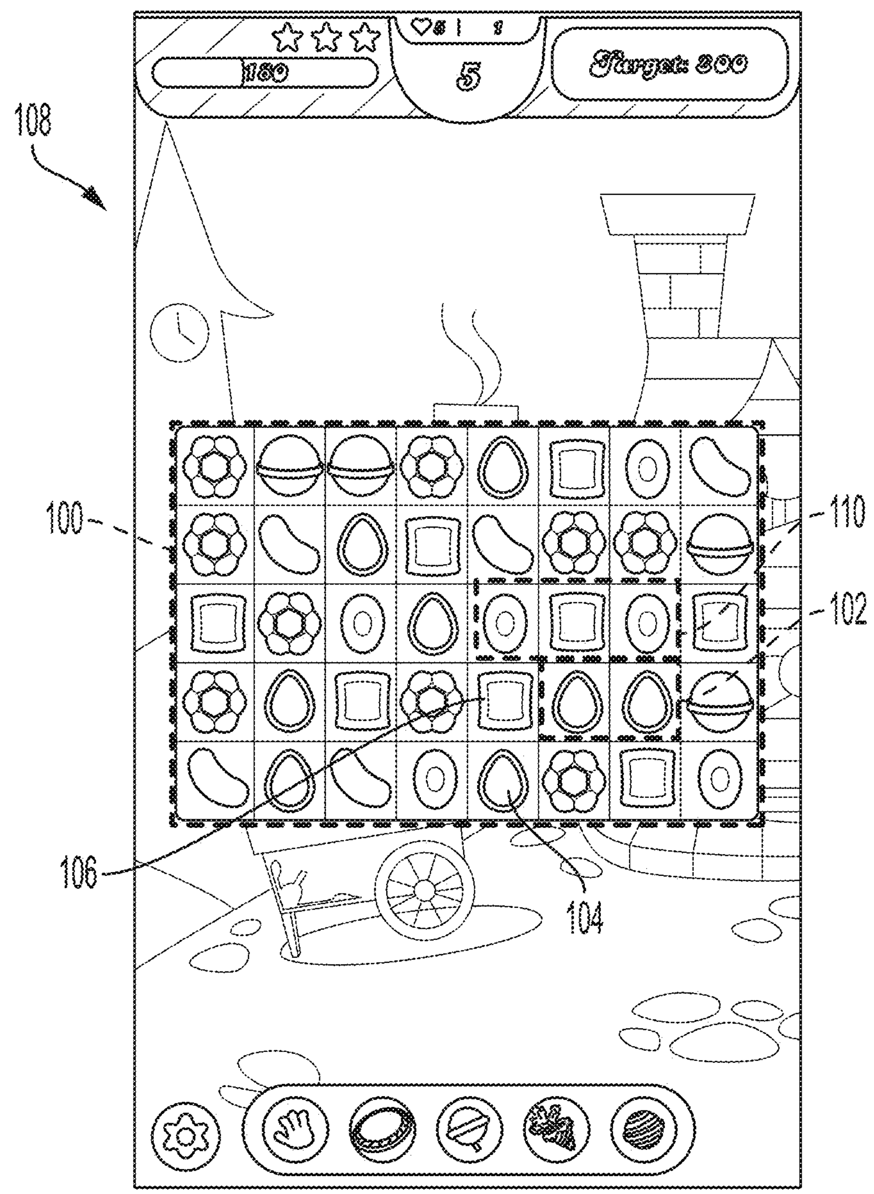
FIG. 3 shows a game play display of a switcher mechanic.

FIG. 3 shows an example of a game play display 108 of a switcher game. A gameboard 100 corresponding to grid 80 is filled with blocks or objects of different shapes and colours. There is a pair of matching adjacent pear drops 102. The user can select the square element 106 and pear drop element 104 in order to switch their respective tile locations on the gameboard 100. In some embodiments, selection can be by clicking and moving each element. In other embodiments, the user can select the pear drop element 104 and drag it towards the location of the square element 106 in order to switch their respective tile locations. Once the dragged element is at a certain threshold distance of its 'switching' element (in this case square element 106), the switch automatically occurs. This then creates a group of 3 matching adjacent pear drops which are subsequently removed from the gameboard 100.

After the matching adjacent pear drops are removed, the tiles in which the now removed pear drop elements were located are rendered empty. The blocks occupying the tiles above the now empty tiles fall downwards to fill the empty tiles, as determined by refill physics. Refill physics determines the direction of movement of game elements on the gameboard. For example, the game elements in tile locations 110 fall downwards to fill the tiles rendered empty after the removal of the matching pear drop elements. This is repeated up the gameboard until the only empty tiles are at the top of the gameboard. It will be appreciated that different tiles on the gameboard may be associated with different refill physics, such that replacement game elements move in different directions at different tile locations on the gameboard. This is described further in our previous U.S. application Ser. No. 14/183997, filed Feb. 19, 2014, which is fully incorporated herein by reference. New blocks are spawned at the tile located at the top of these three columns, corresponding to the entry points of sets of tiles, as described later, so that refillable tiles on the gameboard 100 are filled.

Figure 20:
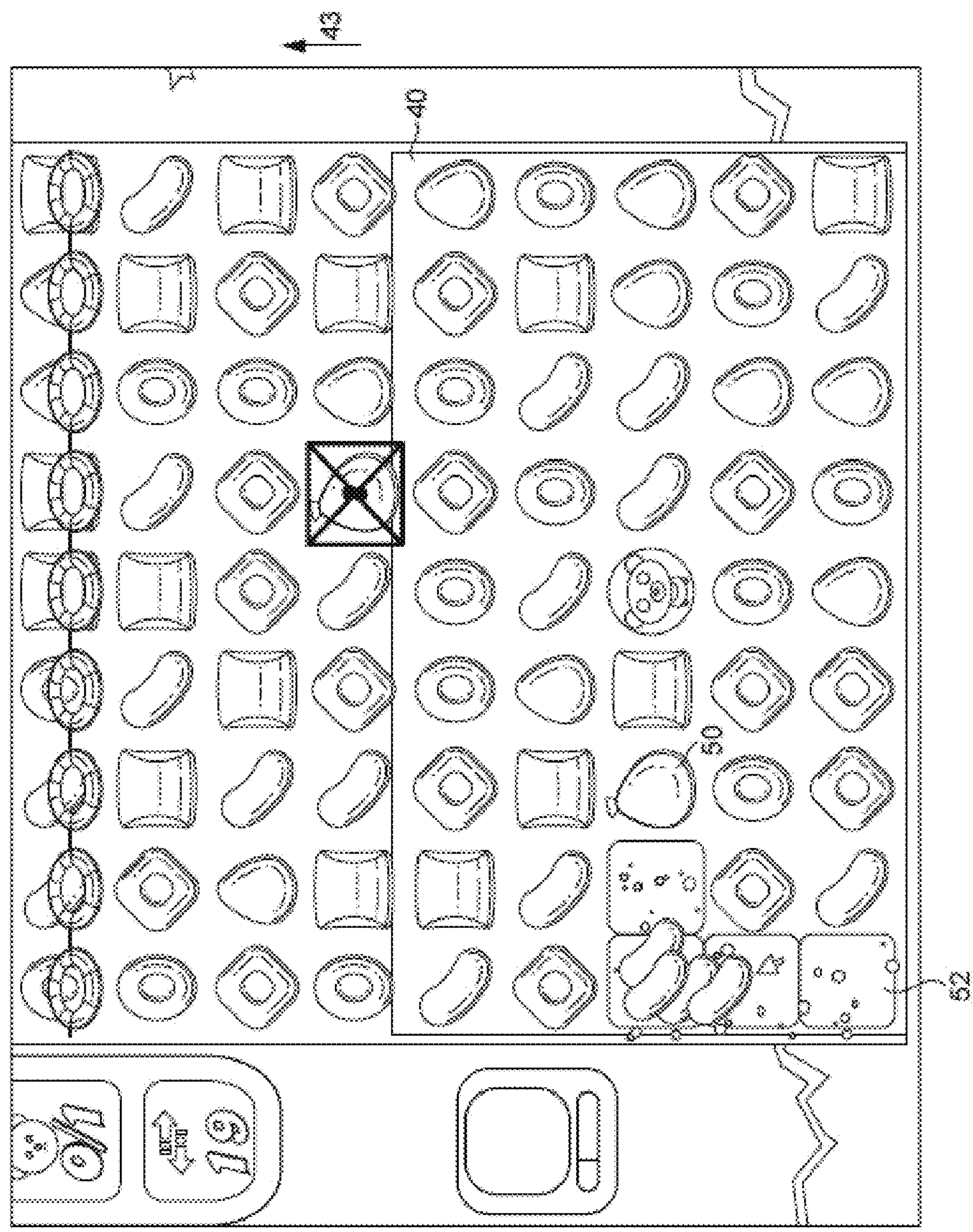
FIG. 20 shows a gameboard having two sections which are divided by a dividing line.

In some embodiments, the refill physics of each individual tile can be altered based on the game play of a user, or based on an instruction from the game code. Both the speed at which the game element can move, and the direction in which it can move can be governed by player moves. FIG. 20 shows a gameboard which has two sections which are divided by a dividing line 40. In the upper section of the gameboard, the refill physics are such that if a match is made, the game elements are removed, and game elements fall down from the top of the screen into tiles rendered empty after the removal of the matched elements. However, if game elements are matched and thus removed from an area below the dividing line 40, then game elements are generated to replenish the gameboard from below the screen in the direction of arrow 43 in FIG. 20. Thus, the refill physics of the tiles below the dividing line 40 is such that there is an upward movement to complete the display, rather than a downward movement as in the upper section. The refill physics of the tiles in this example are governed by the location of the tile vis-à-vis the dividing line 40. In this embodiment, the dividing line is visible to a player as a result of having tiles above the dividing line of one colour, and tiles below the dividing line of another colour.

The area below the line is referred to as 'lemonade'. This is just a denotation of a continuous colour formed by the tiles below the dividing line 40. Game elements cannot fall into the lower area from above the dividing line since the refill physics does not allow for this. The dividing line 40 represents a barrier to game elements moving further either upwards or downwards.

Players can control the location of the dividing line 40 with respect to the displayed area of the game board. That is, they can move the dividing line 40 upwards on the screen in accordance with a particular game mechanic, for example the bursting of balloon-shaped game elements 50. It will be apricated that other game mechanics may be implemented to allow the user to alter the refill physics of tiles. In this way, a player can influence the number of tiles which have an altered refill physics, in this case, the number of tiles which have a refill physics to cause them to replenish the game board moving upwardly from below the screen as opposed to downwardly from above the screen.

Figure 21:
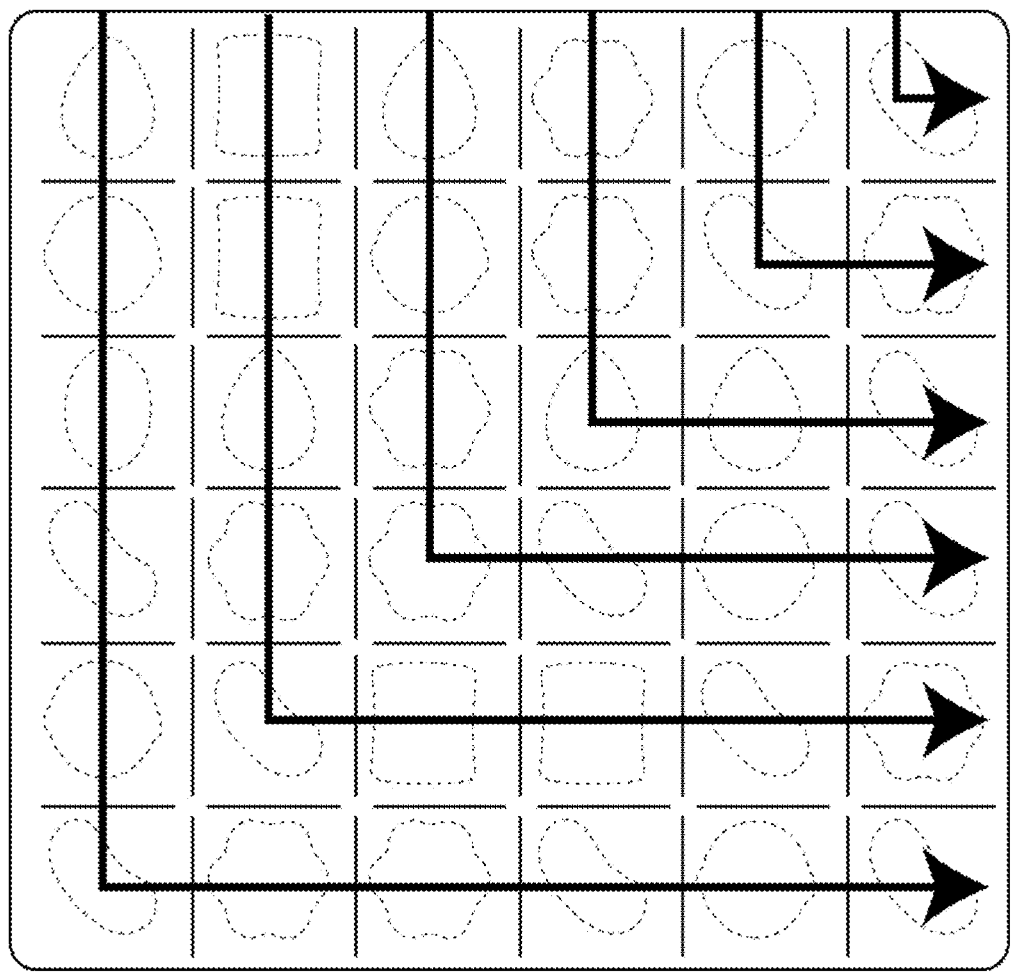
FIG. 21 illustrates an embodiment in which the refill physics of the tiles in the top triangle may dictate that the game elements move downwards and the refill physics of the tiles in the bottom triangle that the game elements move to the right.

It will be appreciated that, in some embodiments, the sections of the gameboard which have different refill physics may not be visually indicated to the user. The user may be able to change the refill physics associated with individual tiles or groups of tiles with predetermined game moves. The gameboard may be divided into different shaped groups of tiles with different refill physics, for example, the dividing line 40 may lie diagonally from the top right-hand corner to the bottom left-hand corner of the gameboard to form two triangular-shaped groups of tiles, and the refill physics of the tiles in the top triangle may dictate that the game elements move downwards and the refill physics of the tiles in the bottom triangle that the game elements move to the right, as shown in FIG. 21.

However the refill physics operates, this is not connected with the 'jam' physics discussed herein, which controls jam migrations between tiles.

Whether the colour and/or shape characteristics of adjacent blocks match is determined by a match check. This check may be carried out for the whole gameboard 100 where there are blocks. All blocks on the game board may be match checked against the blocks immediately adjacent to them, for example when controlling a cascade effect between player moves. For each player move, only the block(s) which experienced the user input and/or the blocks immediately adjacent to said block are match checked against the blocks immediately adjacent to them. When multiple blocks are detected to have matching characteristics, a group of blocks is formed such that even blocks which are not directly adjacent to each other are included in the same group as long as they are connected in an adjacent manner via other blocks which also possess the same matching characteristic. In some embodiments, these groups of matching adjacent blocks may have to all be connected in one direction, i.e. they may have to be either vertically or horizontally connected. The match check is implemented after the player selects the two blocks to switch tile locations.

Figure 4:
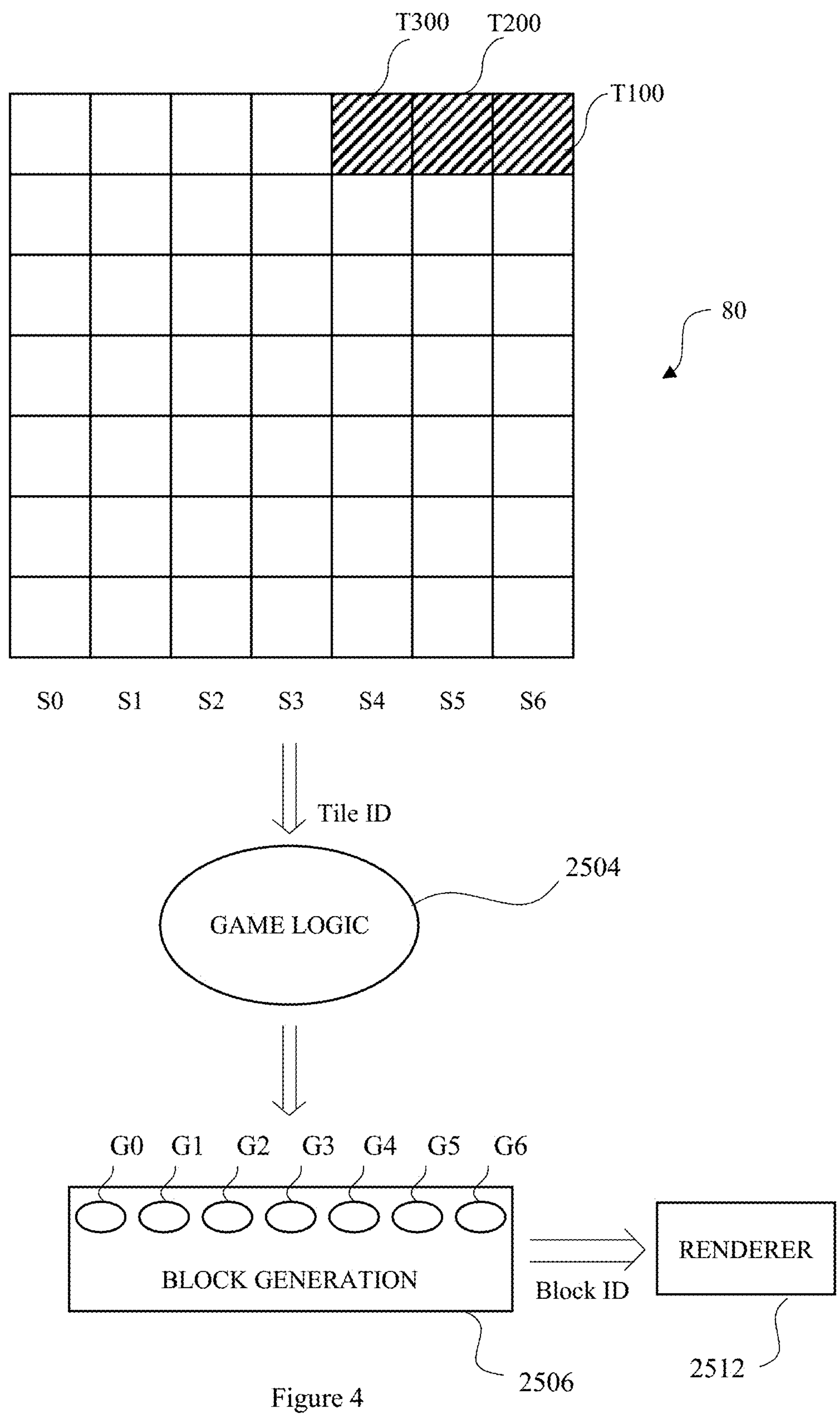
FIG. 4 is a schematic block diagram illustrating a refill process.

FIG. 4 is a highly schematic block diagram illustrating how gameboards are rendered visible to the user through a refill process. In the described embodiment, the refill process is set to random. In fact, the random refill process may be pseudorandom. Each game level has an initial gameboard which is a layout of tiles, each tile having a tile attribute in the initial layout. FIG. 4 shows a tile layout in the form of a grid 80. This tile grid 80 shows an array of tiles arranged in rows and columns. In order to render a game board on a display, each tile is associated with a block to be rendered at that tile location. The nature of the block, that is, for example, if the block contains a blocker or is playable (a normal game element), is determined by the tile attribute. Note that the nature of a block differs from a game element type or characteristic—a block may have the nature of 'normal' which may be fulfilled by interactive game elements of any type. The grid 80 is organised in sets S0 to S6. In this embodiment, each set represents a column of tiles in the array. However, sets may be organised in any appropriate manner. For example, they could be organised in rows or grids of tiles.

Shown in the tile grid 80 are three tiles T100, T200 and T300 which represent tiles where blocks may need to be spawned to replenish the gameboard. Replacement blocks are spawned in tiles that have an attribute associating them with playable (user interactable) blocks. A new block is spawned into effect at an entry point of the set. For convenience, the endmost tile (in this case T100) can be considered the entry point for S6. However, any entry point for a set can be defined, and the precise entry point may depend on the orientation or shape of the set. Blocks are spawned into sets at their respective entry points. If the tile below the entry point is vacant, the spawned block is moved down to that tile and then a further block is spawned above it at the entry point. Note that sets may be of different configurations and spawned blocks may be moved to vacant tiles according to different refill physics.

The game includes block generation logic 2506 which comprises a plurality of deterministic game element generating algorithms labelled G0 to G6. Each set is associated with a respective game element generating algorithm which spawns the new game element in a deterministic manner for its associated set. Game logic 2504 receives a tile identifier indicating a tile into which a block is to be spawned. That is, the tile identifier indicates the set in which the tile belongs, and enables the entry point of the set to be indicated. This tile identifier enables the appropriate algorithm to be activated, and a block identifier is generated by that algorithm to a renderer 2512 which controls a display 1318 on which the game board is presented to cause that block to be inserted at the entry point. Within each set the process may be entirely deterministic. That is, blocks are provided in a predetermined sequence into the set, and moved through the set in a predetermined way. That sequence may be the same for all sets, or each set may have a different sequence. Alternatively, the blocks may be spawned in a random sequence. Randomly spawned blocks will still move through the set in a predetermined way, as dictated by the refill physics.

Each generator G0 to G6 can be controlled with a respective seed which then causes a pseudo-random sequence of blocks to be generated based on that seed.

The gameboard 100 used in gameplay is defined by the tile grid 80. A tile is rendered at a location and may support a block or have another quality e.g. a hole or blocker. Each tile has its own unique ID associated with it. Data about the game elements occupying each tile of the grid are stored in association with the name, or ID, of the tile. This data may be stored in, for example, a tile database 1603 (see FIG. 15). When blocks are removed from the tile grid 80, tile refill occurs and the blocks located at the tiles affected by the refill process change. The data stored in the tile database is updated to represent the locations of elements on the grid 80 after refill.

Holes in the grid show a background and are not valid game board areas. That is, there are no tiles at the locations of the holes. Alternatively, there may be tiles at the locations of the holes in the grid 80, but the attribute of these tiles may be holes, and their attribute remains unchanged through game play. Blocks cannot occupy holes in the gameboard, but can fall through them. The shape of the grid may vary.

The following sections will refer to a game with a switcher mechanic. The ideas explained may also be implemented for games with other mechanics. Such games are implemented on a gameboard 100 comprising a grid of tiles with fixed locations.

To exemplify the invention, one particular game will now be described. It will be evident that the features described herein may be applied in many different games.

In a version of the match-3 switcher game Candy Crush Soda Saga™, some tiles may have an 'attained' background appearance which differs from a 'standard' background appearance. The attained background appearance herein is referred to as "jam". It may have a shiny appearance, to distinguish it from a matt appearance of a standard background.

Jam is a tile quality or characteristic (background) that lies under the normal Candy Crush Soda Saga™ game objects or candies. The user device 240 may comprise a processor 1304 which is configured to implement the generation and migration of jam elements on the gameboard. The processor 1304 is configured by the computer game to generate 'jam' in certain game circumstances in association with particular tiles and then controls it to move away from those tiles, if possible, in a direction determined by jam physics. It is generated when a match is made involving a tile which already has jam, and remains on the game board when the matched candies disappears. It is also generated according to the consequences of making matches with special candies. The area of generation of jam (the number of tiles involved) depends upon which type of special candy is involved. The processor 1304 is configured by the computer game to cause the jam to migrate after is has been generated by moving to a target location elsewhere on the game board. The movement of the jam on the gameboard is defined by jam physics. The jam moves from its current tile to a next tile until a blocking condition, such as a blocker, is reached, as described later. In this context, "spreading" means that the tiles from which game elements are removed from the gameboard previously of a standard background appearance now have an attained background appearance.

Figure 5:
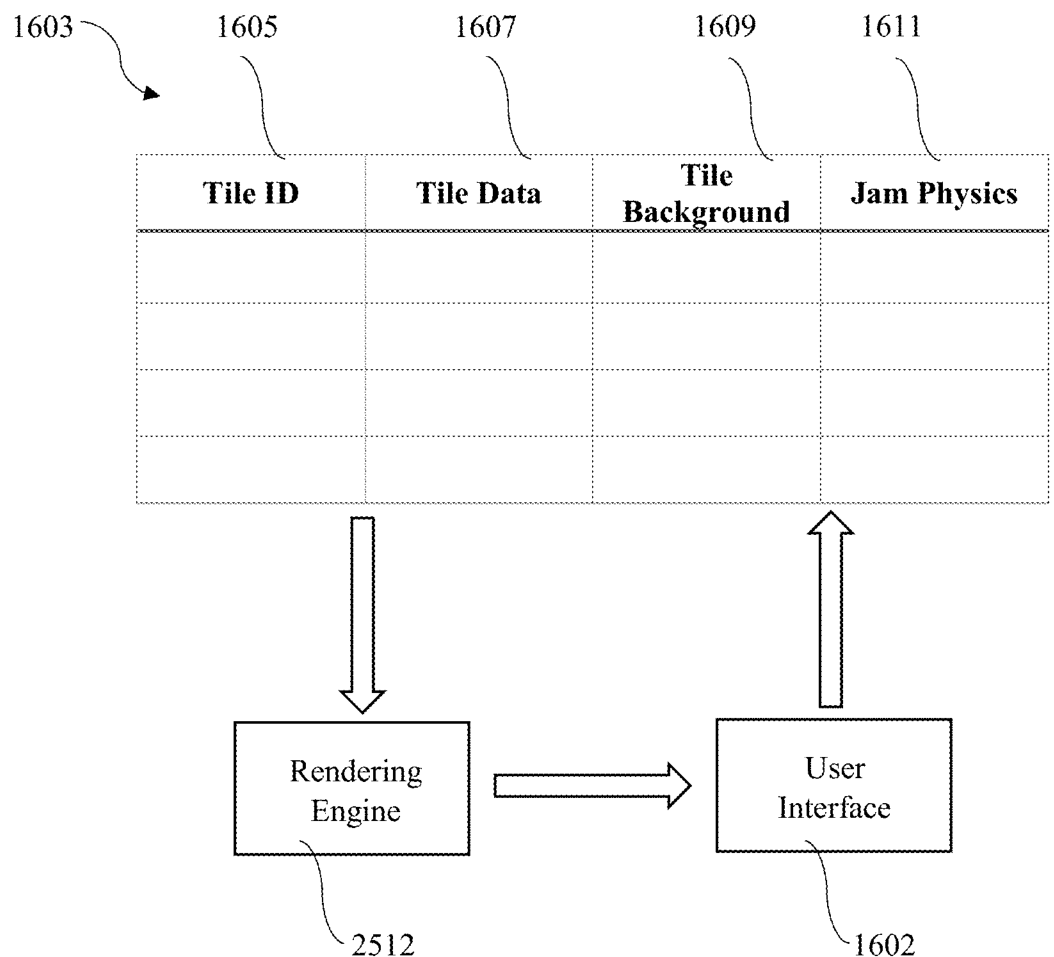
FIG. 5 shows an example database for storing data associated with the tiles of the gameboard.

FIG. 5 illustrates a data structure for managing the tile background appearance, and schematically illustrates the interrelation between the data structure 1603 and a rendering engine 2512 of a graphics controller 1308. The graphics controller 1308 is illustrated in FIG. 2. The data structure 1603 can be held in any suitable storage circuitry, such as illustrated by memory 1306 in FIG. 2. The rendering engine 2512 controls the display on a user interface 1602 which receives the video output from the graphics controller 1308 illustrated in FIG. 2. The user interface 1602 may comprise the input device 1322 and the display 1318. These components may be one entity, such as a touchscreen, or they may be separate entities, such as a screen and a mouse. Alternative embodiments of these devices are discussed earlier with reference to FIG. 2.

As mentioned, activity at the user interface 1602 can cause the background appearance of tiles which are replenished with replacement game elements to alter. The data structure 1603 is responsible for managing how the visualisation of replenished tiles are delivered to the user interface. Each tile has a tile ID 1605. The tile ID 1605 can define the location on the user interface where the tile is to be replenished, that is governed by the vacancy which has been generated due to the removal of game elements from the gameboard. This allows the rendering engine 2512 to generate that tile at an appropriate location on the user interface display 1602. Each tile ID 1605 is associated with tile data 1607 which defines how the tile is to be displayed, that is what game element it has associated with it, and whether it has any "blockers" in addition to or instead of a game element, or any foreground or background. For example, the background can be the attained or standard background, according to a tile characteristic.

A separate field 1609 can hold the tile characteristic which denotes whether the tile has an attained or standard background appearance (jam or not respectively) for ease of managing the decision logic described later. The tile characteristic field 1609 may be separate to the tile data 1607 in the database 1603 or it may be a sub-section of the tile data 1607. If there are multiple possible attained background appearances, the tile characteristic dictates which of these appearances the tile has. The tile background can be modified for a particular tile based on activity at the user interface 1602. Thus, after each player move, the tile identifier, which defines the location at which the tile is to be replenished, can have a different tile characteristic (background) associated with it, as modified by activity at the user interface 1602.

Jam can be considered to be generated as jam elements, each jam element associated with the originating tile. In fact, a jam element is embodied as a tile characteristic to be applied to the tile which is reached by the jam element. These jam elements may be rendered viewable to the user on the gameboard, and may be seen to travel from tile to tile as they move on the gameboard.

Each tile may have jam physics 1611 associated with it. The tile can have another tile characteristic 1609 which indicates jam physics. Jam physics 1611 may be stored as a separate field, as shown in FIG. 5, or it may be a sub-section of the tile data 1607. This jam physics determines how the jam elements on the tile move when moving from that tile. In some embodiments, one or more tiles on the gameboard may not be associated with jam physics 1611. The movement of jam around the gameboard is described later.

Figure 6:
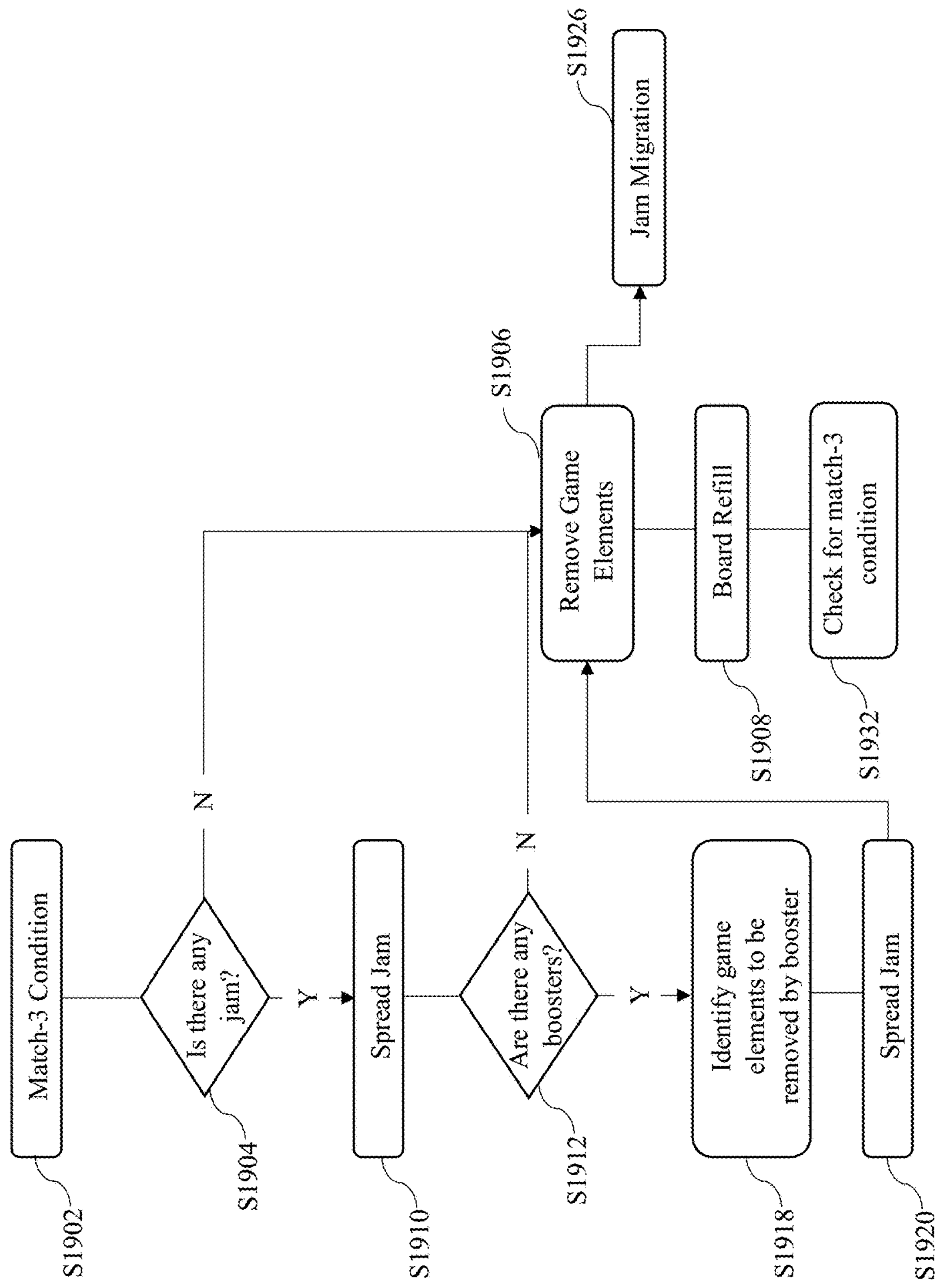
FIG. 6 shows a method for spreading jam.

FIG. 6 shows an example method for spreading the jam. At step S1902, a match-3 condition is identified. That is, the user has interacted with at least one element on the gameboard which has resulted in there being a group of three or more adjacent matching game elements on the gameboard.

At step S1904, the tiles in which the elements in the group of matching elements are located are checked to see if any of the tiles contain jam. In this step, the database 1603 is accessed, and the state of the tile background 1609 corresponding to the tile ID 1605 of the tiles of the matching group are checked. If none of the tiles contain jam, the game elements in the matching group are removed from the gameboard, step S1906, and then gameboard refill occurs, step S1908, as described above.

If, however, there is jam in one of the tiles in the matching group, the jam is spread at step S1910. When jam is spread, the tile characteristics 1609 associated with the tiles in the match are modified, such that the tile characteristics of all of the tiles in the match identify the tiles as having an attained background appearance, which in this case is jam.

At step S1912, the game elements in the matching group are checked to see if any of the elements in the group have special booster characteristics. Examples of booster characteristics include elements which remove all game elements in a row or column, elements which remove all elements of a matching colour, or elements which remove all adjacent elements from the gameboard. An element having special booster characteristics associated with it is referred to as a 'booster'. Again, database 1603 is accessed and the tile data 1607 corresponding to the tile ID 1605 is checked.

If none of the game elements are boosters, the method proceeds to step S1906, where the game elements in the matching group are removed from the gameboard, followed by board refill at step S1908.

If, however, one of the elements is a booster, the elements to be removed by the booster are identified at step S1918, and the jam is spread to these elements at step S1920. As in step S1910, the tile characteristics of the tiles are modified to indicate that the tiles contain jam.

The game elements in the matching group and those to be removed by the booster are removed from the gameboard at step S1906, followed by gameboard refill at step S1908.

After each gameboard refill, S1908, the gameboard is checked for any further match-3 conditions at step S1932. If any match-3 conditions are found, the process repeats, starting again at step S1902.

Once game elements have been removed from the gameboard at step S1906, jam migration occurs at step S1926. Jam migration is described in more detail later. In some cases, the layout of the game elements and jam elements on the gameboard 100 may mean that there is no jam migration at this step, such that the jam elements remain on their current tiles. However, in other cases, at least some of the jam elements will move according to the jam physics of the tiles at which the jam is located.

In the example of FIG. 6, jam migration occurs simultaneously to board refill and checking for another match-3 condition. It will be appreciated that these steps may occur, instead, in sequence. It will also be appreciated that the step of identifying boosters, S1912, may occur before checking for jam, such that all elements to be removed from the gameboard are identified before jam is spread. In some embodiments, the game elements may be removed from the gameboard at step S1906 prior to the jam being spread, such that steps S1910 and S1920 are removed from the process and an alternative step is introduced after S1906 for spreading jam.

In the method of FIG. 6, there may be cases in which a second match-3 condition is found after board refill while the jam is still migrating. If this is the case, the location of the jam elements at the time of the match may be used. For example, if a jam element is migrating through a tile which is involved in a second match-3 condition after gameboard refill, the jam element will be taken to be at that tile location, so the jam is spread to the other elements in the group of matching adjacent elements, and any other elements on the gameboard which will be removed by the group of matching elements, for example, by boosters, even if this tile is nether the initial nor final tile location of the jam elements for the game move in question.

In some embodiments, the jam is not rendered visible to the user when it is first spread. That is, the tile characteristic is modified such that the tile contains jam, but the jam may not be visible on the gameboard. Jam may only be visible to the user after, for example, a pre-defined time from when it was spread, or once the jam has settled at a tile location after jam migration, or at the end of the game move.

Some examples of spreading jam prior to jam migration will now be described.

FIGS. 7-10 show a gameboard as it may be rendered to a user on the display of his computer device. The board has been reduced to a 5×5 grid for illustrative purposes. In this embodiment the jam is presented as a shading of the tile(s) of which it is an attained background appearance.

Figure 7A:
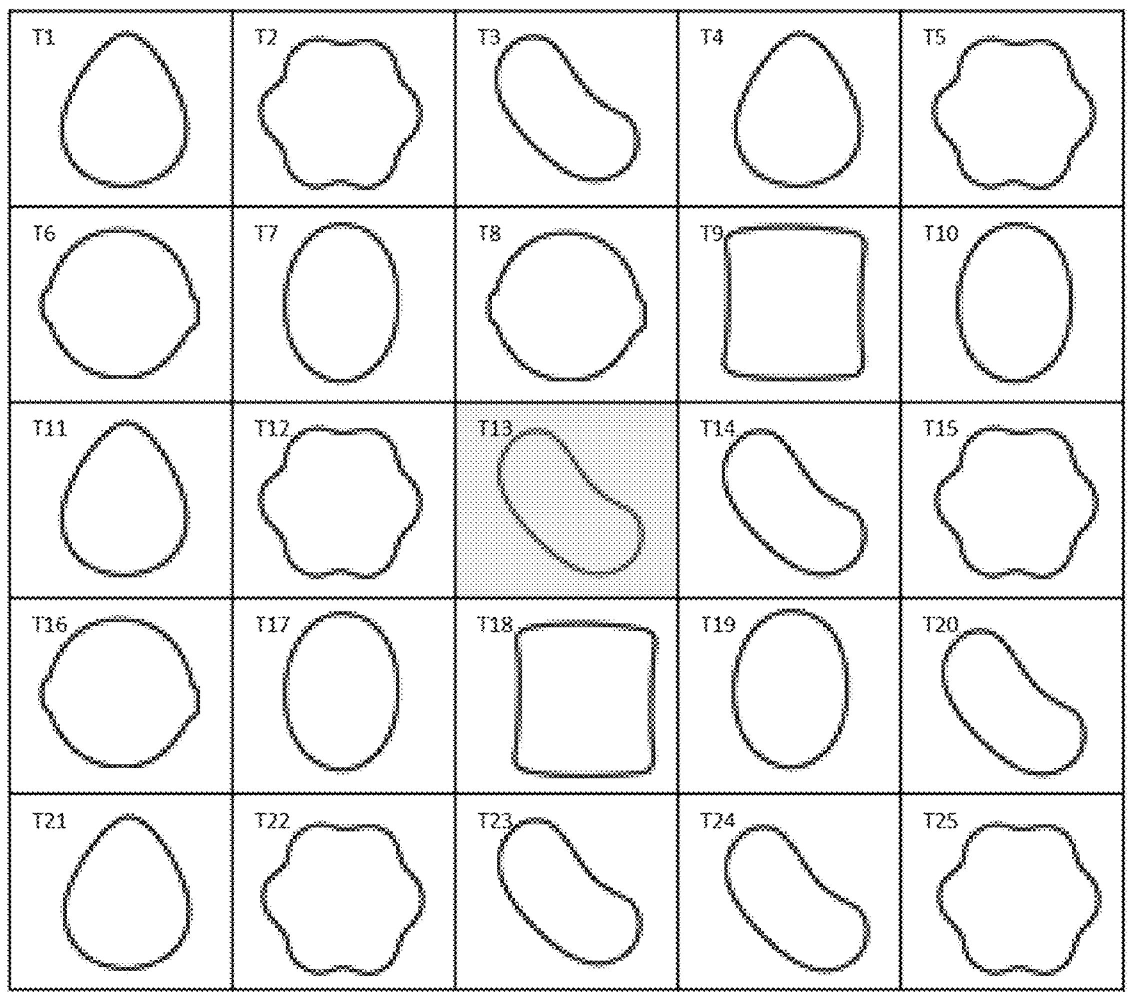
FIGS. 7A-7D, 8A-8C, 9A-9E, and 10A-10D show examples of spreading jam during game play.

FIG. 7A shows a section of a game board. Tile T13 contains a kidney bean shaped candy, and is also occupied by the jam.

Figure 7B:
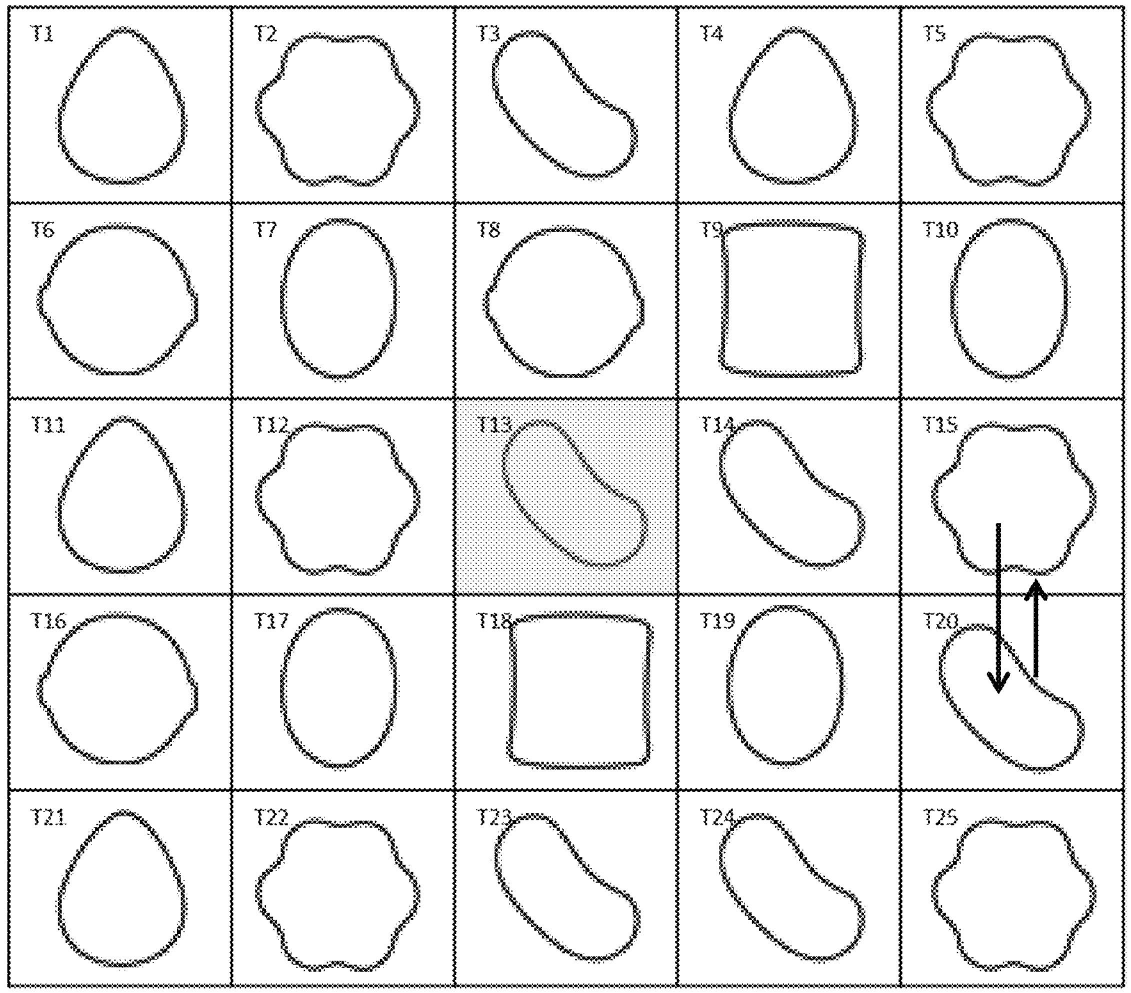

FIG. 7B shows the candy of tile T15 being dragged to tile T20. This will create a match-3 in the tiles T13, T14, and T15.

Figure 7C:
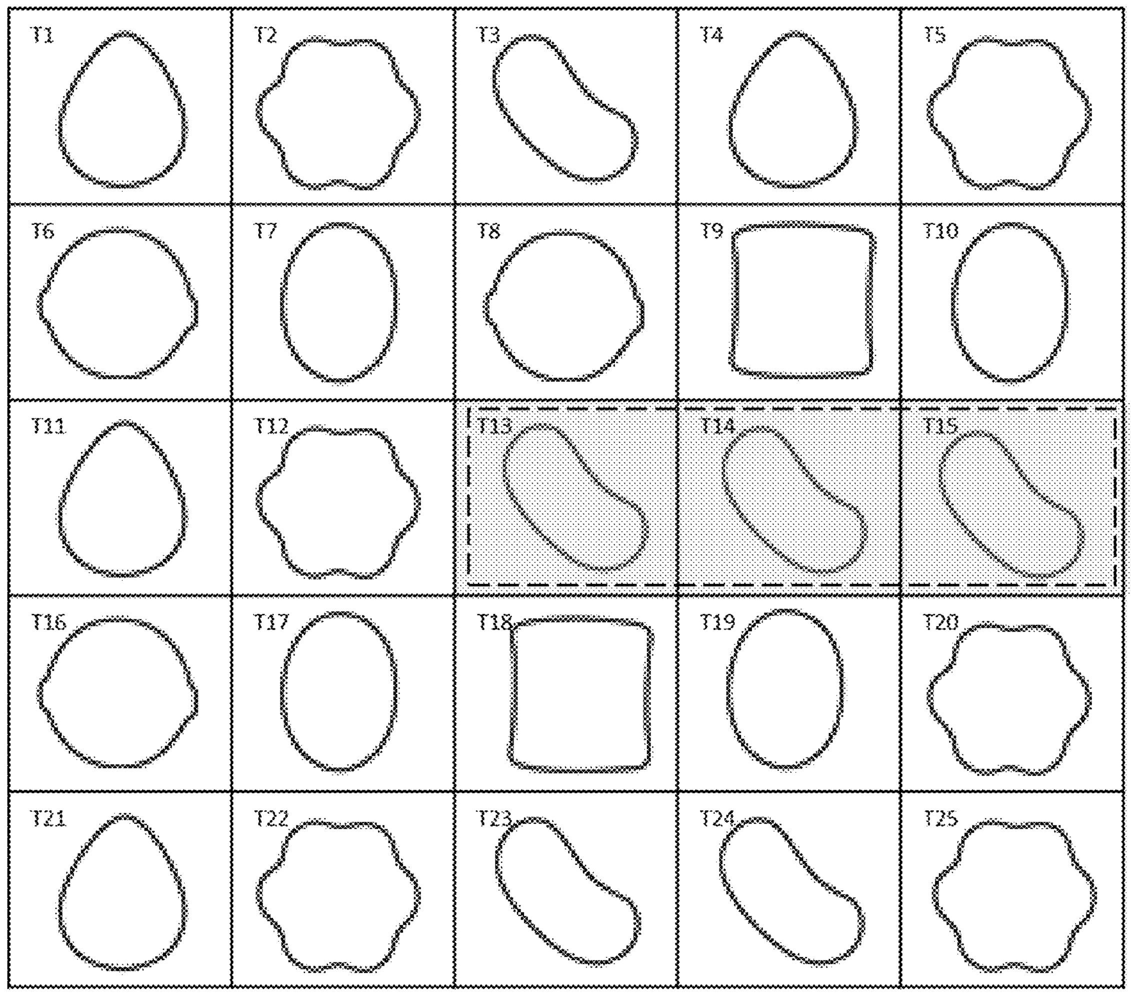

FIG. 7C shows the match-3 of tiles T13, T14 and T15 surrounded by a dashed line. The jam has spread so that it occupies tiles T14 and T15 as well as T15. Between tiles there are no gaps in the jam, it is continuous.

Figure 7D:
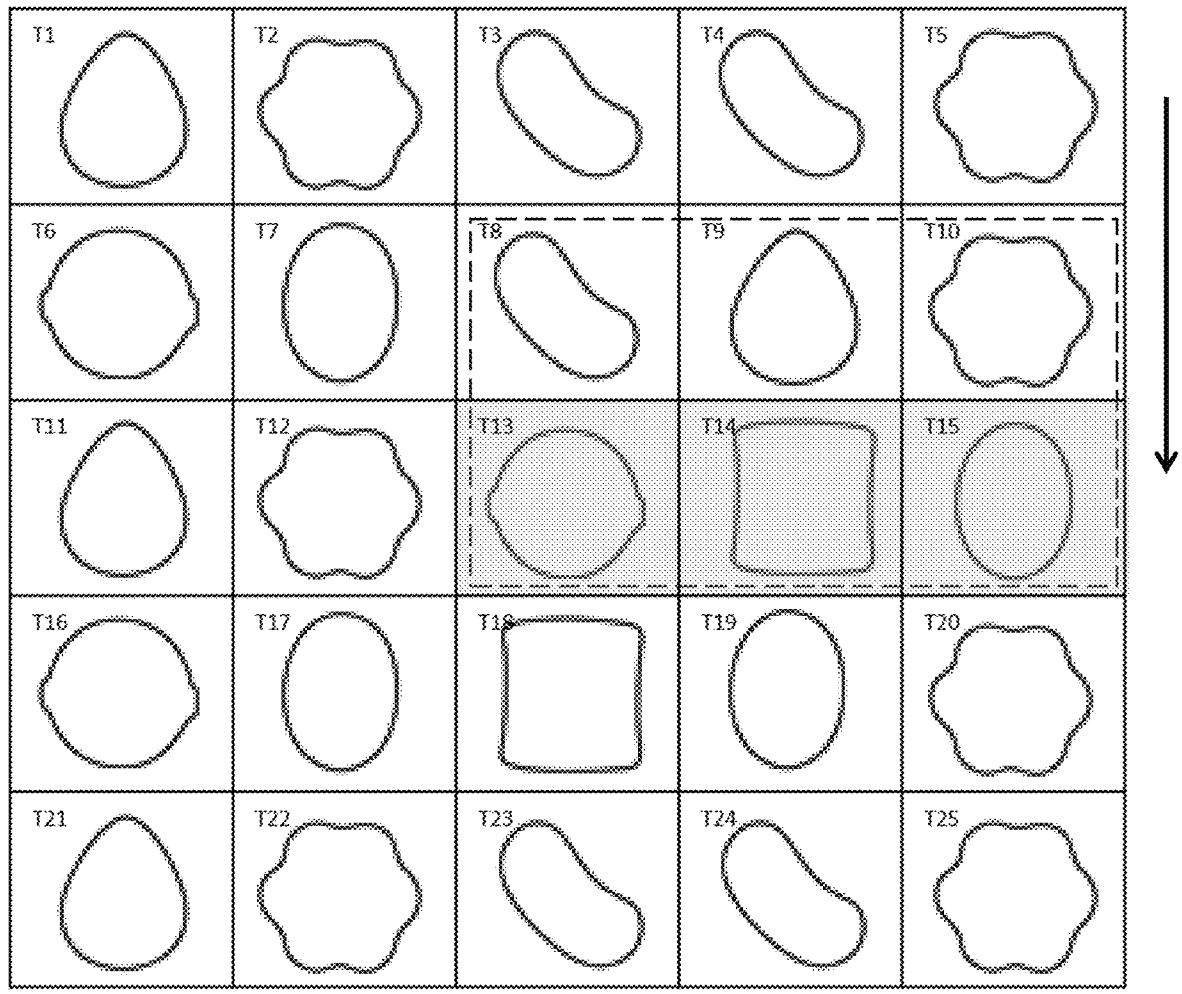

FIG. 7D shows the game board after the match-3 of kidney bean shape candies have been cleared from tiles T13, T14, and T15, and the board has been refilled from above. The six candies previously in tiles T3, T4, T5, T8, T9, and T10 have moved downwards, in the direction of the arrow, to tiles T8, T9, T10, T13, T14, and T15 respectively. The jam occupying tiles T13, T14, and T15 is not removed by the match, but rather remains on the gameboard.

Figure 8A:
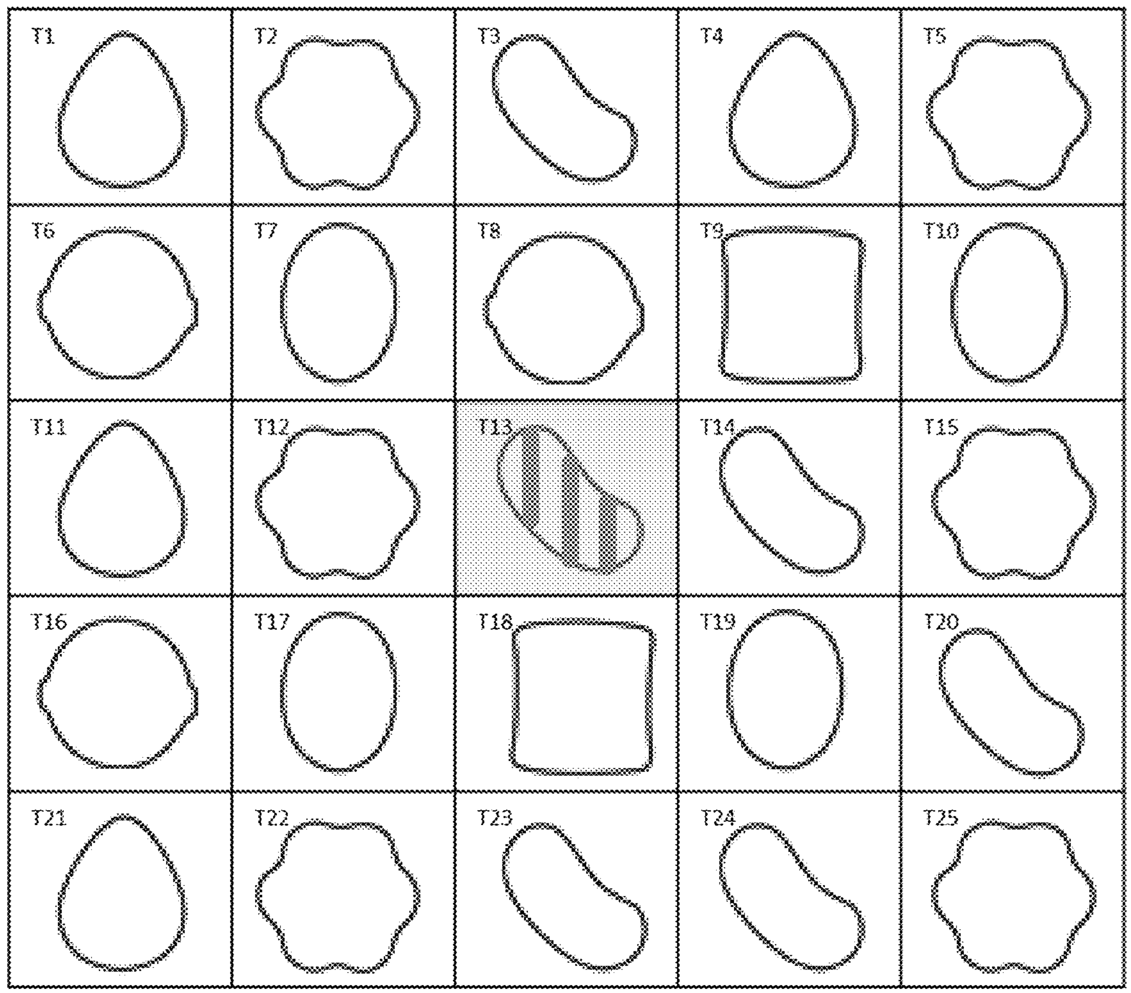

FIG. 8A shows a section of the game board. The tile T13 contains a kidney bean shaped special candy, and is also occupied by the Jam. This special candy is a vertically striped candy. When it's involved in a match the result is a line blast. The line blast causes all the candies in the same column as the striped candy, to be removed from the board. Starting from the striped candy, and moving outward towards the column ends.

Figure 8B:
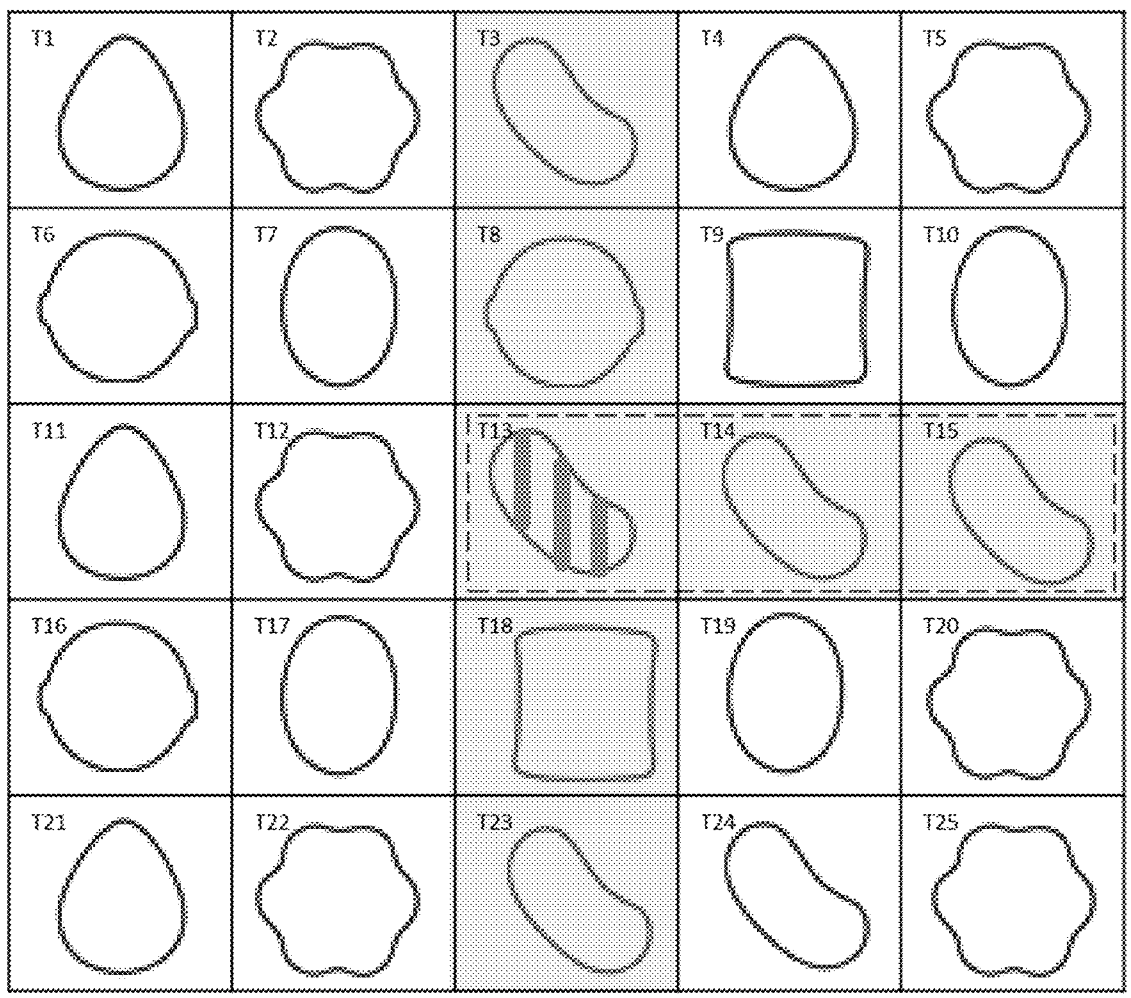

FIG. 8B shows the game board after the same game objects are moved as shown in FIG. 7B. The jam is spread across the tiles involved directly in the match, as shown in FIG. 7C, as well as along the entire column containing the special candy.

Figure 8C:
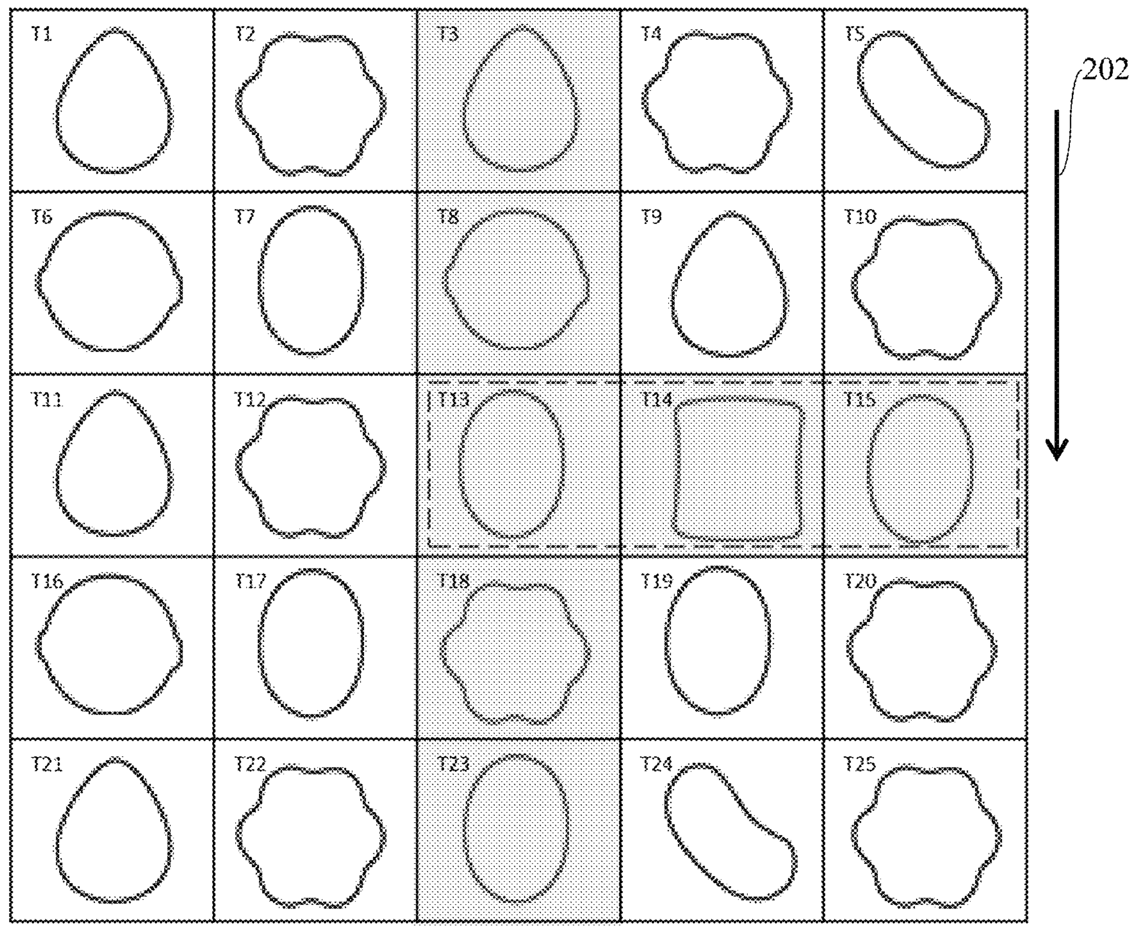

FIG. 8C shows the game board after the matched candies, and those involved in the line blast, are removed, and the board is refilled. The candies in tiles T4, T5, T9, and T10 move downwards into tiles T9, T10, T14 and T15 respectively, shown by the arrow 202.

Figure 9A:
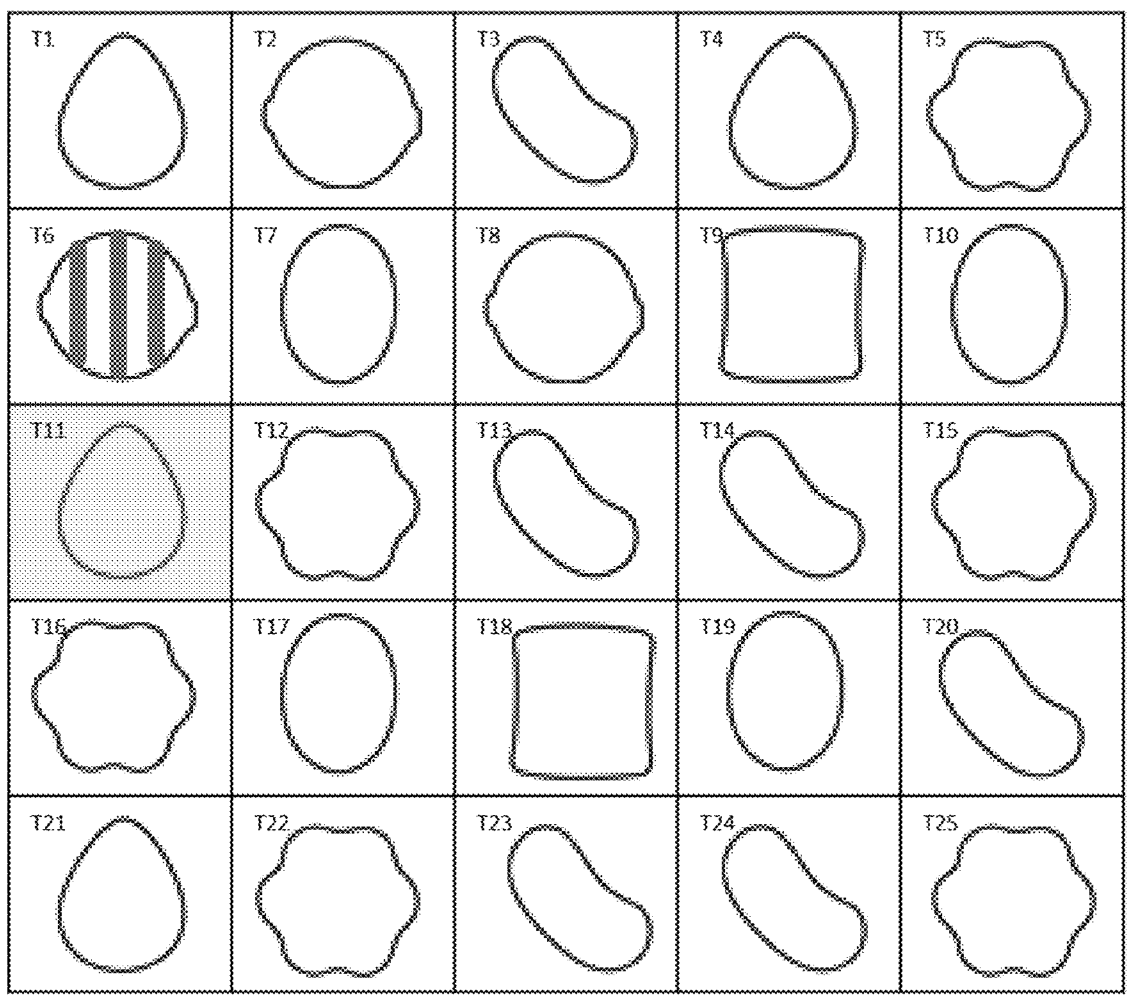

FIG. 9A shows a section of the game board. Tile T6 contains a special vertically striped spherical candy. Tile T11 contains a teardrop shaped candy and is occupied by jam.

Figure 9B:
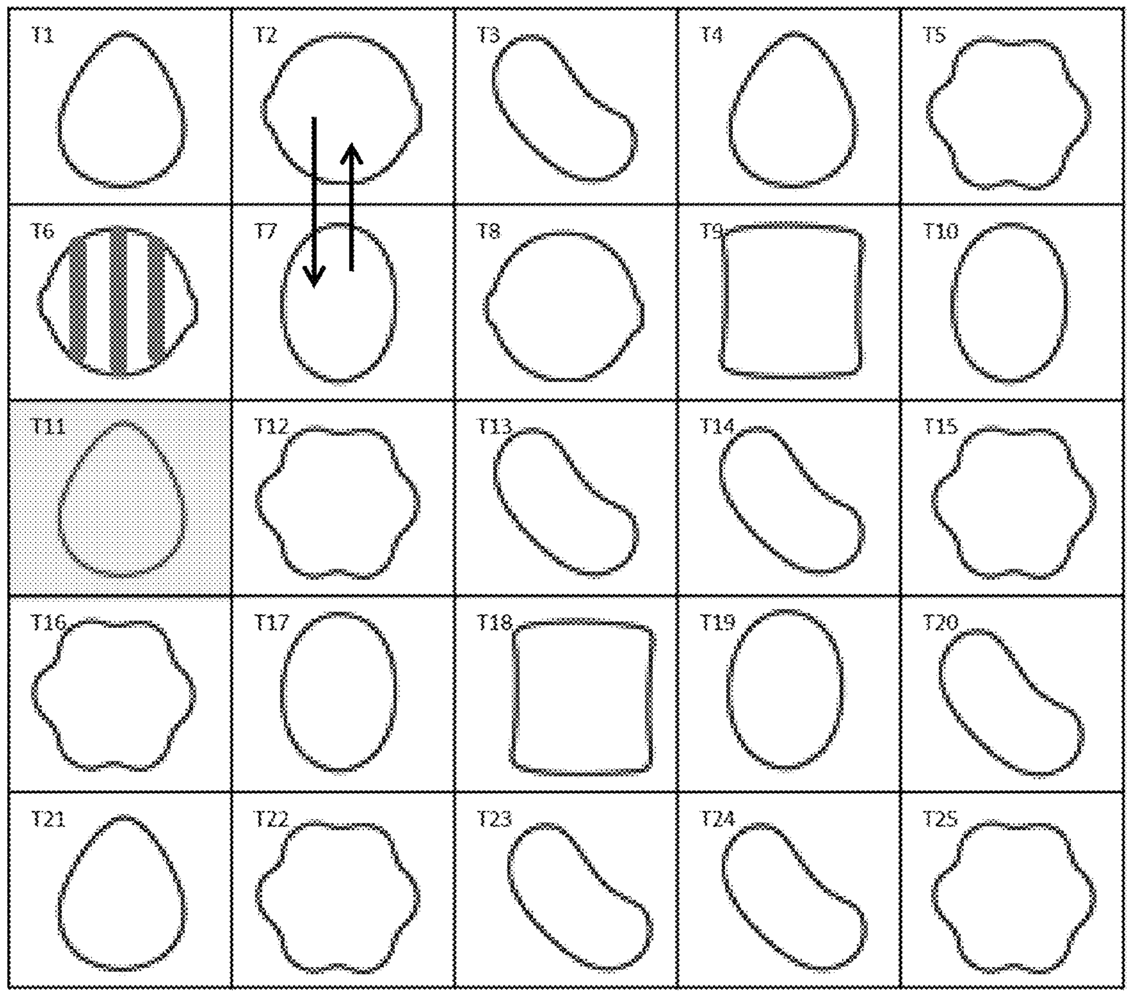

FIG. 9B shows a spherical candy in tile T2 being dragged to tile T7. This will create a match-3 in the tiles T6, T7, and T8.

Figure 9C:
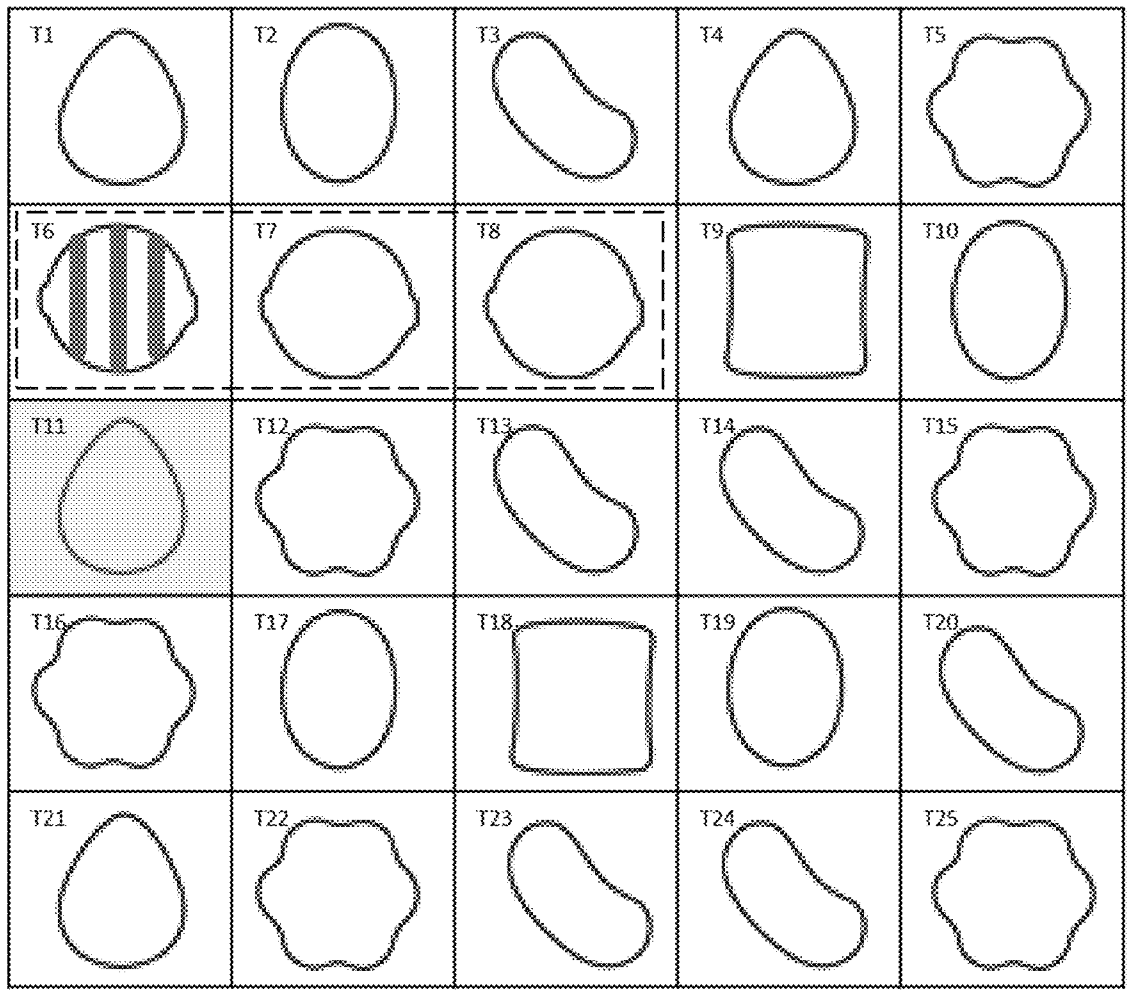

FIG. 9C shows the match-3 of tiles T6, T7 and T8 surrounded by a dashed line. The jam does not occupy any tiles involved in the match-3. It therefore does not spread to occupy these tiles.

Figure 9D:
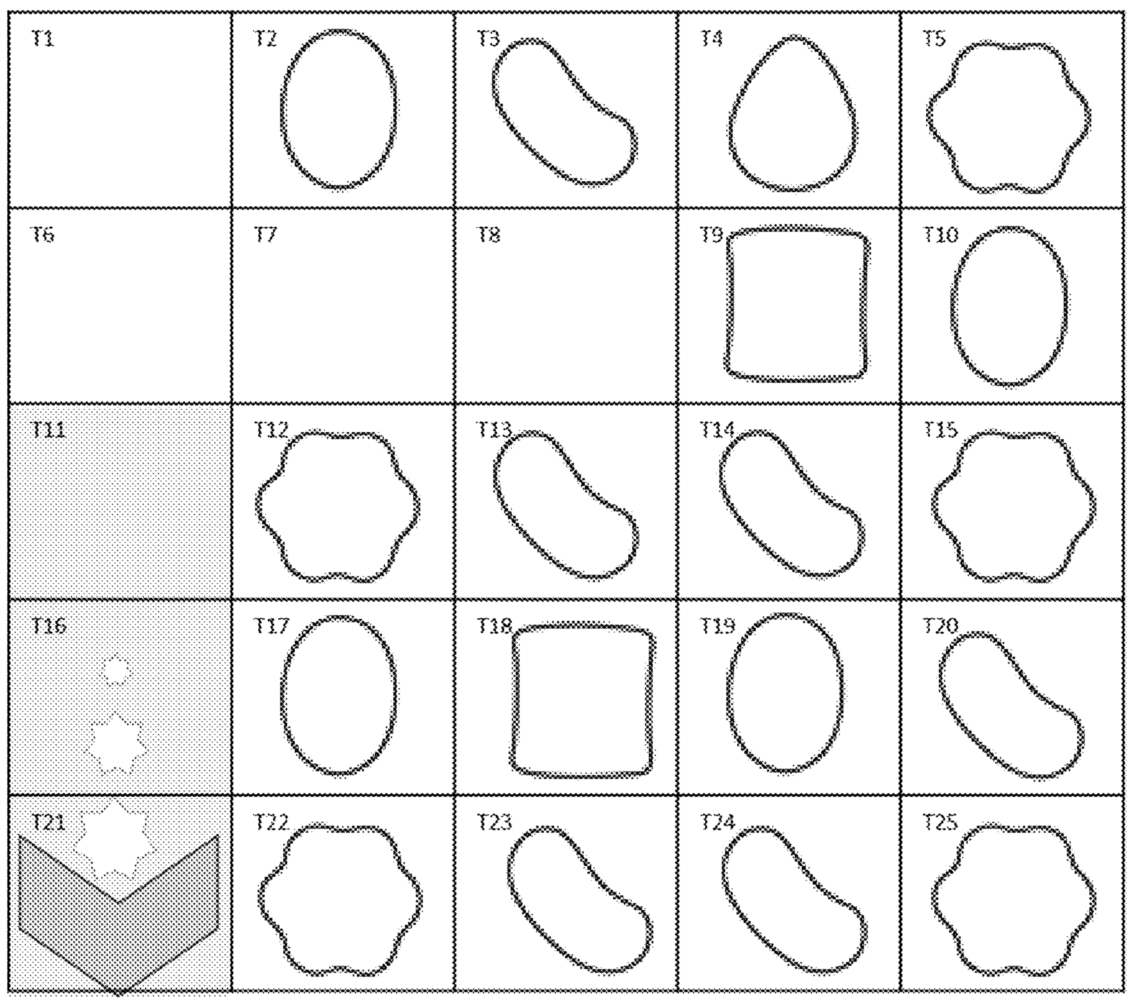

FIG. 9D shows the board after the match-3 in tiles T6, T7, and T8 has been removed from the board. The special candy in tile T6 is directly involved in the match-3, and as such causes a line blast in that column. As the line blast moves from tile T6, downwards towards tile T21, it encounters tile T11. Tile T11 is occupied by jam. The line blast spreads this jam, starting from tile T11 downwards so that it subsequently also occupies tiles T16 and T21.

Figure 9E:
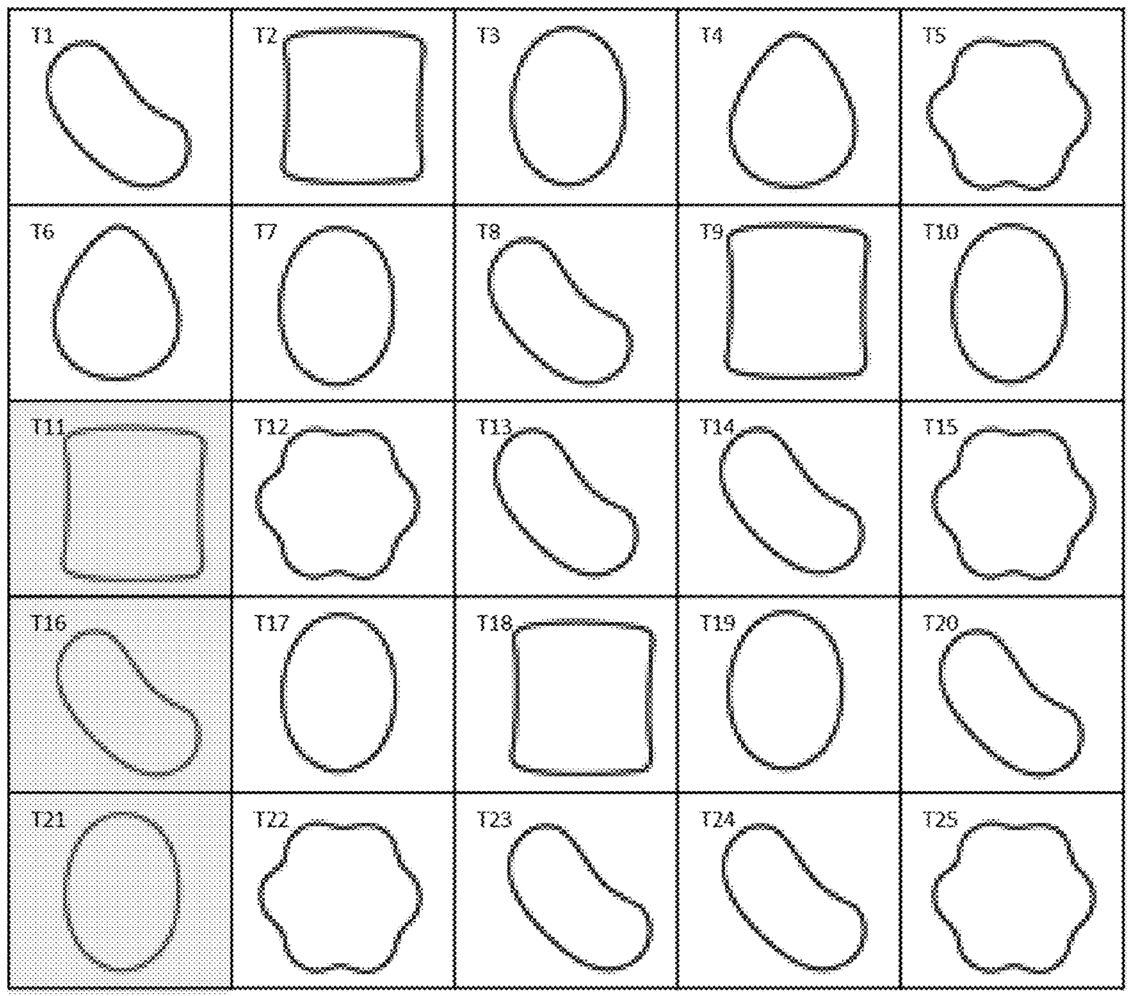

FIG. 9E shows the board after it has been refilled from above, and the candies previously in tiles T2 and T3 have moved downwards to tiles T7 and T8. The jam now in tiles T11, T16, and T21 continues to occupy those tiles when the candies involved in the line blast are removed from the gameboard.

Figure 10A:
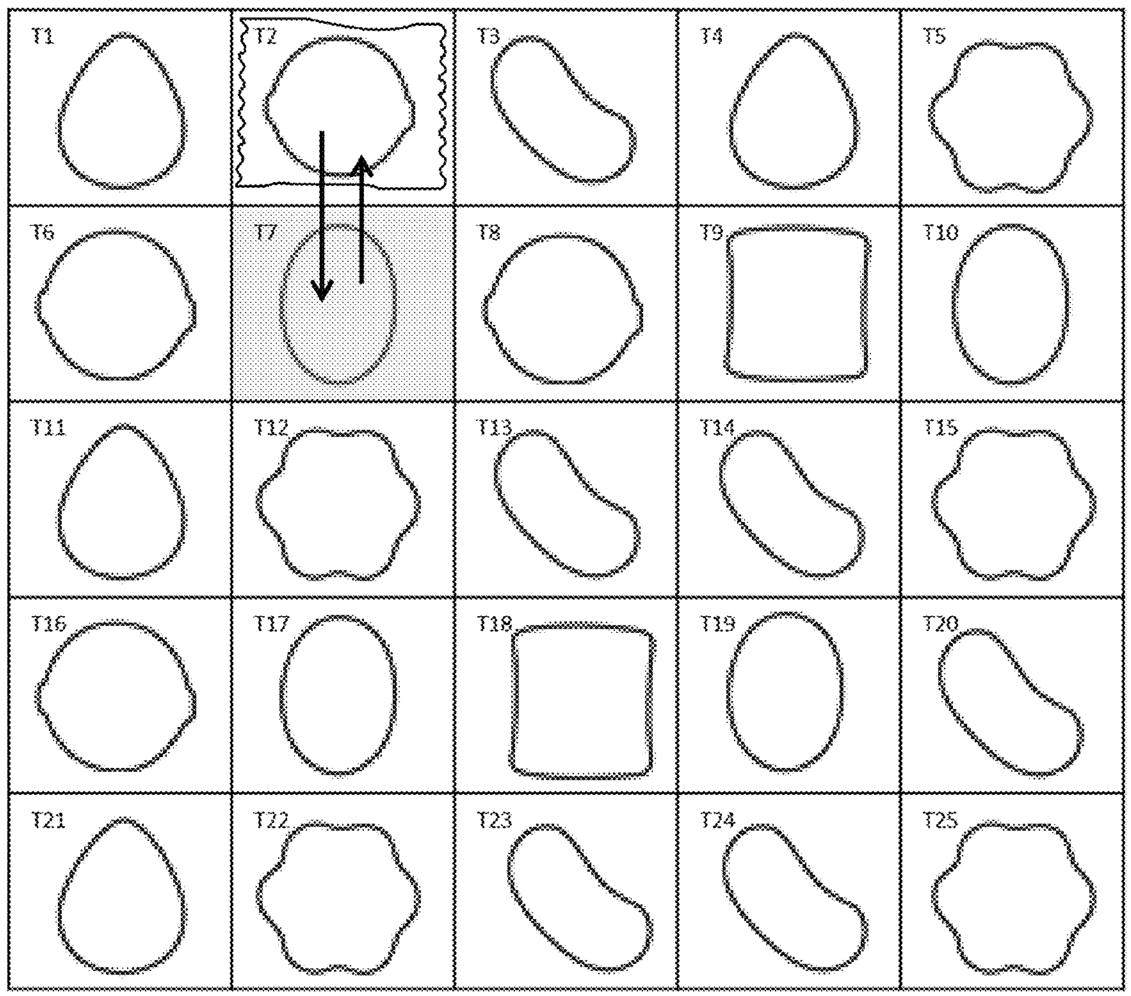

FIG. 10A shows a section of a game board. Tile T7 is occupied by jam. Tile T2 contains a special wrapped candy. Arrows indicate a move where the wrapped candy of tile T2 is dragged to tile T7.

Figure 10B:
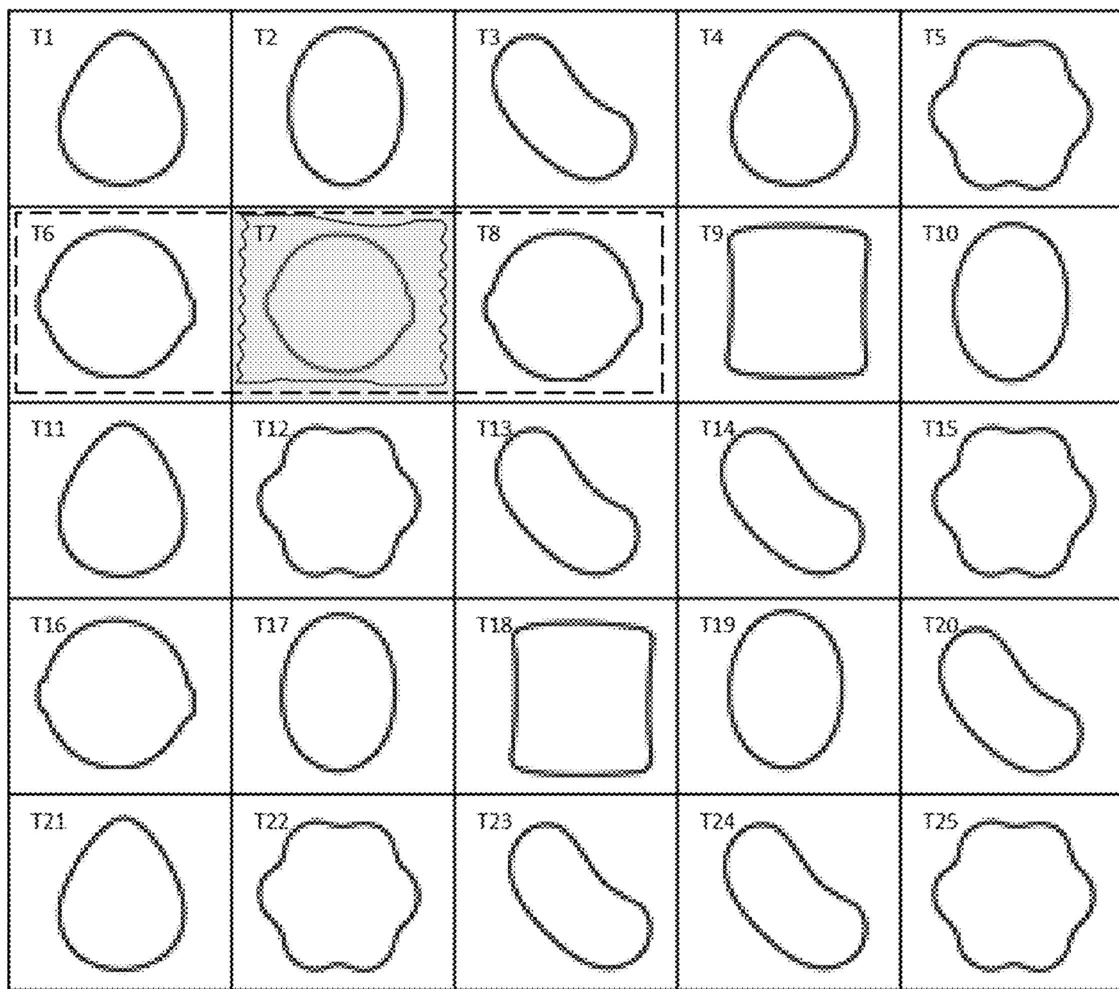

FIG. 10B shows the resulting match-3 in tiles T6, T7 and T8 surrounded by a dashed line. The wrapped candy is now in tile T7, which is also occupied by jam.

Figure 10C:
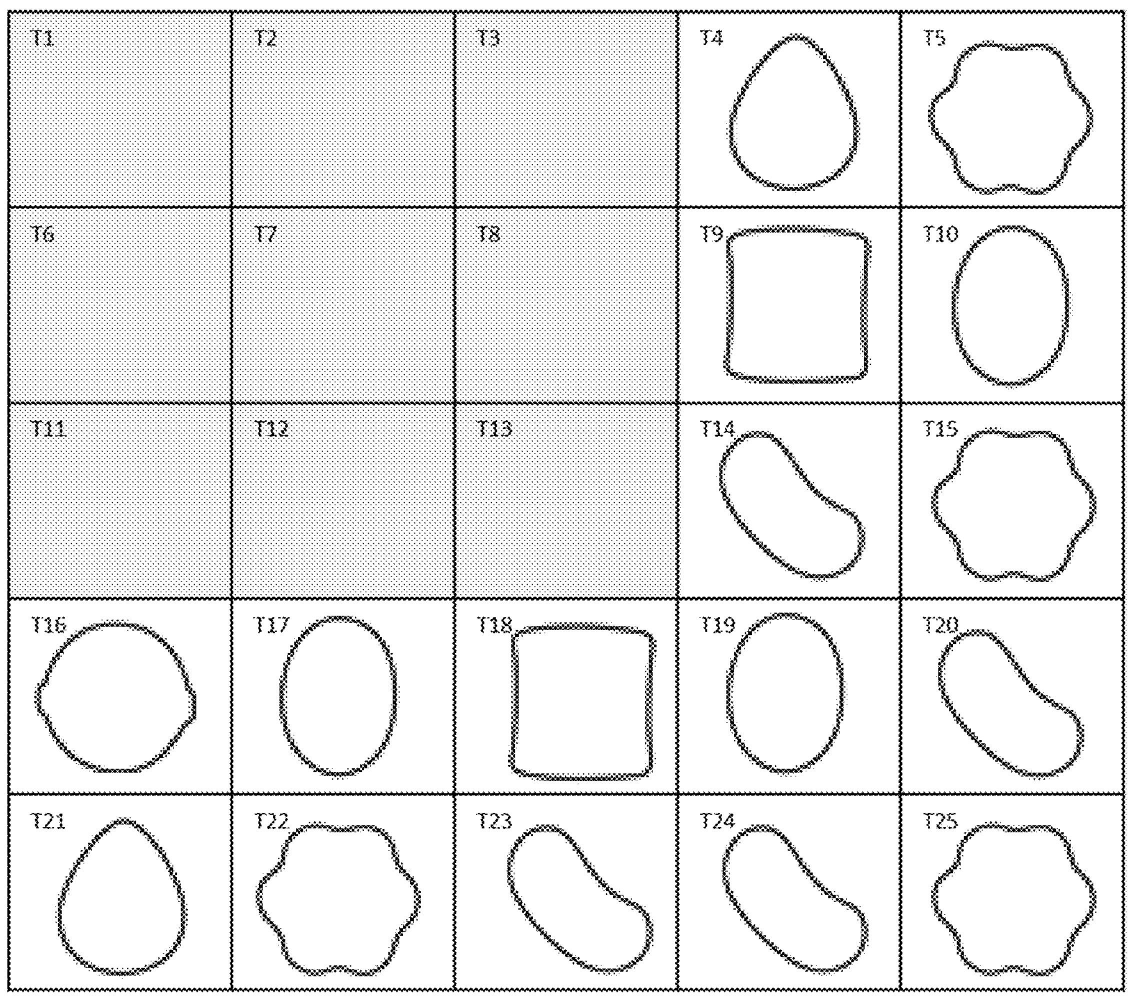

FIG. 10C shows the board after the removal of the candies directly involved in the match-3 from tiles T6, T7, and T8. As a result of the wrapped candy being directly involved in the match-3, the wrapper explodes. All the candies in the blast radius of the wrapped candy are also removed from the game board. This is a 3×3 tile area, centred on the wrapped candy. As the jam occupied the same tile as the wrapped candy upon explosion, the jam is spread to all tiles in the blast radius of the wrapper, as well as the tiles involved in the match-3. The spherical candy that was previously wrapped, remains, and moves downwards to tile T12.

Figure 10D:
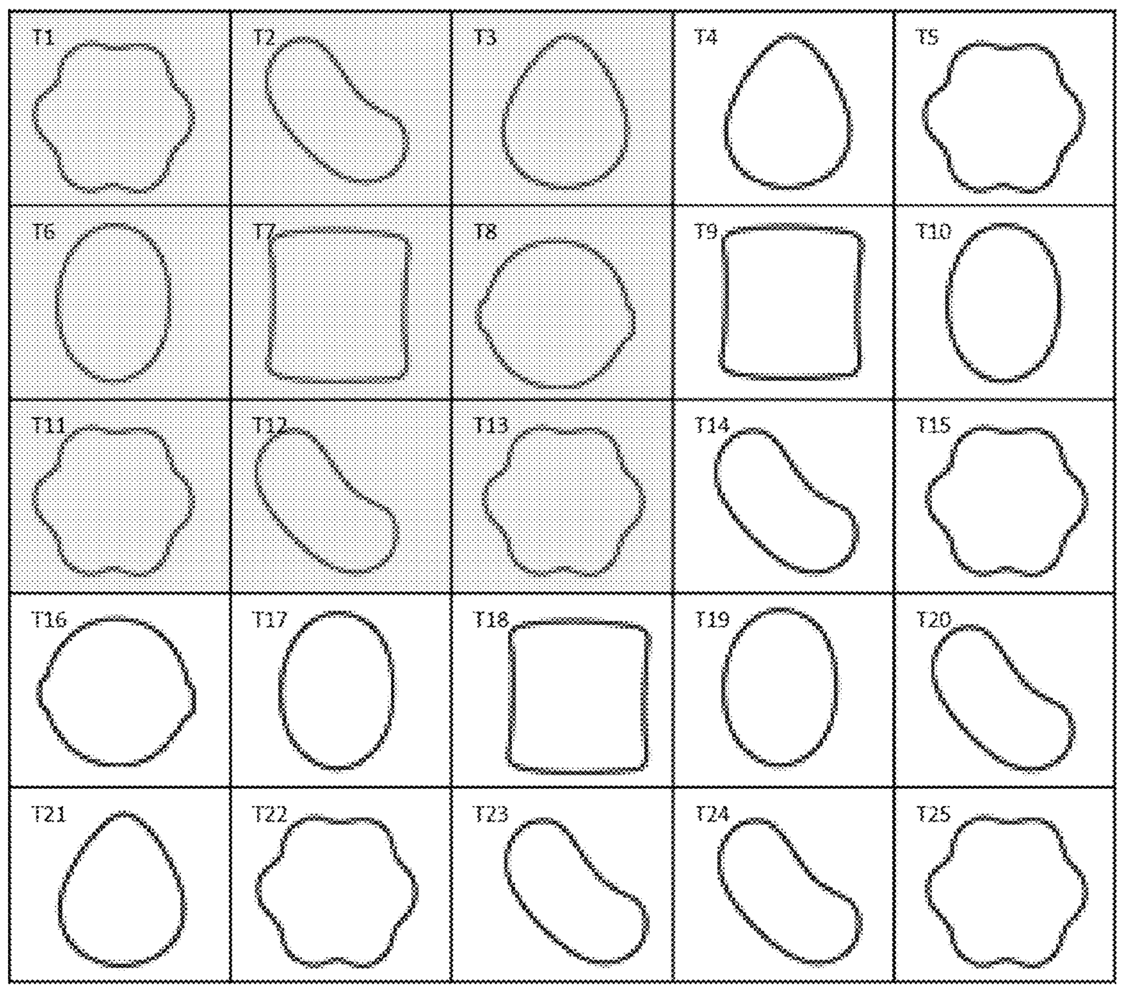

FIG. 10D shows the game board after being refilled from above, as shown by the arrow. The jam remains on the gameboard, and continues to occupy tiles T1, T2, T3, T6, T7, T8, T11, T12, and T13 until jam migration occurs, as described later.

The present invention uses the jam spreading mechanic described above, and applies physics to the jam elements such that the jam, once spread, moves from the tile into which it is spread to a next available tile.

Figure 12:
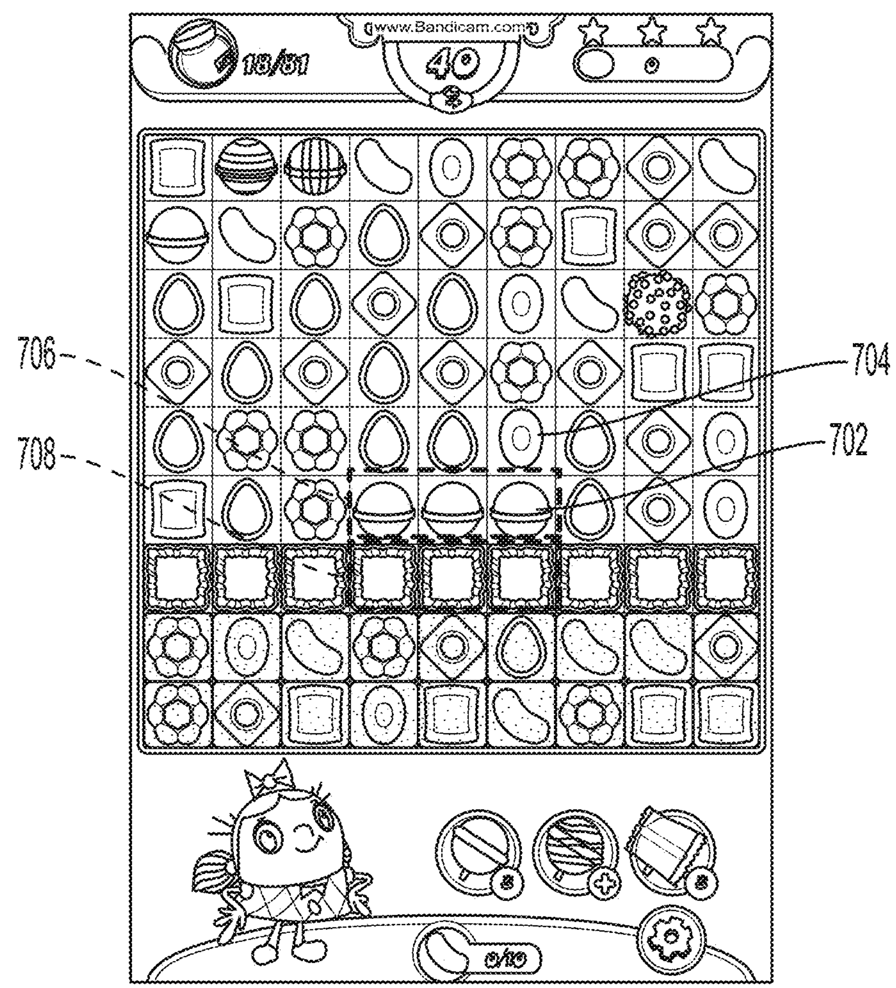

FIG. 12 shows an example of a gameboard 100 in which the jam responds to jam physics applied to it by its current tile. In this example, the jam moves upwards to fill tiles which are not occupied by jam. The physics applied to the jam derives from the tiles. The jam physics gives the effect of jam moving under 'gravity'. In some cases, the 'gravity' is upwards in the direction of the game board. In this example, there are already many tiles which have jam in them, such as tile 602. The other tiles, such as tile 604, do not contain jam. In this embodiment, jam is viewable as a different background colour. In other embodiments, the jam may be viewable as some other different visual indication.

In this example game level, the jam physics, that is, the physics which determines the movement of the jam elements, of each tile on the gameboard 100 is the same, and the direction of gravity, that is the direction in which the jam moves on the gameboard, is upwards. That is, the jam elements are trying to move up the gameboard.

Figure 11:
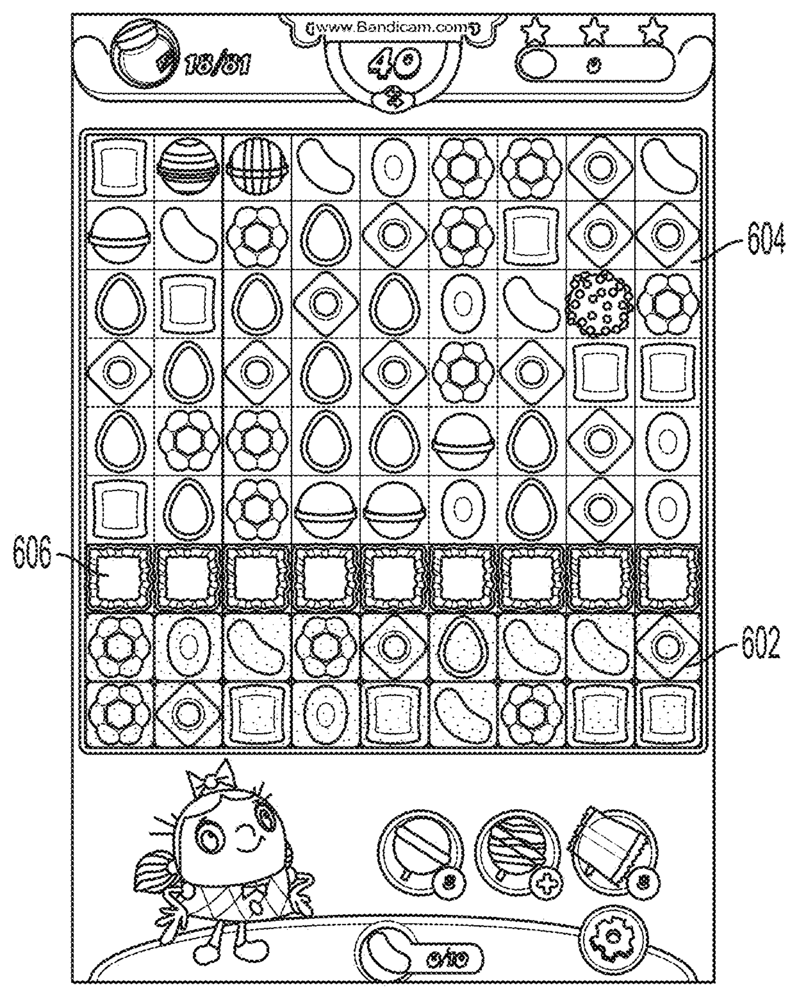
FIGS. 11-13, 14A-14E, and 15A-15B show examples of jam migration.

In FIG. 11, the jam elements are all situated in tiles at the bottom of the gameboard 100. This is because there is a row of special game elements referred to as blockers 606 preventing the migration of the jam. Jam cannot pass through tiles containing blockers 606. Jam also cannot pass through tiles already containing jam. However, jam can move to or through tiles containing candies. Candies are a type of user interactable game element which the user is trying to match in order to remove from the gameboard.

FIG. 12 shows the state of the gameboard 100 after the user has switched the tile locations of a lollipop candy 702 and an oval candy 704 to create a group of adjacent matching lollipop candies 706. In accordance with the game mechanics, the matching group of candies 706 is removed from the gameboard 100. Since this matching group is next to the blocker elements in tile 708, the blockers in tiles 708 are also removed from the gameboard. This creates a gap in the line of blockers 606 such that the jam elements can start to migrate to the top of the gameboard 100.

Figure 13:
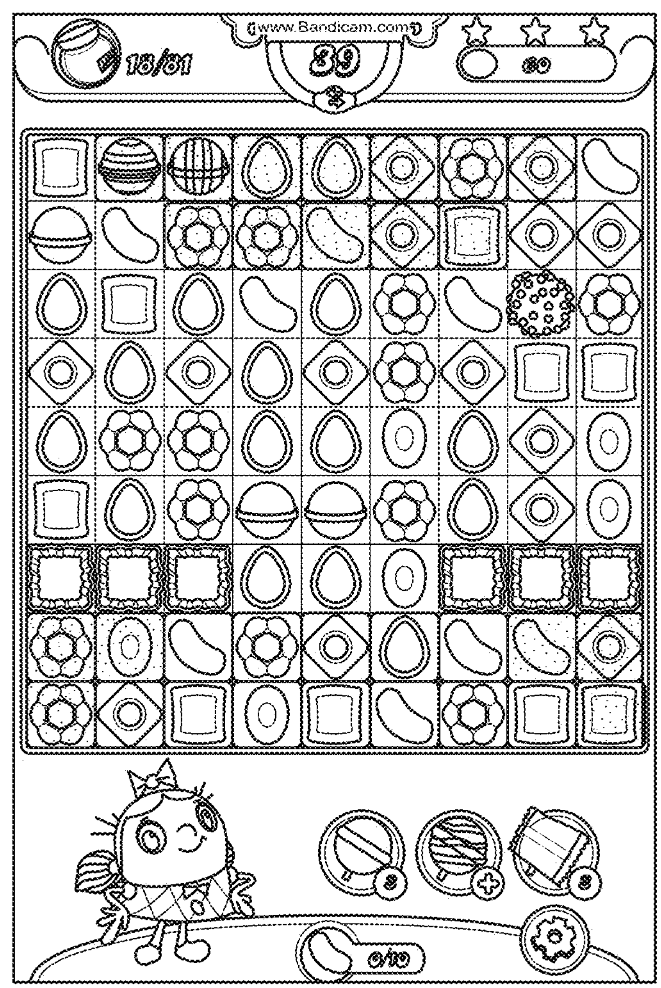

FIG. 13 shows the state of the gameboard after all of the jam elements which can migrate after the removal of the blockers in tiles locations 708 have moved and settled at a tile location. It can be seen that some jam elements remain beneath the remaining blockers. This is because the jam physics of the tiles does not allow the jam elements to move in the direction required for them to pass the blockers.

Jam movement will now be described with reference to FIGS. 14-18. It is assumed that each tile in the examples of FIGS. 14-16 has the same jam physics, such that jam elements move in the same direction relative to the tile they are in irrespective of which tile they are in on the gameboard. The jam physics in these examples is set such that the jam elements aim to move to the top of the gameboard, with the most desirable move being a move to the tile directly above the tile it is located in and the next most desirable move being a move to the tile either left or right of the tile directly above the tile it is currently in.

FIGS. 14A-E show an example of jam elements being created in a match-3 condition and then moving to the top of the gameboard.

Figure 14A:
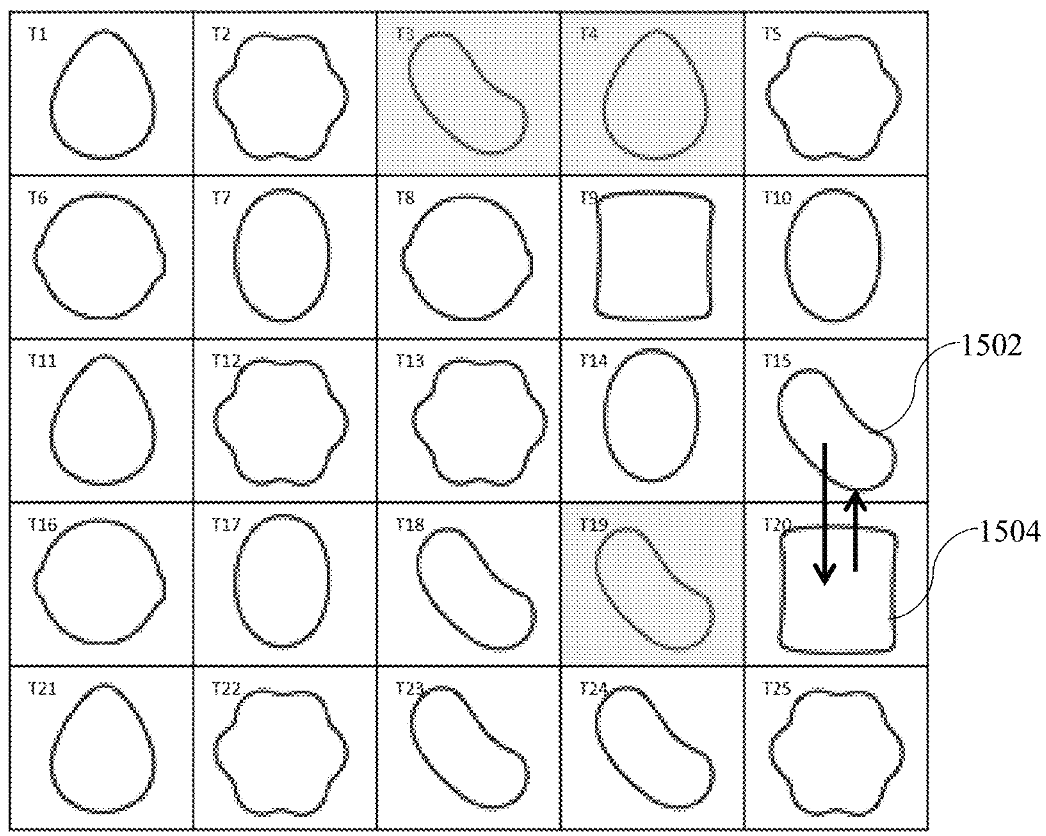
Figure 14B:
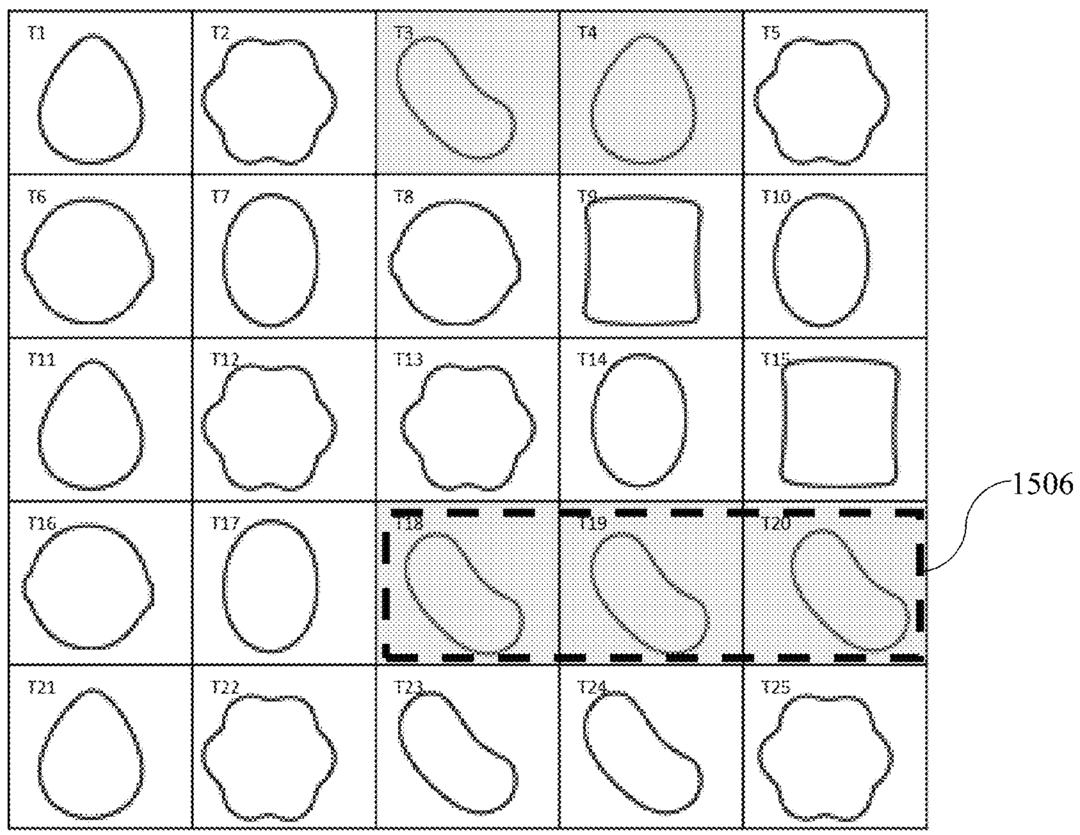
Figure 14C:
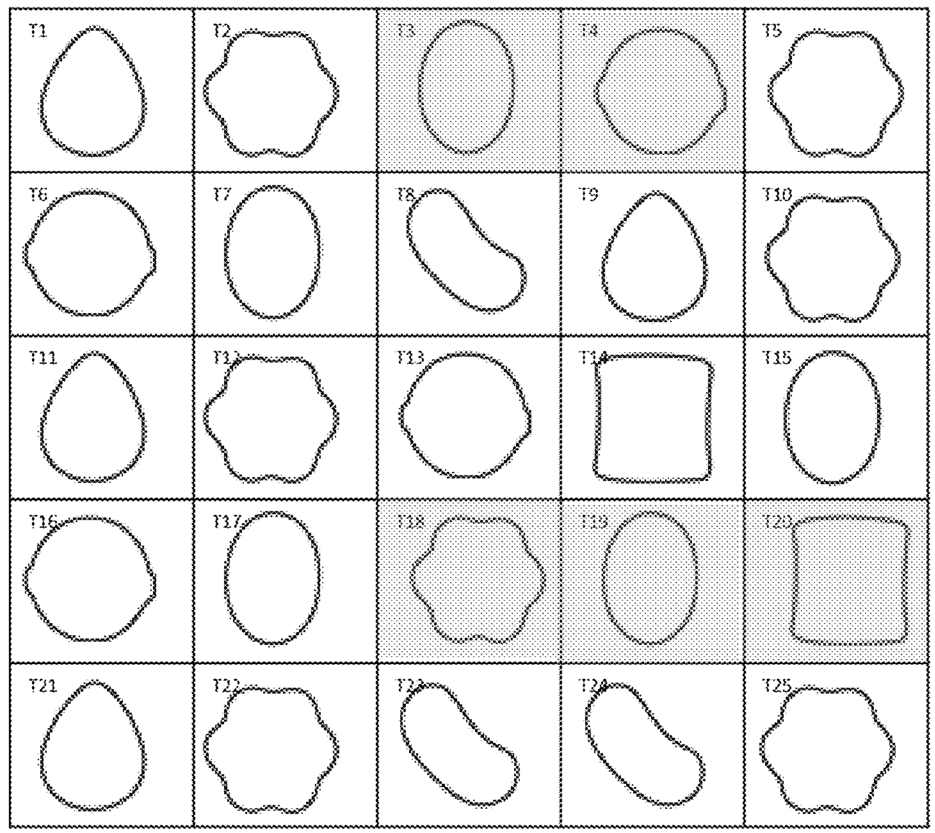

In FIG. 14A, the user switches the tile locations of the jelly bean candy 1502 and the square candy 1504. This creates a group of adjacent matching jelly bean candies 1506, as shown in FIG. 14B. Since one of the candies in the group 1506 is located at a tile which contains jam, the jam spreads to the other tiles in the group. The candies in the group 1506 are removed from the gameboard, and gameboard refill occurs, as shown in FIG. 14C, such that the game elements in the columns from which the candies have been removed fall downwards to fill the empty tiles and new game elements are spawned at the top of the columns, as shown in FIG. 14C.

Figure 16:
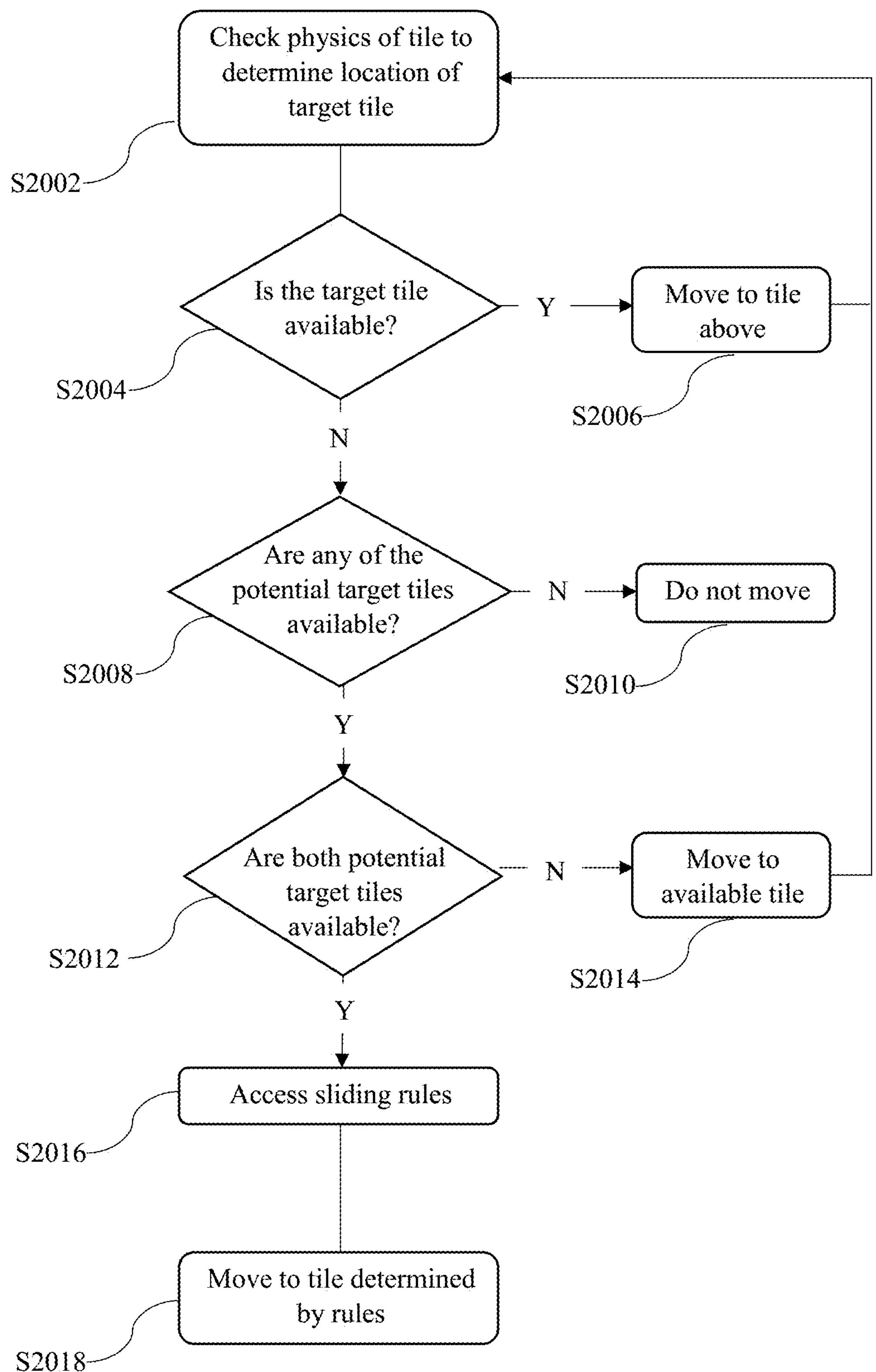
FIG. 16 is a method for moving jam on the gameboard from the perspective of the jam.

As described with reference to FIG. 6, jam migration occurs simultaneously to gameboard refill. For ease of representation in the figures, the movement of the jam is shown to occur after gameboard refill has occurred. FIG. 16 shows a flowchart of the method for determining the movements of jam elements on the gameboard.

At step S2002, the jam physics of the tile in which the jam element is located is determined. The database 1603 is accessed and the jam physics 1611 of the current tile is read. As stated above, the jam physics for the tiles in the examples of FIGS. 14-16 dictates that the jam preferably wants to move directly upwards, and, if this is not possible, wants to move diagonally upwards.

At step S2004, the target tile (the one above the tile in which the jam is situated in the case of upwards physics) is checked against predefined criteria to see if it is available for the jam to move to. These criteria include determining if the potential target tile is subject to a blocking condition, such as if it contains a jam element or is a 'blocker'. This next tile is the target tile since it is the most desirable tile for the jam to move into based on the jam physics. The status of the target tile background 1609 and the tile data 1607 defining the characteristics of the tile may be found in the database 1603. If the target tile does not contain either jam or any other blocking condition, the jam element moves upwards into that tile, step S2006. The process then returns to step S2002 and repeats, such that a next target tile is identified and checked. The next target tile may be the next tile in the row or column in which the jam is situated.

Figure 14D:
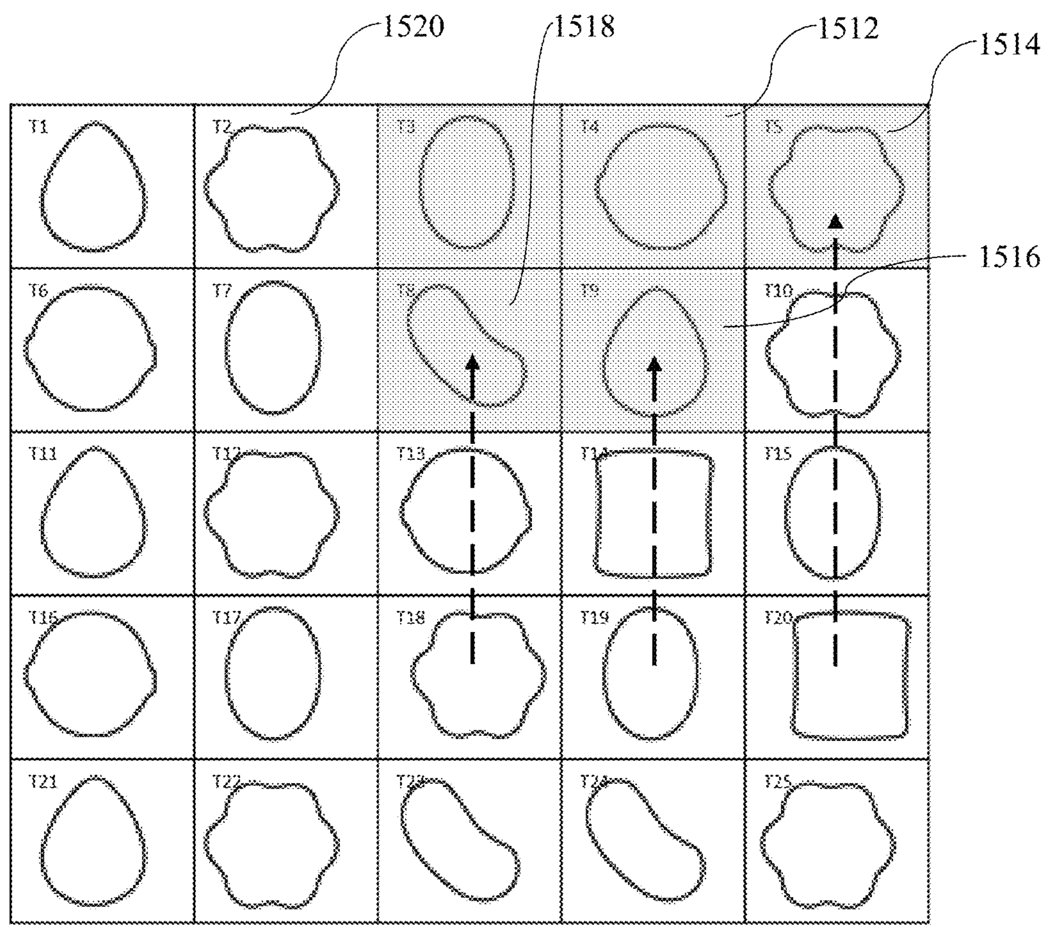
Figure 14E:
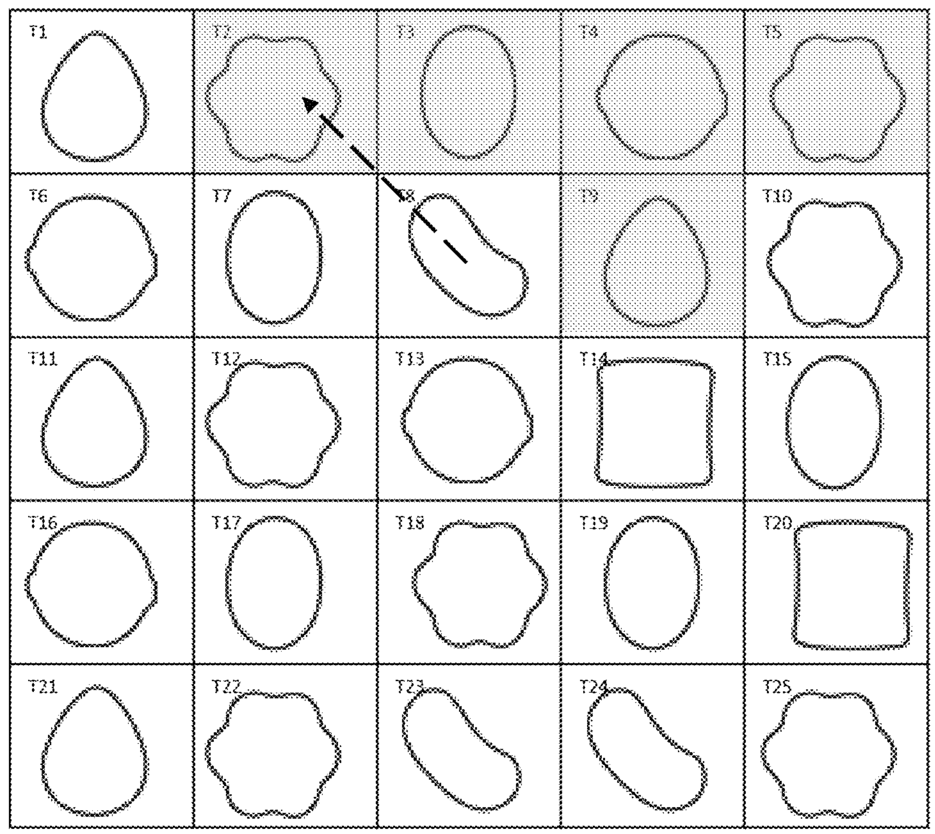

FIG. 14D shows an example of when the three jam elements of the group 1506 in FIG. 14B have moved directly upwards as far as they can, their paths indicated by the arrows. Once the jam elements have reached these positions, a blocking condition is found in the next respective target tile for each of the jam elements. A blocking condition may be, for example, the edge of the gameboard, a tile with blocking characteristics or a tile containing jam. Thus, the answer to the question at step S2004 is no, so the process moves to step S2008, where the tiles into which the jam may slide are checked for jam or any other blocking condition. In the case of upwards physics, these are the tiles either side of the tile directly above the jam element. Again, this information is accessed from the database 1603. The tiles into which the jam may slide, here the tiles diagonally upwards of the current tile, are referred to as potential target tiles.

The jam elements in tiles 1516 and 1514 of FIG. 14D have no available tiles diagonally above them, so the process moves to step S2010 and the jam elements settle, such that no more checks are performed on surrounding tiles.

However, in some cases, there are free tiles diagonally above the jam. Here, the method moves to step S2012, where it is determined if both potential target tiles, so tiles diagonally above the jam, are available for jam to move to.

Referring back to FIG. 14D, it can be seen that the jam at tile 1518 has an available tile diagonally to the left of it, tile 1520, but not to the right, tile 1512. Thus, the method proceeds to step S2014 and the jam moves to the only available tile, tile 1520, as shown in 17E. Again, the process returns to step S2002, this time flowing through to end at step S2010.

Figure 15A:
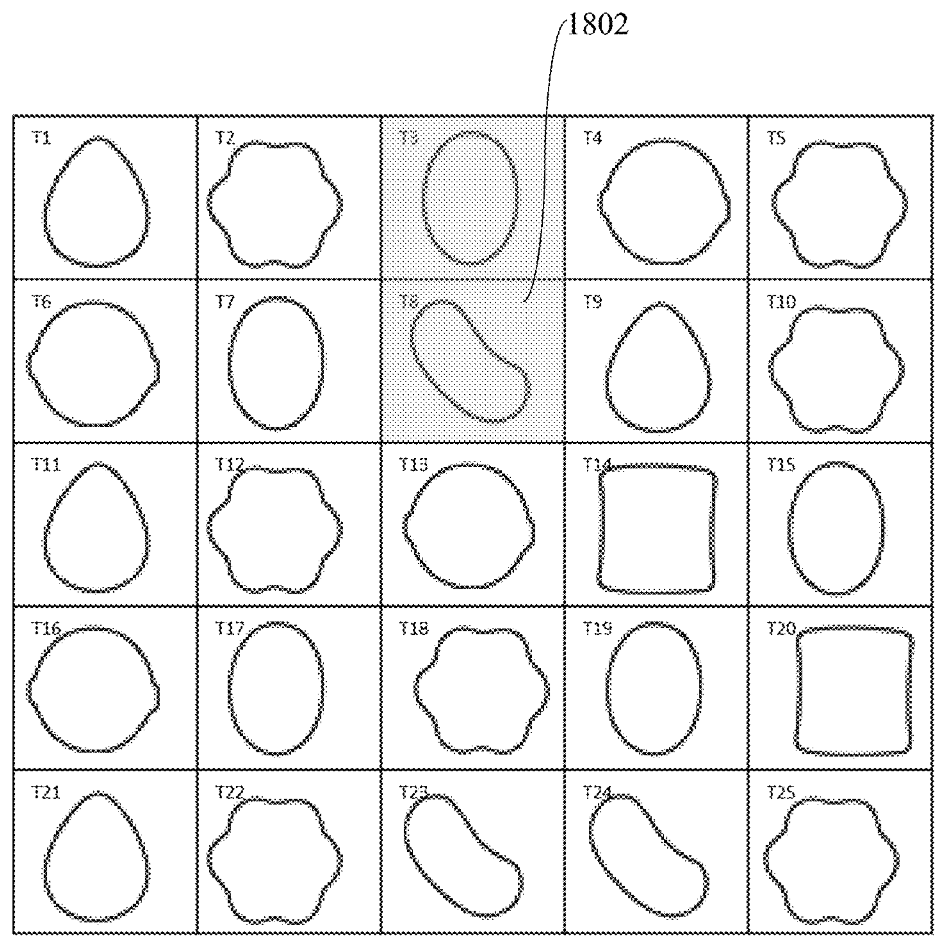

In some instances, both tiles diagonally above the jam may be available, for example in FIG. 15A. In this case, the process of FIG. 16 would proceed from step S2012 to step S2016, where sliding rules are accessed. The same sliding rules may apply to the whole gameboard, each tile may have its own individual sliding rule, or sliding rules may be associated with sets of tiles.

Sliding rules define how the jam elements moves if both of the potential target tiles are available, as in FIG. 15A with regards to jam element 1802. The sliding rules may dictate that there is a preference to which tile, left or right, the jam elements slides to first. For example, the sliding rule may dictate that, in instances when both diagonally above tiles are free, the jam will slide to the left-hand tile. In other embodiments, the sliding rule dictates that the jam slides to a random tile of the two available tiles.

Figure 15B:
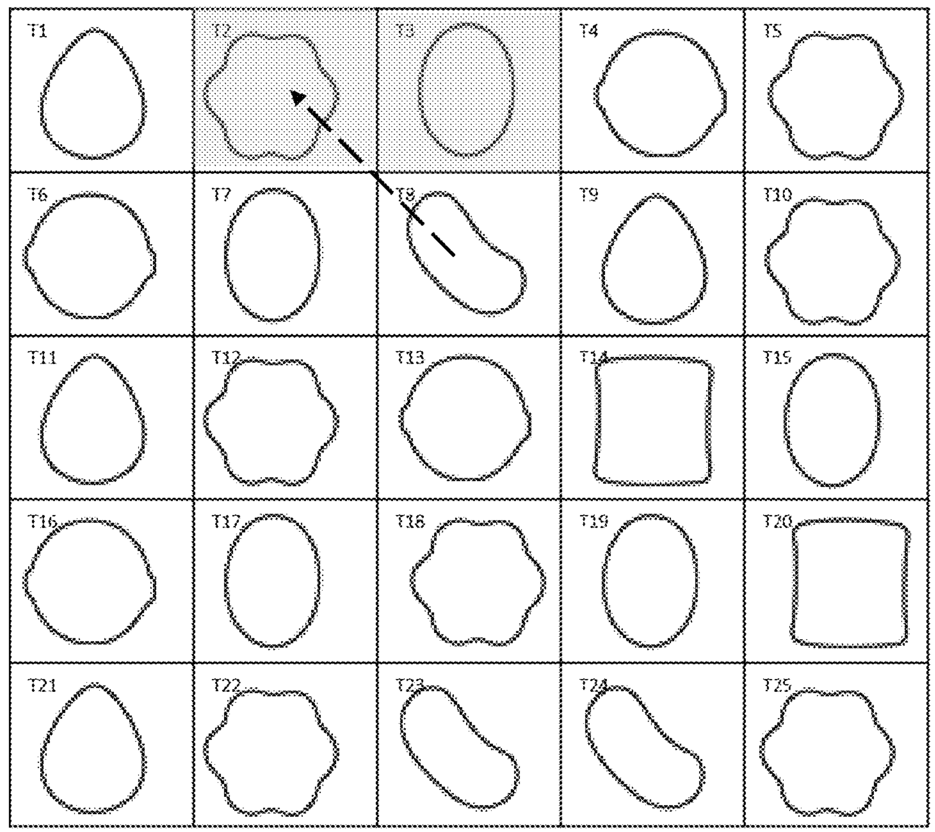

Once the rules have been accessed at step S2016, the jam moves to the tile dictated by the rules at step S2018. FIG. 15B shows an example of the sliding rule dictating that the jam elements preferably slide left.

The method returns to step S2002 and repeats as before. This process may be performed for all jam elements on the gameboard, not just the ones involved in the match condition.

Each time a jam element moves, the tile characteristics of both the tile the jam has moved out of and the tile the jam is moving in to are modified, such that the former stipulates that the tiles contains no jam and the later stipulates that the tile contains jam. However, if the former tile also has a different jam element move into it, that is, it is the target tile of a different jam element, there will be no such modification since the background appearance will continue to stipulate that the tile contains jam. In some embodiments, the background appearance modification from attained to standard will occur when the first jam element moves, but will revert back to attained when the second jam element moves into the tile. The modifications may be rendered visible to the user, such that he sees the jam moving from tile to tile on the gameboard, or the modifications may only be visible to the user once the jam stops moving.

Each jam element moves independently of the other jam elements on the gameboard. Each jam element on the gameboard continues to work through the process of FIG. 16 until it reaches a blocking condition at step S2010 and stops moving. This is the case when all of the tiles into which the jam element is allowed to move contain blocking conditions. Whether a jam element is allowed to move into a tile is based on the jam physics of the current tile of the jam element. Each jam element will repeat the process after every match-3 condition is found, since the removal of game elements may result in jam, which was previously unable to move, being able to move, such as when the blockers 606 are removed in the example of FIGS. 11-13.

It will be appreciated that the steps of the example method of FIG. 16 may be performed in a different order, or steps may be omitted. For example, the step of accessing sliding rules may be performed after the step of checking the tile above for jam if that tile is full, such that the preferred diagonal tile is checked before the other diagonal tile. For example, if the rules determine that the left-hand diagonal tile is preferable, instead of checking that both left- and right-hand tiles are free, only the left-hand tile is checked. If the left-hand tile is not free, then the right-hand tile is checked. In some embodiments, the step of accessing the sliding rules may be omitted altogether, for example, when the whole gameboard has the same sliding rule applied to it. In some embodiments, sliding may no be permitted on the gameboard, such that only the target tile need be assessed for a blocking condition and steps S2008-S2018 are removed from the flowchart. In this embodiment, if the target tile is not found to be available at step S2004, the jam does not move.

Other criteria may be used to determine if a jam element settles in its current tile location. For example, the method of FIG. 16 may include a step of checking to see if the jam has reached the edge of the gameboard, the edge being defined by the gravity of the physics the jam is subjected to. For example, if the jam physics determines that the jam moves upwards, the edge at which the jam stops moving is the top edge of the gameboard. This extends to jam physics causing the jam to move in other directions, such that, for example, if the gravity is to the right, the jam stops moving when it reaches the right-hand edge of the gameboard.

In some embodiments, jam elements may not be able to slide. Sliding refers to a jam element moving in a diagonal direction to its next tile. In such cases, the jam elements may only be able to move in one direction. For example, if the gravity of the tile the jam is in is upwards, the jam elements can only move to the tile directly above its current tile. Whether sliding is possible may be a condition applied to the whole gameboard or the condition may be applied to each tile individually, such that some tiles may allow sliding and some may not. There may be a flag stored in the database 1603 in association with each tile which determines if sliding is possible. Alternatively or additionally, the ability of the jam to slide may depend on user engagement with an element on the gameboard.

The jam physics of the tiles may define a preferential direction of gravity and a secondary direction of gravity. For example, the jam physics may define that the jam preferably moves upwards but, if the tile directly above contains jam, then the jam can move left. This secondary gravity may be applied in embodiments where sliding is possible, or embodiments where sliding is not possible.

In some embodiments, the direction of movement of the jam may not be defined by jam physics associated with each tile. For example, there may be a pre-defined rule which stipulates that jam tries to move to the top right-hand corner of the gameboard. Jam elements then move according to this rule. The status of the target tile is checked to see if said tile contains jam. If the target tile is free of jam, the jam element can move into it, but if the target tile contains jam the jam cannot move. The target tile is the next tile the jam element moves to from its current tile.

In some embodiments, the movement of jam elements across the gameboard is not determined on a step-by-step basis, as in the examples given above. Instead a final tile the jam element is to occupy is determined. The tiles through which the jam must travel to reach the determined final tile may then be checked for jam to ensure that the jam element can travel through them as required.

As mentioned above, the jam physics of tiles on the gameboard may differ from each other. The jam physics associated with the tile accessed at step S2002 in the method of FIG. 16 determines the tiles which are checked at step S2004 and S2008 of the method. For example, the jam physics of the current tile may dictate that the jam preferentially moves to the tile to the right of its current tile, and, if this tile is not free, it moves either to the tile above or below the tile directly to the right of its current tile.

The jam physics is a tile characteristic, stored in the database 1603 in association with the corresponding tile ID 1605. The jam physics 1611 for each tile on the gameboard may be fixed for each game level. Alternatively, the jam physics 1611 for a tile may change during the level. This may be as a result of the user engaging with one or more game elements on the gameboard.

In some embodiments, the movement of the jam elements around the gameboard is determined from the perspective of the tiles into which they move, rather than from the perspective of the jam elements themselves as in FIG. 16. An example method for this is given in FIG. 17. In this example, it is assumed that the jam physics of the tiles dictates three possible tiles into which jam can move from that tile, and if none of these three tiles are free of jam, the jam will not move, as is the case in the example of FIG. 16. It will be appreciated that the jam physics may dictate more or fewer tiles into which jam can move from a specific tile.

At step S2102, data about the eight tiles surrounding the tile in question is accessed from the database 1603. The tile in question is the tile for which it is being determined if any jam element should move into it. In the example flow of FIG. 17, it is assumed that the tile in question is in a jamless state, that is no jam is currently in the tile, or the tile may contain jam which is about to move out of it. The tile cannot contain jam unless that jam about to move out of the tile and into another tile since two jam elements cannot occupy one tile. The tile also cannot contain any other blocking condition, such as a blocker element, which would prevent jam being able to move to the tile. In this example, only tiles on the gameboard which fit the criteria of not containing a blocking condition follow the process.

Figure 17:
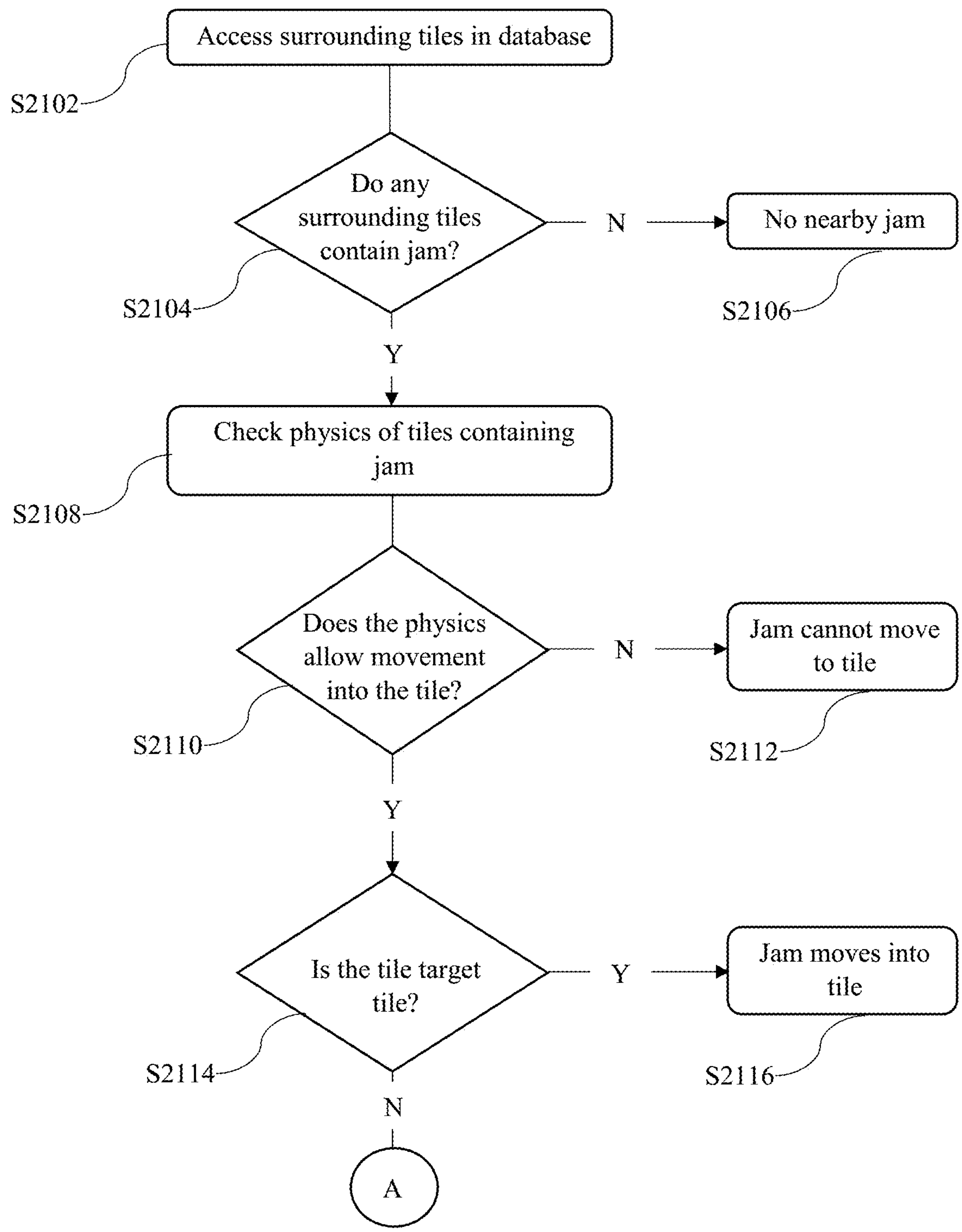
FIG. 17 is a method for moving jam on the gameboard from the perspective of a tile.
Figure 17:
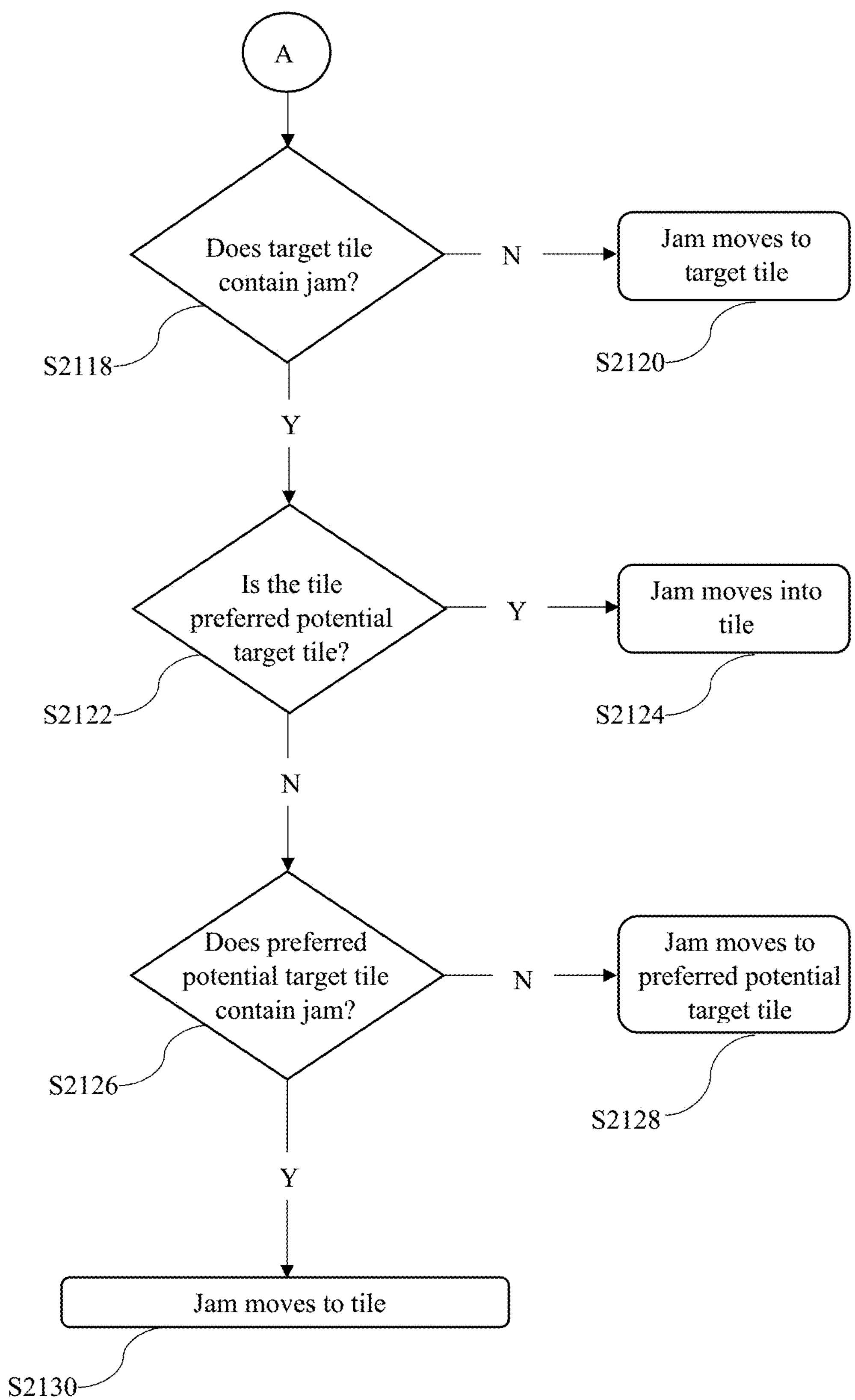

In some other embodiments, all tiles on the gameboard may carry out the process of FIG. 17. In this embodiment, step S2110 may be modified to include checking if the tile contains a blocking condition, such as jam or a blocker, as well as checking the jam physics of neighbouring tiles. If the tile does contain a blocking condition or the physics does not allow movement into the tile, the jam cannot move into the tile, so the process proceeds to step S2112. To proceed to step S2114, both conditions must be satisfied such that the tile does not contain a blocking condition and the jam physics allows movement into the tile.

At step S2104, a check for jam in any of the eight surrounding tiles is performed by accessing the tile background 1609 for each of the eight tiles. If none of these tiles contain jam, the process proceeds to step S2106. There is no nearby jam so no jam can move into the tile in question.

If, however, there is jam in one or more of the eight surrounding tiles, the jam physics 1611 of the tile(s) containing jam is accessed, step S2108.

At step S2110, it is determined if the jam physics 1611 of the tile(s) containing jam allows for the movement of jam into the tile in question. For example, taking the jam physics of all of the eight tiles to dictate that the jam elements move upwards, as in the example method of FIG. 6, jam can move into the tile in question from any of the three tiles below the tile in question. However, jam cannot move into the tile in question from any of the other five tiles surrounding the tile in question. Therefore, the jam physics only allows for the movement of jam into the tile in question if any of the three tiles below contain jam, in this case of upwards physics. If no jam can move into the tile in question, the method proceeds to step S2112 where no jam moves into the tile.

If, however, the jam physics of any of the tiles containing jam does allow the jam to move into the tile, the process moves to step S2114.

At step S2114, it is assessed if the tile in question is the target tile for the jam in the surrounding tiles to move into. That is, does the jam physics of the tile containing jam dictate that the target tile for the jam is the tile in question, irrespective of whether the other tiles nearby contain jam or not. In the example of upwards gravity, this would be the case if the tile directly below the tile in question contains jam. Note that the target tile is the first tile that jam is to be moved to, based on the jam physics. ‘Potential’ target tiles are those which are assessed if the tile is not available.

If the tile in question is the target tile for the tile containing the jam, the jam element moves into the tile in question from its current tile at step S2116.

If, however, the tile in question is not the target tile, that is the tile data 1607 for the tile which is the target tile is accessed, and it is determined if said tile contains jam, step S2118. If that tile does not contain jam, the jam will move into that tile at step S2120, since it is the preferred tile for jam movement.

However, if the target tile does contain jam, it is determined if the tile in question is the preferred potential target tile for the jam element to move into at step S2122. This may be determined by the sliding rules.

If the tile in question is the preferred potential target tile, the jam moves into the tile at step S2124.

However, if the tile in question is not the preferred potential target tile, the tile which is the preferred potential target tile is checked for jam by checking the tile background 1609 in the database 1603, step S2126. If the preferred potential target tile does not contain jam, the jam will move into said tile at step S2128.

However, if the preferred potential target tile does contain jam, the jam will move into the tile in question at step S2130.

As stated above, it is assumed here that the jam physics specifies three possible tiles for jam to move into from a tile. However, in some embodiments, the jam physics will specify more or fewer possible tiles. The process in FIG. 17 can be adapted to compensate for this. For example, if there are more possible tiles given, the process will continue to check if the tile in question is the next tile to be filled, and, if not, whether that tile contains jam. This continues until the tile into which the jam is to move is found, whether that be the tile in question or another tile.

It will be appreciated that there may be alternative steps in the method. For example, after determining if it is possible for the jam to move into the tile in question given the jam physics of the tile containing the jam, step S2110, it may be determined in a next step where in the order of preferable moves the tile in question comes, i.e. whether it is the first-, second-, or third-choice tile. The tiles which are more preferable for the jam to move into may then be checked for jam.

There may be situations in which more than one of the tiles from which jam can move into the tile in question contain jam. For example, there may be jam in two of the tiles directly below the tile in the case of upwards physics. The process of FIG. 17 may be carried out simultaneously for all tiles. For example, it may be assessed if the tile in question is the target tile for any of the jam at step S2104, and, if it is, the jam from the tile for which it is the target tile will move into the tile in question and any other jam will remain in its current tile or move to another tile which is free of a blocking condition. The process continues until either jam moves into the tile or all of the jam moves. Alternatively, the process may be performed for each jam element sequentially, starting with jam for which the tile is the most preferable tile for the jam to move to in comparison to the other current tiles of the jam elements. That is, the tile for with the tile in question is the target tile would be assessed first, followed by the tile for which the tile in question is the preferred potential target tile, followed by the tile for which the tile in question is not the preferred target tile.

The method of FIG. 17 may be repeated each time there is an iteration of jam movement on the gameboard. That is, each time a jam element moves tile location on the gameboard, the process of FIG. 17 is be performed by all of the tiles on the gameboard into which jam can move, i.e. all tiles which do not contain a blocking condition. The process continues to be repeated until none of the jam elements in the gameboard move tile locations and no new jam elements have been generated.

FIGS. 18A-D show an example gameboard in which the jam physics of the tiles varies across the gameboard. It will be appreciated that, although one layout of varying jam physics is disclosed below, other configurations of varying jam physics may be applied to a gameboard.

Figure 18A:
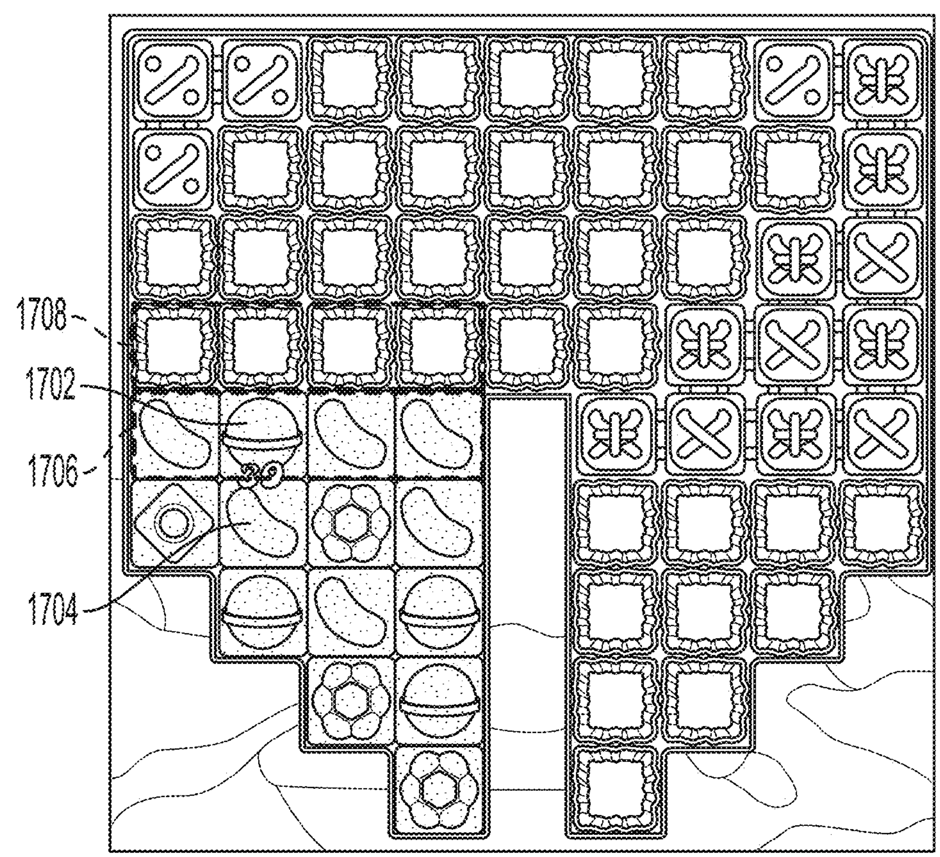
FIGS. 18A-18D show examples of a gameboard with varying jam physics across the gameboard.

In FIG. 18A, the user switched the tile locations of the lollipop candy 1702 and the jelly bean candy 1704 to create a group of matching adjacent jelly bean candies at tile locations in group 1706. This match not only results in the jelly bean candies in group 1706 being removed from the gameboard, but also the adjacent blockers at tile locations in group 1708.

Figure 18B:
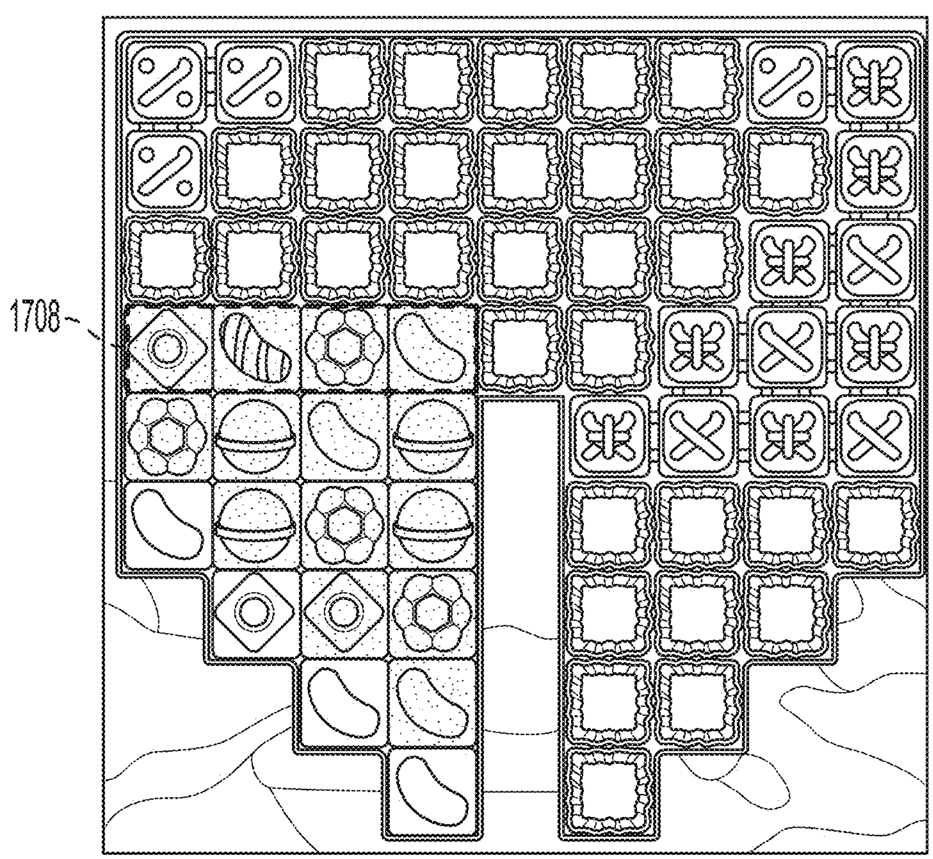

FIG. 18B shows the gameboard after the game elements have been removed from the gameboard, and both candy refill and jam migration have occurred. Jam elements have moved upwards to fill the tiles at locations 1708. This is because the physics of the tiles below the tiles in group 1708 dictate that jam elements at these tile locations move upwards, as in the examples of FIGS. 14-16.

Figure 18C:
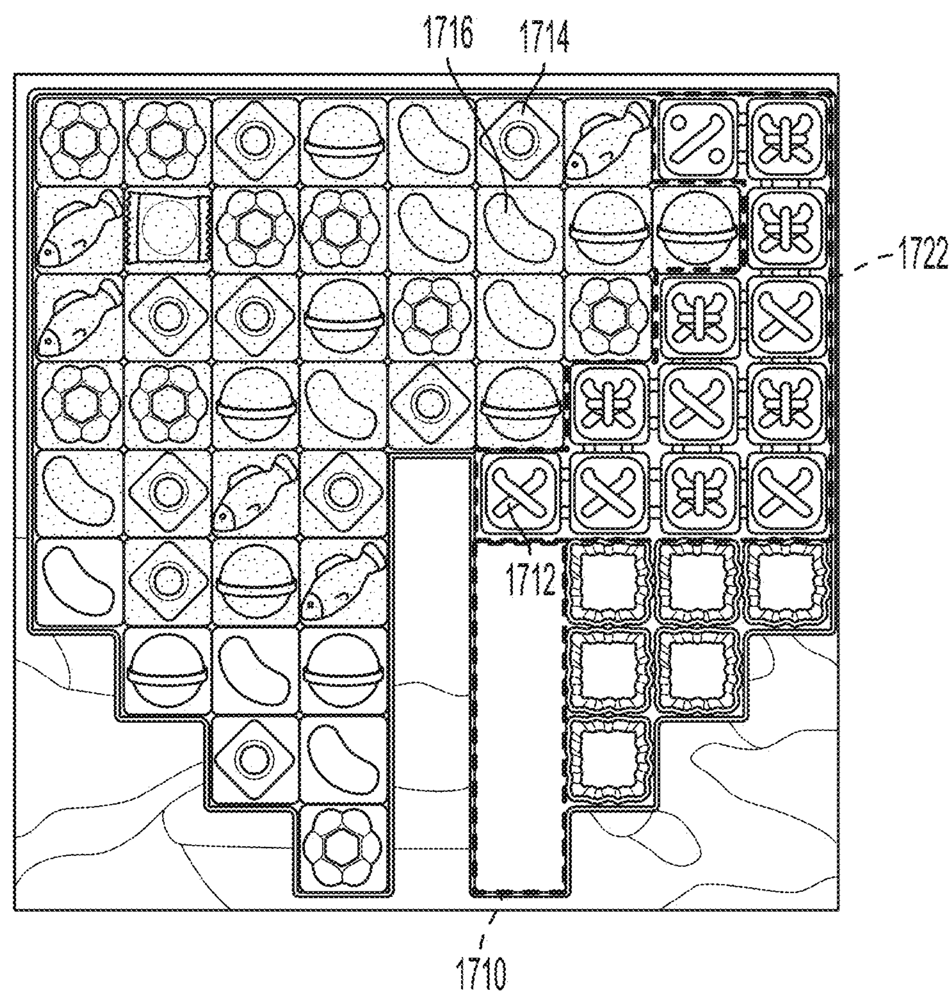

FIG. 18C shows the gameboard some time later, when all of the blockers in the central portion of the gameboard have been removed and jam has migrated to fill the tiles.

It can be seen that there is a group of tiles 1710 which contains neither candies nor jam. This is because there is a stitched blocker at tile location 1712 which prevents candy refill and jam migration into the tiles in the group 1710. A stitched blocker has a characteristic that a match adjacent one or more of tits elements causes all 'stitched' elements of the blockers to be removed. The player switches the diamond candy 1714 and the jelly bean candy 1716 to create a group of adjacent matching elements, the group containing two jelly beans candies and one fish candy of the same colour as the jelly beans, which are subsequently removed from the gameboard since the game elements have a matching characteristic. This match also results in the removal of the joined stitched blockers in group 1722 since the match is adjacent to one of the stitched blocker elements in the group 1722.

Figure 18D:
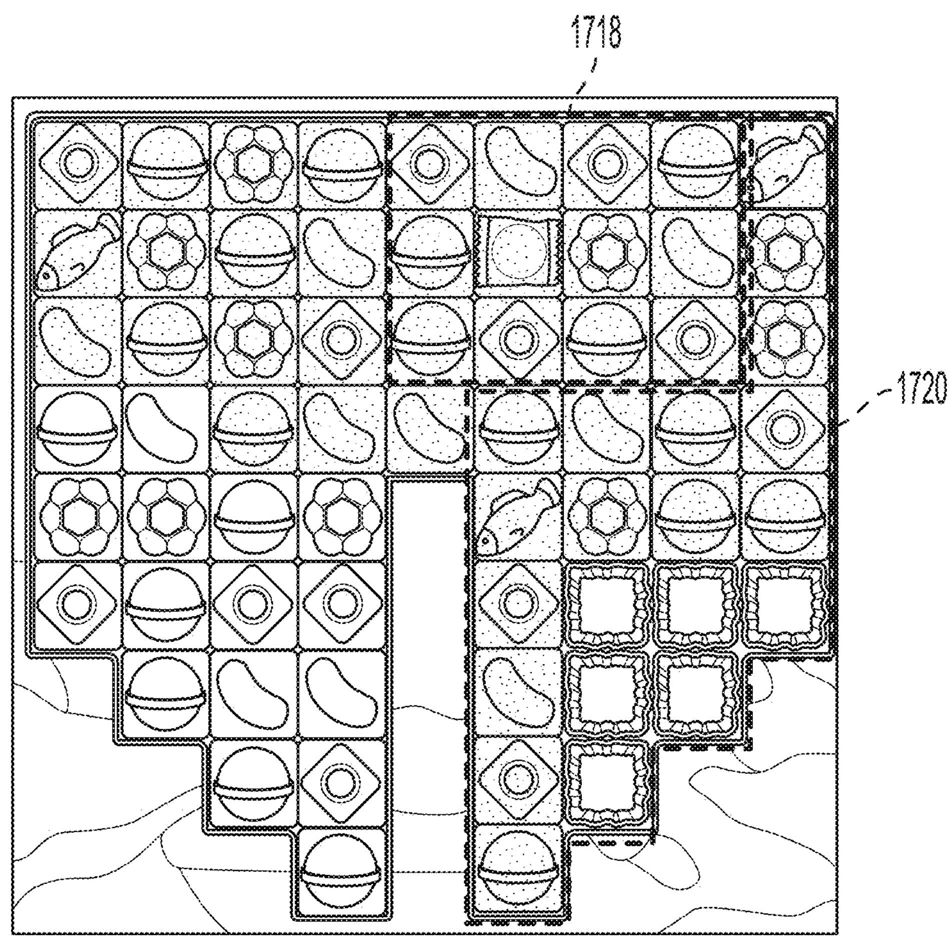

FIG. 18D shows the gameboard after candy refill and jam migration has occurred. The previously empty tiles in group 1710 have been filled with both candies and jam, as have the tiles previously containing the stitched blockers 1722. To facilitate the jam moving into these tile locations, the jam physics, as determined by the tile data, of different tiles on the gameboard must be different.

As described earlier, the tiles on the left-hand side of the gameboard have jam physics which dictates that jam moves upwards. However, this would not allow for the tiles in groups 1710 and 1722 to be filled with jam. This may be facilitated by the physics of the tiles in group 1718 dictating that the jam moves to the right, and the physics of the tiles in the group 1720 dictating that the jam moves downwards. The overall effect of the varying jam physics across the gameboard is to allow the jam elements to move in a clockwise direction around the gameboard.

A visualisation of the direction of movement of the jam on the gameboard may be displayed to the user. For example, in the example of FIG. 18, once the gameboard has been rendered visible on the display, arrows may be shown on the gameboard indicating the direction of movement of the jam dictated by the jam physics of the tiles. That is, there is a visual indication of the direction of the respective target tile from a given tile. The arrows may be seen to travel around the gameboard, starting in the lower left-hand corner, where the jam elements start at the beginning of the level, and travel clockwise around the gameboard until they reach the lower right-hand corner of the gameboard. The direction the arrows point when they are specific points on the gameboard shows the direction jam moves when it is at these tile locations on the gameboard. This indication may be shown during gameplay, for example, it may be shown if the jam physics changes, or just to act as a reminder to the user, or it may be shown before the user starts the level.

The jam physics associated with each tile on the gameboard may be predefined by the level the user is playing. In other embodiments, it may be possible for the user to change the jam physics of the tiles during game play. He may be able to change the jam physics associated with one or more of the tiles at one time. For example, the user may be able to change the jam physics associated with a single tile, a group of tiles, the whole gameboard, or any combination thereof.

Figure 19:
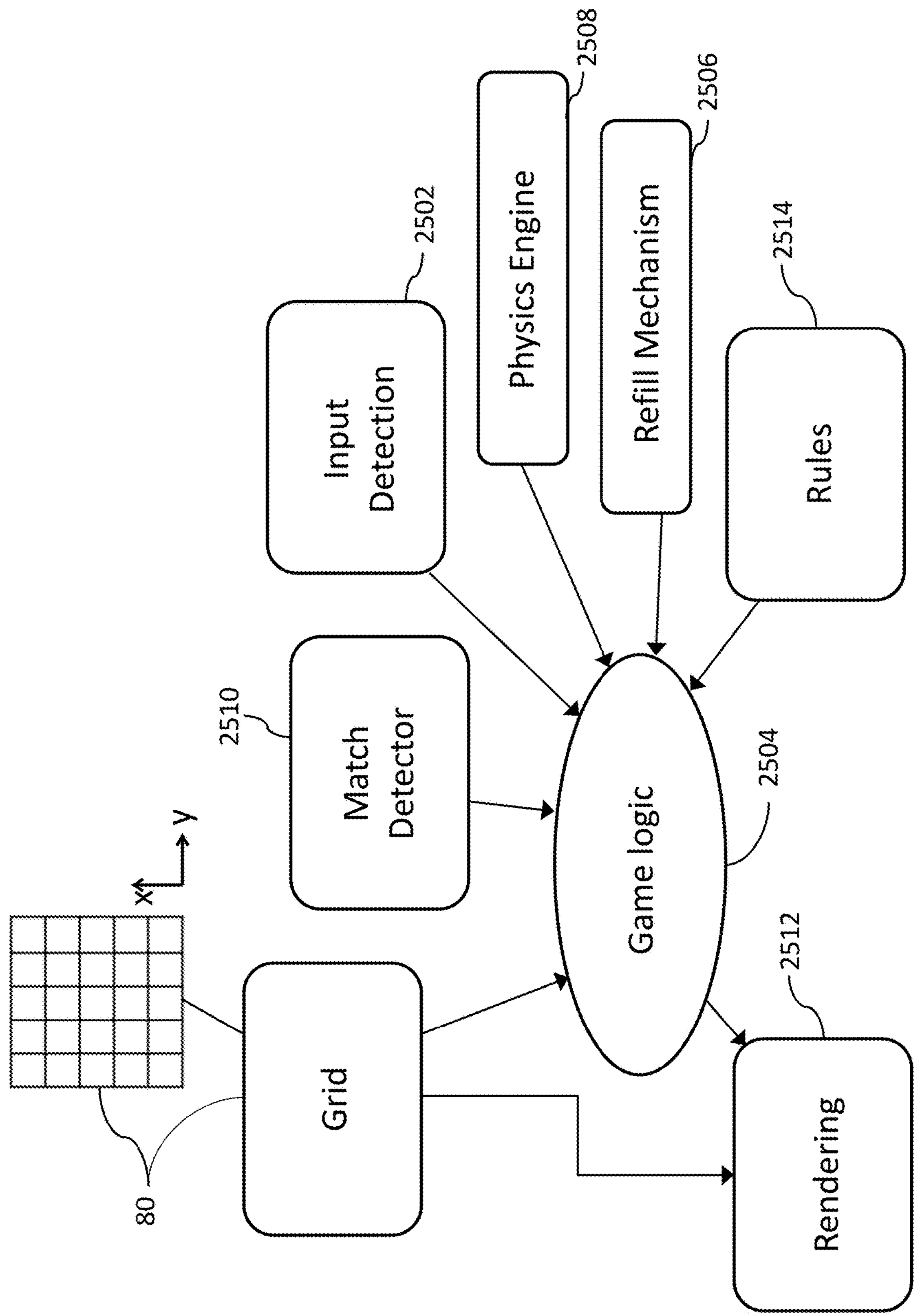
FIG. 19 shows a view of the functional components of the game.

FIG. 19 shows a schematic representation of the functional blocks of an embodiment of the present invention used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be switched and checked for adjacent matching blocks. The game logic 2504 will process the information provided by the user input. The game logic 2504 may then determine if a valid selection has been made, and what the outcomes of the selection should be.

The rendering block is used to render the gameboard 100 to the user. It renders the game elements and the jam elements on the gameboard 100. Each time a jam element or candy moves tile location, the rendering block is used to render this movement visible to the user on the display 1318 of the user device 240.

The grid component 80 stored in a memory provides a grid representation of the game board as shown schematically in FIG. 19. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. a match detector component 2510, and a refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function.

The game logic 2504 will determine the blocks selected by a user, and the actions to follow to implement the game mechanic.

Thus, the game logic controls the rules for determining if a valid group has been selected. The game logic 2504 operates according to a set of rules of the level the user is playing. The predefined criteria may be embodied in these per-level rules, or may be generic to multiple levels. The game logic will have access to data for each tile including its tile ID designating its location on the grid 80, and associated tile data providing information about the contents of that tile, e.g. the game element within that tile, at least one characteristic associated with the game element within the tile, or the tile background appearance. The game logic 2504 will thus be able to determine the game elements to be removed from those respective tiles for each user selection. The grid can be considered as a map which may be used to determining the relative positions of tiles on the game board from the tile ID. In embodiments of the present invention, the grid 80 is implemented as a two-dimensional grid. By splitting the grid 80 into row or column sets of tiles, each with their own deterministic game element generating algorithm, the game board may be simplified to a set of one-dimensional sub-grids. The grid 80 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

Once a group of matching adjacent blocks has been successfully created, these blocks may be removed, and the respective tiles will become empty. At this stage, a refill of the empty tiles is required based on the refill mechanism 2506. The refill mechanism 2506 may also have conditions on which it relies. For example, other moves or actions taking place on the gameboard may have to be completed before the refill mechanism can take place.

Each tile of the grid 80 may be associated with data to indicate a status, such as filled or unfilled (empty) in relation to game elements. Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 2508, or as the endpoint of a new block entering the game board. The physics engine component 2508 is configured to control the movement of moving game elements in the display. It may control the movement of both the game elements and the tile characteristics. The physics engine 2508 may be part of the game logic 2504. Sliding rules may be controlled by the rules module 2514.

It will be appreciated that, whilst specific embodiments of the invention have been described, these are not exhaustive. The scope of the invention is not defined by the described embodiment but only by the appendant claims.

The invention claimed is:

1. A computer device comprising:

a user interface configured to display user actuatable game elements, each user actuatable game element displayed on a respective tile, and to detect user input when a user engages with at least one of said user actuatable game elements in a move;

wherein each tile is associated with a tile characteristic which determines a background appearance of the tile;

a processor configured to receive a detected user input and on detecting a match game condition of at least three user actuatable game elements to control the user interface to remove the at least three game elements from their respective locations on the display and to generate replacement user game elements for a subsequent move; and a graphics rendering component operable to render the tiles and the user actuatable game elements on the user interface, each game element having a graphical representation on its respective tile, and each tile having a background appearance determined by its tile characteristic;

wherein the processor is configured to determine, on detecting the match game condition, whether at least one tile of the respective tiles associated with the at least three actuatable game elements of the match condition has a tile characteristic indicating an attained background appearance and, if so, to modify the tile characteristic of each tile of the respective tiles associated with the at least three actuatable game elements of the match condition not indicating an attained background appearance to indicate an attained background appearance, and wherein the processor is further configured to identify for each tile of the respective tiles associated with the at least three actuatable game elements of the match condition a respective target tile and to determine for each respective target tile identified whether according to a predefined criteria to associate the respective target tile with the modified tile characteristic indicating an attained background appearance; and wherein the tile characteristic associated with at least one of the respective tiles associated with the at least three actuatable game elements of the match condition not indicating an attained background appearance prior to the modification is controlled to indicate a standard background appearance after the tile characteristic has been associated with the respective target tile, wherein the standard background appearance differs from the attained background appearance.

2. A computer device according to claim 1 wherein at least some tiles have a predetermined physics which governs a direction of the respective target tile relative to each of the at least some tiles.

3. A computer device according to claim 2 wherein at least two of the at least some tiles have different predetermined physics.

4. A computer device according to claim 1 wherein the processor is configured to identify a respective target for each additional tile on the user interface which has an attained background appearance, and to determine for each respective target tile identified whether according to the predefined criteria to associate the respective target tile with the modified tile characteristic indicating an attained background appearance.

5. A computer device according to claim 1 wherein the graphics rendering component is operable to render a visual animation of the association of the modified tile characteristic with each respective target tile by rendering each respective target tile with the attained background appearance.

6. A computer device according to claim 2 wherein the processor is configured to determine for each current tile associated with the modified characteristic a next respective target tile according to the predetermined physics associated with the current tile with which the tile characteristic is to be associated depending on the predefined criteria.

7. A computer device according to claim 1 wherein the graphics rendering component is configured to render for at least some tiles an indication of the direction of each respective target tile that is to be associated with the modified tile characteristic.

8. A computer device according to claim 1 wherein the user interface is configured to display the user actuatable game elements in a game board comprising an array of tiles in rows and columns, and the processor is configured to identify each respective target tile as a next tile in the row or column, the next tile being adjacent the tile associated with the modified tile characteristic, and being further configured to identify a next respective target tile for each tile and to associate the tile characteristic with each next target tile until a blocking condition is detected.

9. A computer device according to claim 8 wherein the processor is configured on detecting a blocking condition, to identify potential target tiles adjacent the row or column, and to associate the tile characteristic with a selected one of the potential target tiles, where the selected one of the potential target tiles is determined according to one of the following rules:

the potential tile located in a predefined direction is selected; and the potential target tile is randomly selected.

10. A computer device according to claim 8 wherein the processor is configured on detection of a blocking condition, not to identify further potential target tiles.

11. A computer device according to claim 9 wherein the blocking condition is one of:

a target tile which does not satisfy the predefined criteria;

a tile with blocking characteristics; and an edge of the game board.

12. A computer device according to claim 1 wherein each of the respective tiles associated with the at least three actuatable game elements of the match condition not indicating an attained background appearance indicates a standard background appearance prior to modification of the tile characteristic, and wherein the tile characteristic associated with each tile in the match condition is controlled to indicate the standard background appearance after the tile characteristic has been associated with the respective target tile.

13. A computer device according to claim 2 wherein the predetermined physics of at least one tile operates according to one of the following rules:

(i) it causes the target tile to be located in a direction upwards of that tile;

(ii) it causes the target tile to be located downwards from that tile;

(iii) it causes the target tile to be located to one or other side of that tile.

14. A computer device according to claim 2 wherein the predetermined physics of at least one tile is recorded in computer code stored at the computer device, the computer code configured to execute a game level, the predetermined physics fixed for the game level.

15. A computer device according to claim 2 wherein the predetermined physics of at least one tile is controllable by the user engaging with the at least one user actuatable game element.

16. A computer device according to claim 1 wherein the user interface is configured to display special user actuatable game elements which are actuatable in a match game condition and which cause multiple further tiles, in addition to each tile in the match condition, to have a modified tile characteristic.

17. A computer device according to claim 9 wherein the predefined criteria comprises:

(i) a flag set for a current tile; and (ii) an indicator dependent on user engagement with the at least one user actuatable game element.

18. A computer device according to claim 1 wherein the tile characteristic associated with all the tiles in the match condition is controlled to indicate the standard background appearance after the tile characteristic has been associated with the respective target tile.

19. A method of controlling a display of a computer device, the method comprising:

displaying on a user interface a user actuatable game elements, each user actuatable game element displayed on a respective tile, and detecting user input when a user engages with at least one of said user actuatable game elements in a move;

wherein each tile is associated with a tile characteristic which determines a background appearance of the tile;

receiving a detected user input and, on detecting a match game condition of at least three user actuatable game elements, controlling the user interface to remove the at least three game elements from their respective locations on the display and generating replacement user game elements for a subsequent move; and rendering the tiles and the user actuatable game elements on the user interface, each game element having a graphical representation on its respective tile, and each tile having a background appearance determined by its tile characteristic;

wherein it is determined, on detecting the match game condition, whether at least one tile of the respective tiles associated with the at least three actuatable game elements of the match condition has a tile characteristic indicating an attained background appearance and, if so, modifying the tile characteristic of each tile of the respective tiles associated with the at least three actuatable game elements of the match condition not indicating an attained background appearance to indicate an attained background appearance, and wherein it is identified for each tile of the respective tiles associated with the at least three actuatable game elements of the match condition a respective target tile and determined for each respective target tile identified whether according to a predefined criteria to associate the respective target tile with the modified tile characteristic indicating an attained background appearance; and wherein the tile characteristic associated with at least one of the respective tiles associated with the at least three actuatable game elements of the match condition not indicating an attained background appearance prior to the modification is controlled to indicate a standard background appearance after the tile characteristic has been associated with the respective target tile, wherein the standard background appearance differs from the attained background appearance.

20. A computer program comprising computer readable instructions stored on a non-transitory computer readable media, the computer readable instructions, when executed by a processor of a computer device, causing a method of controlling a graphical user interface of the computer device to be implemented, the method comprising:

displaying on a user interface a user actuatable game elements, each user actuatable game element displayed on a respective tile, and detecting user input when a user engages with at least one of said user actuatable game elements in a move;

wherein each tile is associated with a tile characteristic which determines a background appearance of the tile;

receiving a detected user input and, on detecting a match game condition of at least three user actuatable game elements, controlling the user interface to remove the at least three game elements from their respective locations on the display and generating replacement user game elements for a subsequent move; and rendering the tiles and the user actuatable game elements on the user interface, each game element having a graphical representation on its respective tile, and each tile having a background appearance determined by its tile characteristic;

wherein it is determined, on detecting the match game condition, whether at least one tile of the respective tiles associated with the at least three actuatable game elements of the match condition has a tile characteristic indicating an attained background appearance and, if so, modifying the tile characteristic of each tile of the respective tiles associated with the at least three actuatable game elements of the match condition not indicating an attained background appearance to indicate an attained background appearance, and wherein it is identified for each tile of the respective tiles associated with the at least three actuatable game elements of the match condition a respective target tile and determined for each respective target tile identified whether according to a predefined criteria to associate the respective target tile with the modified tile characteristic indicating an attained background appearance; and wherein the tile characteristic associated with at least one of the respective tiles associated with the at least three actuatable game elements of the match condition not indicating an attained background appearance prior to the modification is controlled to indicate a standard background appearance after the tile characteristic has been associated with the respective target tile, wherein the standard background appearance differs from the attained background appearance.

* * * * *